United States Patent
Kurihara et al.

[11] Patent Number: 6,048,189
[45] Date of Patent: Apr. 11, 2000

[54] BLOW MOLDING APPARATUS

[75] Inventors: Fumio Kurihara, Yokkaichi; Mitsuyoshi Kumamoto, Suzuka; Yasuhito Ito; Masanobu Nagano, both of Yokkaichi; Jun Nakamura, Ichishi-gun, all of Japan

[73] Assignee: Japan Synthetic Rubber Co., Ltd., Tokyo, Japan

[21] Appl. No.: 08/620,455

[22] Filed: Mar. 22, 1996

[30] Foreign Application Priority Data

Apr. 5, 1995 [JP] Japan .................................. 7-104782
Apr. 6, 1995 [JP] Japan .................................. 7-108073

[51] Int. Cl.[7] .......................... B29C 33/04; B29C 33/06; B29C 49/04; B29C 49/64
[52] U.S. Cl. ........................ 425/149; 249/79; 425/174.4; 425/522; 425/526; 425/532
[58] Field of Search ...................... 425/526, 532, 425/522, 547, 144, 149, 174.4; 264/458, 454; 249/79

[56] References Cited

U.S. PATENT DOCUMENTS

| | | | |
|---|---|---|---|
| 3,097,398 | 7/1963 | Inglesby | 425/526 |
| 3,733,161 | 5/1973 | Nussbaum | 425/144 |
| 3,768,948 | 10/1973 | Horberg, Jr. et al. | 425/526 |
| 3,784,344 | 1/1974 | Korsch | 425/526 |
| 4,087,227 | 5/1978 | Uhlig | 425/526 |
| 4,482,306 | 11/1984 | Hahn | 425/145 |
| 4,938,676 | 7/1990 | Jackowski et al. | 425/526 |
| 5,017,126 | 5/1991 | Yamada et al. | 425/526 |
| 5,190,715 | 3/1993 | Yamada et al. | 264/526 |
| 5,423,670 | 6/1995 | Hamel | 425/144 |
| 5,472,331 | 12/1995 | Watkins | 425/149 |

FOREIGN PATENT DOCUMENTS

| | | | |
|---|---|---|---|
| 1580487 | 9/1969 | France | 425/526 |
| 58-102734 | 6/1983 | Japan . | |
| 63-24458 | 5/1988 | Japan . | |
| 4-77231 | 3/1992 | Japan . | |

OTHER PUBLICATIONS

A. Delaney et al., "Plastic Molding Apparatus", IBM Technical Disclosure Bulletin, vol. 17, No. 2, p. 479–480, Jul. 1974.

*Primary Examiner*—Robert Davis
*Attorney, Agent, or Firm*—Oblon, Spivak, McClelland, Maier & Neustadt, P.C.

[57] ABSTRACT

A process and an apparatus for molding, in which a molten thermoplastic resin is firmly fitted onto a molding surface of a mold under a pressure lower than or equal to 100 kg/cm$^2$ and is cured to obtain a molded product. The molding apparatus has a mold main body, and a mold body on which the molding surface is defined. The mold body is supported relative to the mold main body with maintaining a space on the back side of the molding surface in a heat insulative manner by a supporting member which includes at least a heat insulative supporting member having a thermal conductivity of 0.001 to 1 Kcal/mh °C. and a longitudinal elastic modulus of 0.01 to 10 kg/cm$^2$. In the space, a heating fluid for heating the molding surface from the bask side to a temperature higher than or equal to Vicat softening temperate (T) °C. of the thermoplastic resin and a cooling fluid for cooling the molding surface from the back side to a temperature lower than or equal to (Vicat softening temperature (T) of the thermoplastic resin −10) °C. are supplied.

11 Claims, 42 Drawing Sheets

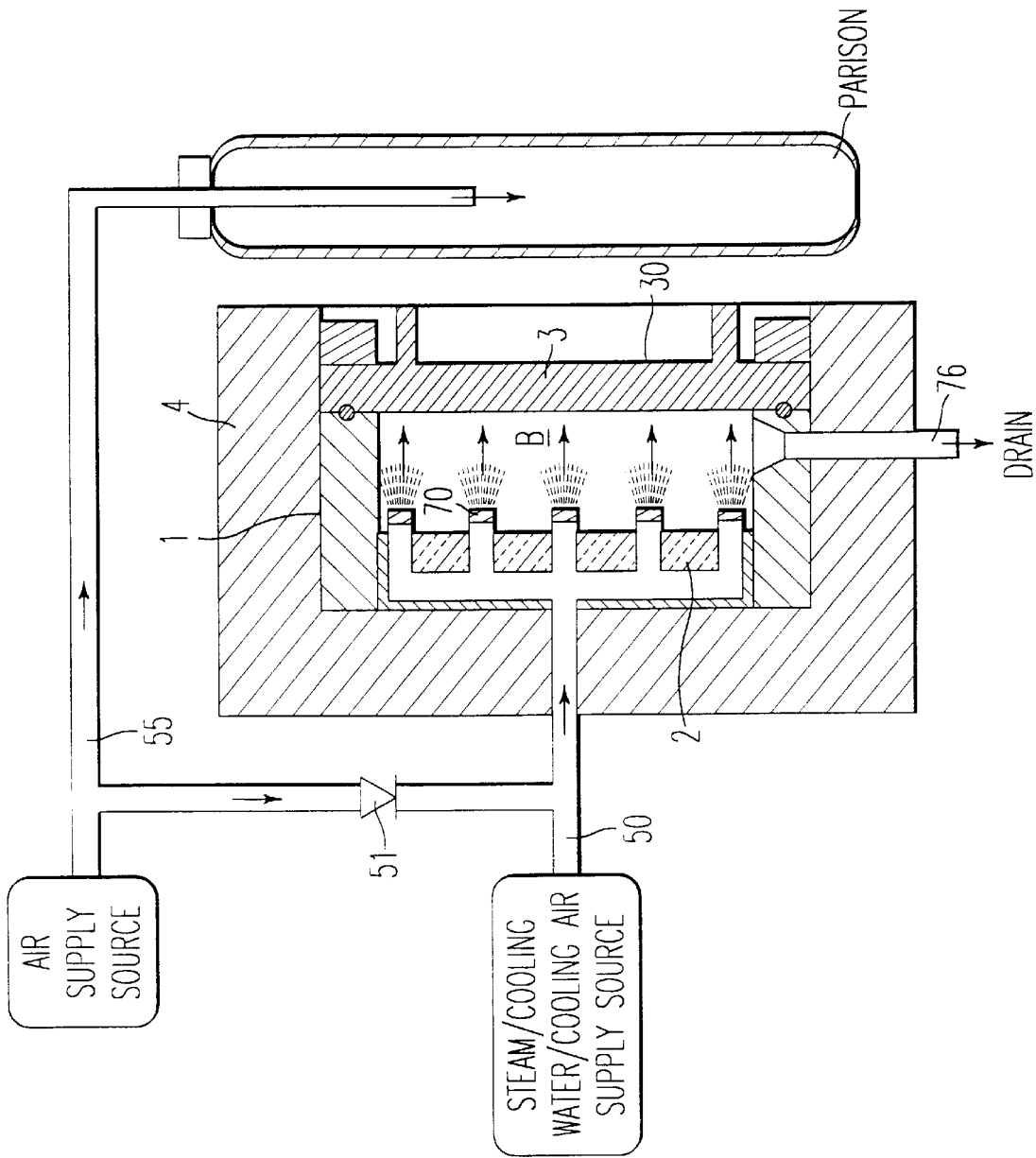

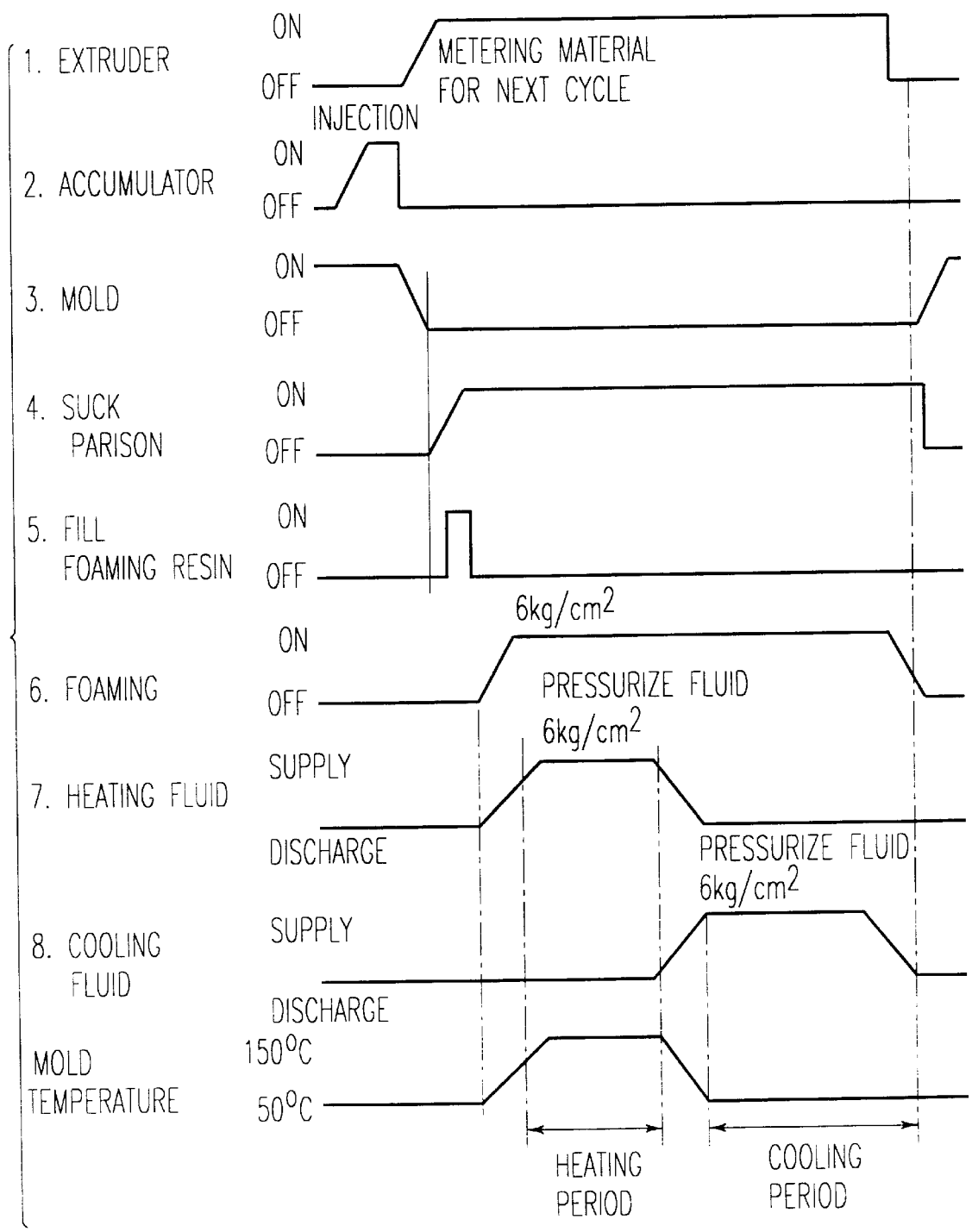

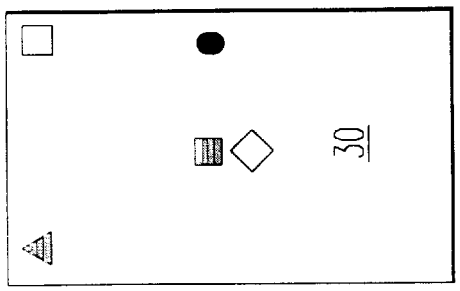
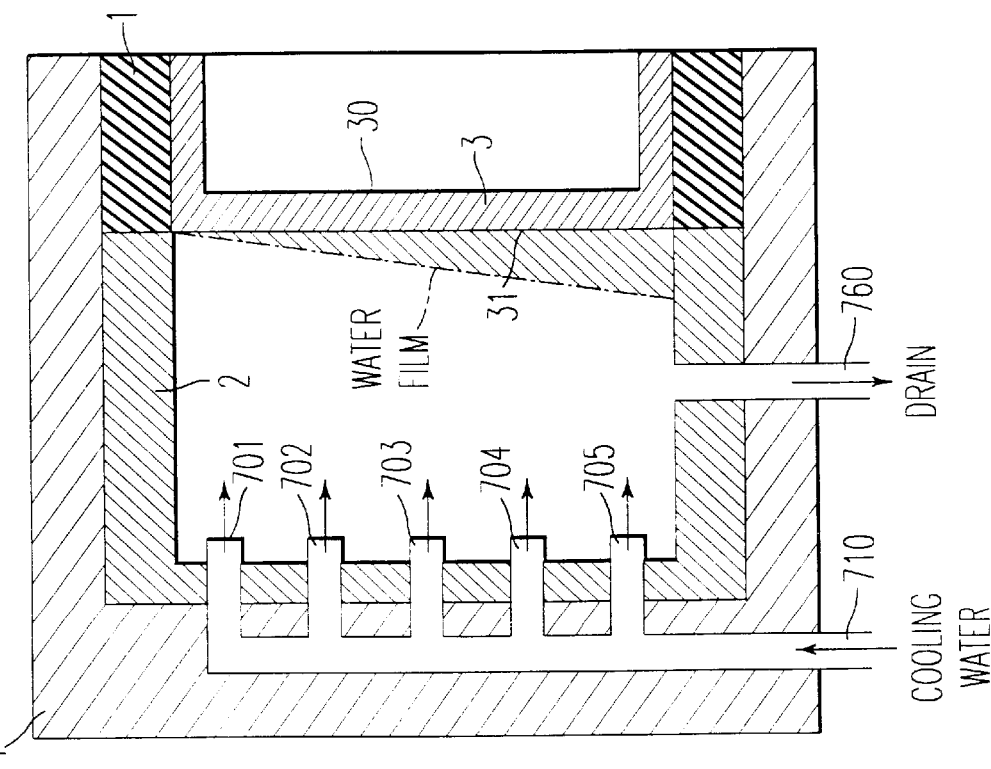

TEMPERATURE VARIATION
ON MOLDING SURFACE (HEATING PIRIOD:90sec, COOLING PIRIOD:60sec)

BLOW MOLDING APPARATUS

BACKGROUND OF THE INVENTION

1. Field of the invention

The present invention relates to a molding apparatus and a process for molding with a thermoplastic resin. More specifically, the invention relates to a molding apparatus and a molding process which can satisfactorily transfer a molding surface of a mold onto a molded product in a short cycle time.

2. Description of the Related Art

As a method for obtaining resin molded products, an injection molding process and a blow molding process are known.

The injection molding process is a system for injecting a molten resin into an enclosed mold at high pressure (200 to 1000 kg/cm$^2$) to transfer the configuration of the molding surface of the mold onto the resin. Since this process employs high pressure, the configuration of the molding surface can be accurately transferred to the molded resin. Therefore, the injection molding process is suitable for molding a product having a highly smooth surface (hereinafter referred to as "mirror surface") or a grained surface. On the other hand, because of high pressure employed, the mold withstanding high pressure becomes necessary to make the constructure of the mold complicate to cause high cost. Therefore, the injection molding process is not suitable for a flexible manufacturing system. Also, since a special arrangement is required for forming a hollow product, it makes the production process complicate.

The blow molding process employs a system to supply a parison (hollow cylindrical resin in molten or softened condition) between mold halves, then clamp the mold halves, and to feed a fluid into a hollow portion under pressure to urge the outer periphery of the parison onto the molding surface of the mold to transfer the configuration of the former. Since the parison is urged onto the molding surface by the fluid pressure, the pressure to be employed is relatively low (4 to 10 kg/cm$^2$). The configuration of the molding surface cannot be transferred accurately onto the surface of the product. Therefore, the blow molding process is not suitable for production of the molded product having a mirror surface (highly smooth surface) or a grained surface. However, since the blow molding process is suitable for mass production of a hollow article, it is widely used.

Japanese Patent Application Laid-open No. 102734/1983 discloses a mold for blow molding having an inner thin wall mold and an outer cooling mold which can be contacted and released to and from the inner mold. In this mold, for the purpose of improvement of the surface brilliance of the blow molded product, the mold is preliminarily heated before supplying of a parison. After the parison is brought into contact with the molding surface of the inner mold, the inner surface of the outer cooling mold is contacted onto the outer periphery of the inner mold to quickly cool the inner mold to obtain a molded product.

In Japanese Patent Application Laid-open No. 77231/1992, it is disclosed that upon molding with contacting the parison onto the molding surface of a mold, a temperature of the mold is maintained within a range from around a temperature where crystallization speed of the parison becomes maximum to a molten point thereof for preventing die-line or weld-line from being remained on the surface of the molded product. In addition, by circulating a coolant in the hollow of the parison during molding, expansion of a cycle time of molding is prevented.

Japanese Patent Publication No. 73903/1994 (corresponding to U.S. Pat. Nos. 5,017,126 and 5,190,715) discloses a mold for molding, in which a shell having a high thermal conductivity and having a large number of communication holes, is fixed on a vessel-shaped mold frame to form a cavity surface portion and an intermediate region at the backside thereof. In the intermediate region, resin or metal having a low thermal conductivity is filled, or, in the alternative, a reinforcing block having a communication hole is provided.

In the resin molding technology, there is a demand to obtain a resin molded article having a mirror surface or a grained surface employing a mold having a relatively simple construction. On the other hand, there is a demand to produce a hollow molding article (e.g., air spoiler for an automotive vehicle) having a mirror surface or a grained surface, in simple process.

In the mold for a hollow article disclosed in the above mentioned Japanese Patent Application Laid-open No. 102734/1983, the molding surface is accurately transferred by heating the inner mold. However, since the resin is cooled by relatively shifting the inner mold relative to the outer cooling mold, it is possible that the structure of the mold becomes complicate and to be weak, and the cooling period becomes longer. In this publication, there is no disclosure with respect to an optimal heating temperature and/or cooling temperature for making the surface of the molded resin article clear and for shortening an overall cycle time.

In the blow molding process disclosed in Japanese Patent Application Laid-Open No. 77231/1992 above, it is intended to make the molded surface clear by heating the mold and maintaining the temperature of the mold within a range from around a temperature where crystallization speed of the parison becomes maximum to a molten point thereof. In this process, however, since the mold is maintained at this temperature even during a cooling period, it is not so effective to shorten the cooling period. Moreover, the parison is cooled from inside by circulating a coolant in the hollow of the parison, making the temperature control complicate for maintaining the mold temperature at the above temperature.

The apparatus of Japanese Patent Publication No. 73903/1994 performs heating and cooling by passing a heating and cooling medium through a plurality of communication holes provided in inside and backside of the shell (mold surface portion) where the molding surface is formed, and by feeding a heating and cooling medium within the intermediate region at the backside of the molding surface. In the case of this apparatus, since heat transmission in the intermediate region is moderate, a cycle time can not be made shorter.

SUMMARY OF THE INVENTION

It is an object of the present invention to produce a molded resin article having a clear mirror surface or a grained surface with a relatively short cycle time.

Another object of the present invention to produce a molded resin article having a good surface quality through a relatively simple process.

A further object of the present invention is to provide a mold which can satisfactorily withstand to a pressure to be exerted on the molding surface by a molten resin and can provide sufficient durability with satisfactorily long life of the mold, even if the mechanical strength cannot be sufficient due to a relatively thin mold body forming the molding surface.

In a first aspect of the present invention, there is provided a molding apparatus for obtaining a molded product by firmly fitting a molten thermoplastic resin onto a molding surface of a mold under a pressure lower than or equal to 100 kg/cm² and curing, comprising:

a mold main body;

a mold body on which the molding surface is defined;

supporting means for supporting the mold body relative to the mold main body with maintaining a space on the back side of the molding surface in a heat insulative manner, the supporting means including at least a heat insulative supporting member having a thermal conductivity of 0.001 to 1 Kcal/mh °C. and a longitudinal elastic modulus of 0.01 to 10 kg/cm²;

heating means for heating the molding surface from the bask side thereof to a temperature higher than or equal to Vicat softening temperate (T) °C. of the thermoplastic resin; and cooling means for cooling the molding surface from the back side thereof to a temperature lower than or equal to (Vicat softening temperature (T) of the thermoplastic resin −10) °C.

The supporting means may include a sealing member for sealing the space with accommodating relative displacement between the mold body and the mold main body due to the differences of thermal expansion.

The heating means may include means for supplying a heating medium into the space at a given timing.

The heating means may include a heating fluid having modulus of elasticity of volume of 1×10⁴ to 4.5×10⁴ kg/cm² the heating fluid being supplied into the space at a given timing and held therein.

A molding apparatus may further comprise:

control means for controlling introduction and discharge of a fluid into and from the space, and pressure control means for controlling pressure of the fluid in the space corresponding to pressure to be exerted onto the molding surface, The heating means may include a radiation heating device arranged at a position in the space opposing to the back side of the molding surface.

A molding apparatus may further comprise:

at least one partitioning wall for dividing the space into a plurality of spaces each including a part of the back side of the molding surface as an internal periphery, and wherein the heating means heats the internal periphery of the divided spaces independently, A molding apparatus may further comprise:

first pressurized fluid supply means for supplying a pressurized fluid into the space;

second pressurized fluid supply means for supplying a pressurized fluid depressing the thermoplastic resin onto the molding surface the molding surface side; and pressure adjusting means for following the pressure of one of the pressurized fluids to the pressure of the other pressurized fluid.

The cooling means may include means for supplying a cooling fluid into the space at a given timing.

The cooling fluid may be a liquid state cooling medium, and further comprising:

means for forcedly removing the liquid state cooling medium depositing and residing on the back side of the molding surface in the space.

In a second aspect of the present invention, there is provided a blow molding process employing a molding apparatus comprising:

a mold main body;

a mold body on which a molding surface is defined;

supporting means for supporting the mold body relative to the mold main body with maintaining a space on the back side of the molding surface in a heat insulative manner, the supporting means including at least a heat insulative supporting member having a thermal conductivity of 0.001 to 1 Kcal/mh°C. and a longitudinal elastic modulus of 0.01 to 10 kg/cm²;

heating means for heating the molding surface from the bask side to a temperature higher than or equal to Vicat softening temperate (T) °C. of a thermoplastic resin; and cooling means for cooling the molding surface from the back side thereof to a temperature lower than or equal to (Vicat softening temperature (T) of the thermoplastic resin −10) °C., the process comprising the steps of:

supplying a parison of a thermoplastic resin having a longitudinal elastic modulus at a temperature of (Vicat softening temperature (T) +100) °C. between the molding surfaces;

firmly fitting the outer surface of the parison onto the molding surfaces by applying a pressure less than or equal to 100 kg/cm² from inside of the parison;

elevating temperature of the molding surface at a temperature higher than or equal to the Vicat softening temperature (T) °C. by heating the molding surface from the back side thereof by the heating means; and cooling the molding surface down to a temperature lower than or equal to (Vicat softening temperature −10) ° C. by cooling the molding surface from the back side thereof by the cooling means.

The heating by the heating means may be performed simultaneously with firm fitting of the parison onto the molding surface or after firmly fitting of the parison onto the molding surface.

A blow molding process may further comprise a step of:

supplying a resin film between the parison and the molding surface.

In a third aspect of the present invention, there is provided a blow molding process employing a molding apparatus comprising:

a mold main body;

a mold body on which a molding surface is defined;

supporting means for supporting the mold body relative to the mold main body with maintaining a space on the back side of the molding surface in a heat insulative manner, the supporting means including at least a heat insulative supporting member having a thermal conductivity of 0.001 to 1 Kcal/mh °C. and a longitudinal elastic modulus of 0.01 to 10 kg/cm²;

heating means for heating the molding surface from the back side to a temperature higher than or equal to Vicat softening temperate (T) °C. of a thermoplastic resin; and cooling means for cooling the molding surface from the back side thereof to a temperature lower than or equal to (Vicat softening temperature (T) of the thermoplastic resin −10) °C., the process comprising the steps of:

supplying a parison of a thermoplastic resin having a longitudinal elastic modulus at a temperature of (Vicat softening temperature (T) +100) °C. between the molding surfaces;

supplying a foaming component within the parison;

firmly fitting the outer surface of the parison onto the molding surfaces by applying a pressure less than or equal to 100 kg/cm² from inside of the parison;

elevating temperature of the molding surface at a temperature higher than or equal to the Vicat softening temperature (T) °C. by heating the molding surface from the back side thereof by the heating means, and in conjunction therewith causing foaming of the foaming component; and cooling the molding surface down to a temperature lower than or equal to (Vicat softening temperature −10) °C. by cooling the molding surface from the back side thereof by the cooling means.

In a fourth aspect of the present invention, there is provided a blow molding process employing a molding apparatus comprising:

a mold main body;

a mold body on which molding surfaces is defined;

supporting means for supporting the mold body relative to the mold main body with maintaining a space on the back side of the molding surface in a heat insulative manner;

heating means for heating the molding surface from the bask side thereof;

cooling means for cooling the molding surface from the back side thereof;

first pressurized fluid supply means for supplying a pressurized fluid into the space;

second pressurized fluid supply means for supplying a pressurized fluid for depressing a thermoplastic resin onto the molding surface to the molding surface side, the process comprising the steps of:

supplying a parison of a thermoplastic resin between the molding surfaces;

firmly fitting the outer surface of the parison onto the molding surfaces by applying pressure of a fluid supplied into the parison by the second pressurized fluid supply means, and in conjunction therewith following pressure of the fluid supplied from one of the first and second pressurized fluid supply means pressure of the fluid supplied from the other of the first and second pressurized fluid supply means;

heating the molding surface from the back side by the heating means; and cooling the molding surface from the back side by the cooling means.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIG. 11 is a longitudinal sectional view showing a mold half of the seventh embodiment of the molding apparatus according to the invention;

FIG. 21 is a timing chart showing a timing of respective step of the molding process;

FIG. 23A is a diagrammatic sectional view showing a condition of water deposited on the back side of the molding surface in the case where cooling water is uniformly injected to the back side of the molding surface of the mold;

FIG. 23B is an explanatory illustration showing temperature measuring points of the molding surface;

DESCRIPTION OF THE PREFERRED EMBODIMENT

Figure 1B:
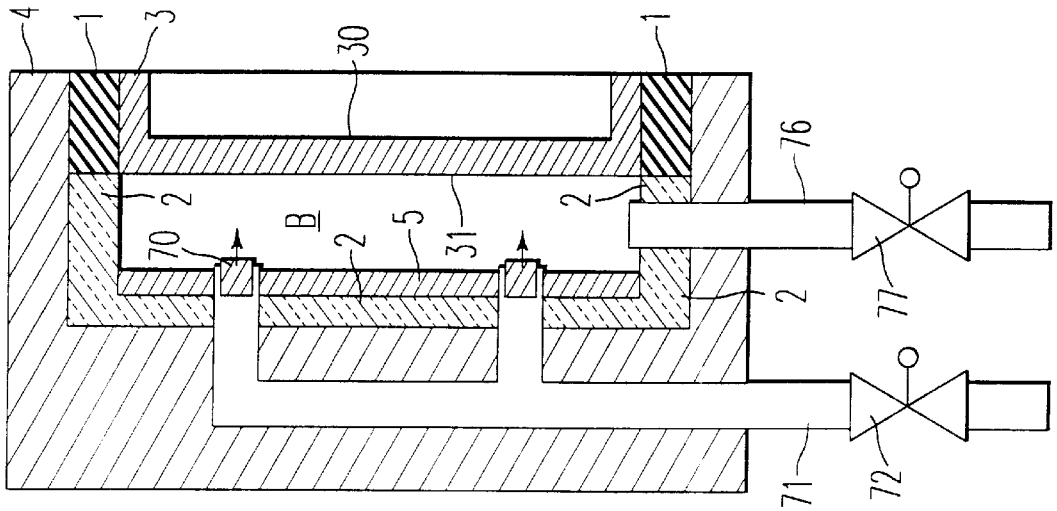
FIG. 1B is a longitudinal sectional view showing a mold half of the second embodiment of the molding apparatus according to the invention.

The preferred embodiments of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessarily obscure the present invention. It should be further noted that like reference numerals refer to like elements throughout the description and the drawings.

Figure 1A:
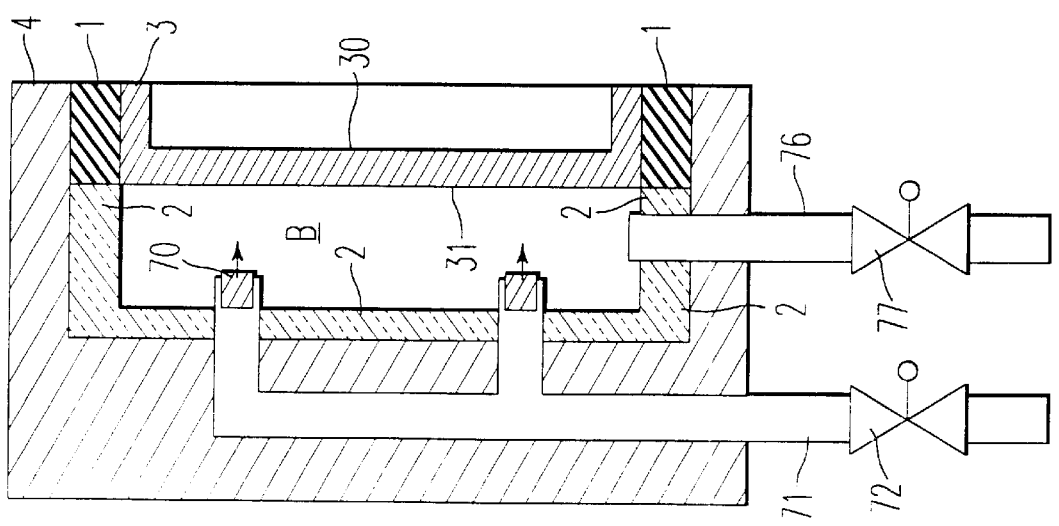
FIG. 1A is a longitudinal sectional view showing a mold half of the first embodiment of the molding apparatus according to the present invention.
Figure 3A:
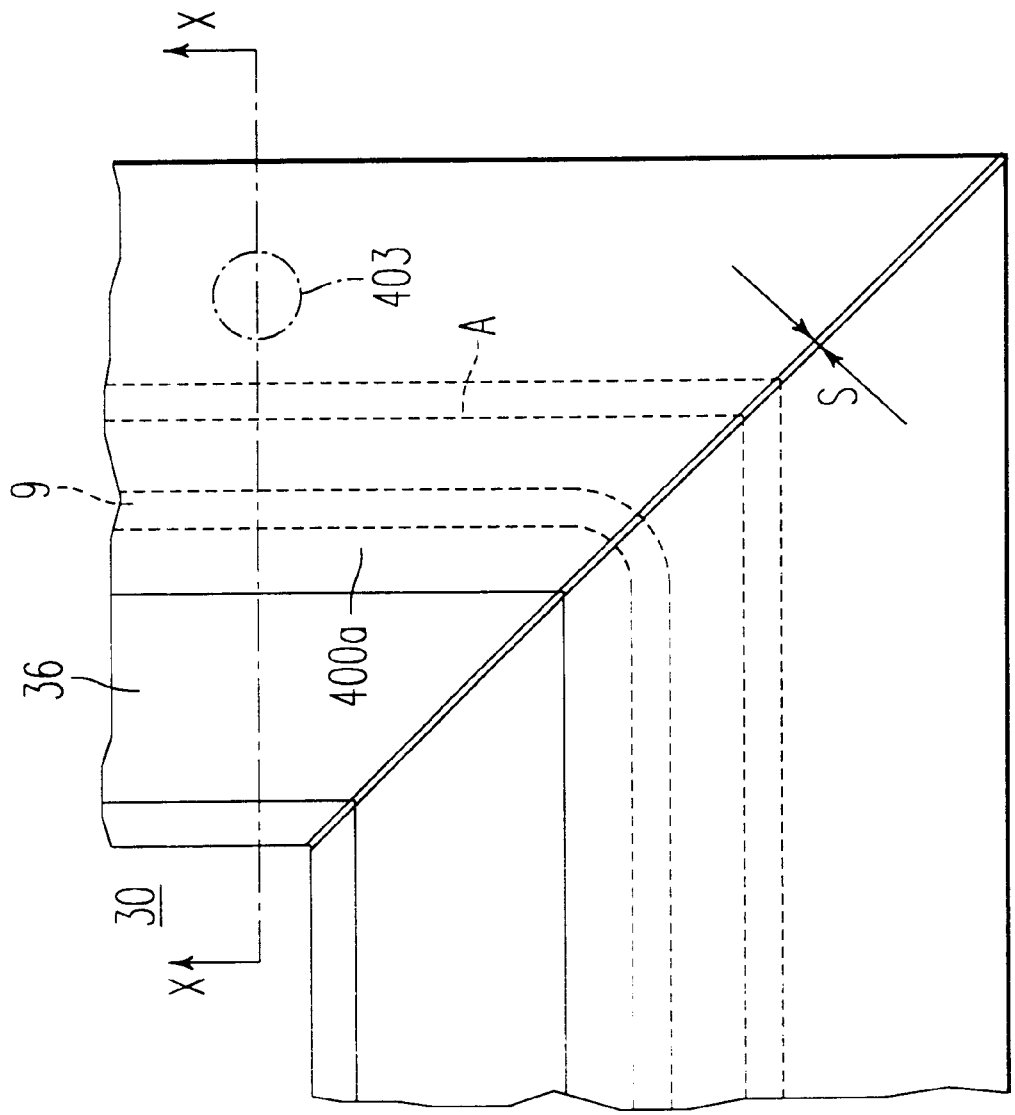
FIG. 3A is a plan view showing a corner portion of the mold common to all of the embodiments.
Figure 3B:
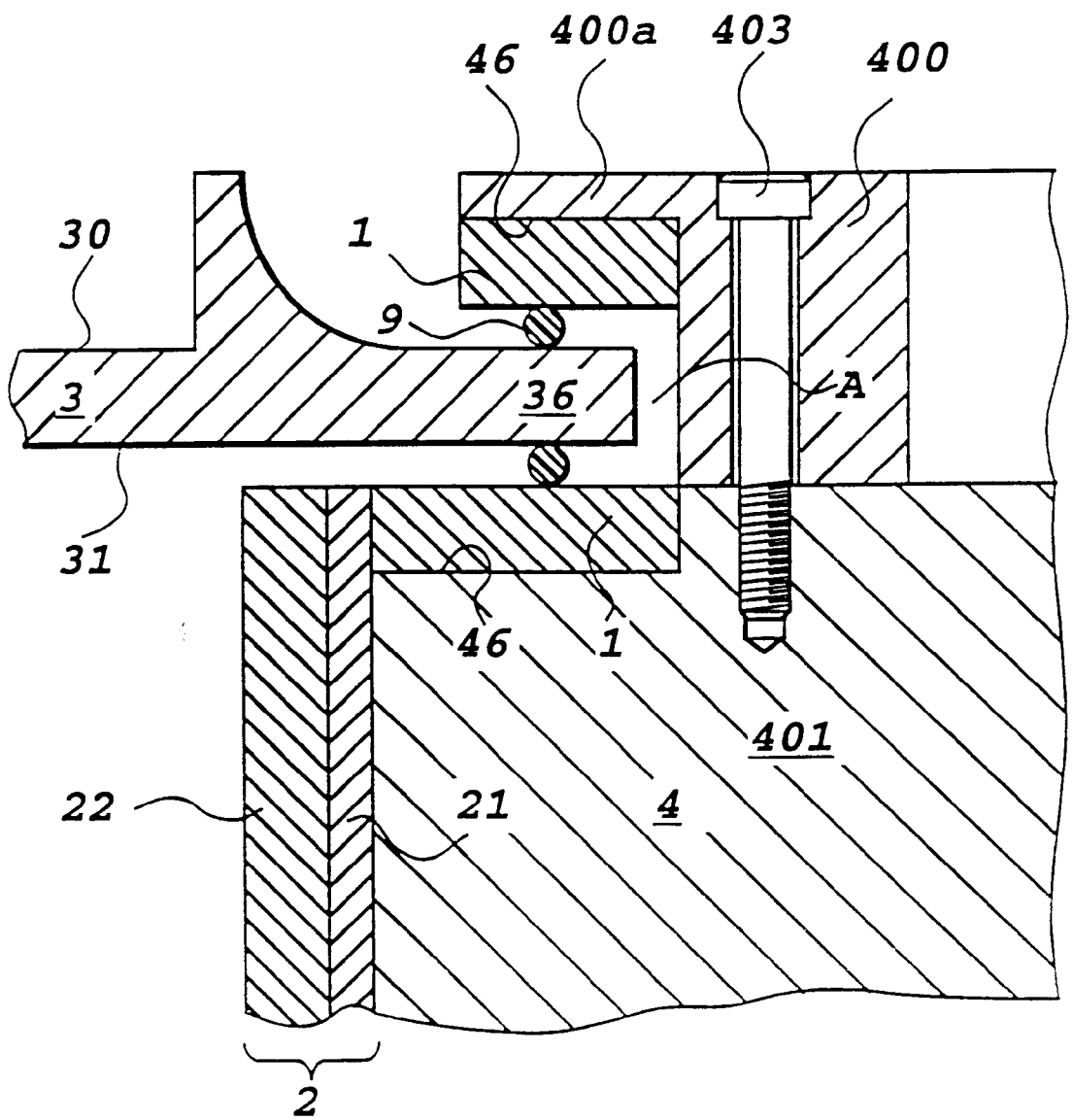
FIGS. 3B, 3C, 3D and 3E are sectional views taken along line X—X of FIG. 3A and showing a variety of modifications thereof, respectively.

FIG. 1A shows a mold half in the first embodiment of a molding apparatus constituted of a pair of left and right mold halves according to the present invention. FIGS. 3A and 3B show details of a mounting structure at a corner portion of the mold half common to respective embodiments. Each mold half includes a shell-like mold body 3 having a molding surface 30 which defines a mold cavity and a main body 4 supporting the mold body 3. It should be noted that both of the mold body 3 and the main body 4 are formed of stainless steel. A space B is defined between the mold body 3 and the main body 4, namely between the back side surface of the molding surface 30 and the main body 4.

As shown in FIGS. 3A and 3B, a plate to be supported (hereinafter referred to as a flange 36) extending from periphery of the mold body 3 is loosely accommodated within a groove 46 provided in the main body 4 corresponding thereto, with a play A. The mold body 3 is supported by the main body 4 via a heat insulative support member 1 and a sealing member. It should be noted that the groove 46 is formed by securing a main body panel 400 having an extended portion 400a onto a main body base portion 401 by means of a fastening bolt 403. On the other hand, as shown in FIG. 3A, at the end portions of each of four main body panels 400 which are arranged into a quadrangular configuration as viewed from the above, with a clearance S of approximately 0.1 mm with respect to adjacent panel 400. Both opposing wall portions of the groove 46, a heat insulation layer (heat insulative support member) 1 of a phenol resin in a thickness of 10 mm is provided. Also, in a clearance defined between each of the front and back surfaces of the flange 36 and the heat insulative supporting member 1 of the opposing both walls of the groove, an O-ring 9 is fitted. Therefore, even when the mold body 3 and the main body 4 thermally expand during molding of the molten resin resulting in relative displacement between the flange 36 and the groove 46, such displacement is accommodated with the play A. Therefore, harmful influence (deflection, distortion or bending of the mold, shortening of life and so forth) of the thermal expansion can be successfully prevented. Therefore, precise molded products can be obtained. On the other hand, since the mold body 3 is supported on the main body 4 via the heat insulative layer of the phenol resin satisfying a condition (material having longitudinal elastic modulus of $0.1 \times 10^4$ to $100 \times 10^4$ $kg/cm^2$) of the present invention, jolting or other nonconformity can be prevented.

The heat insulative supporting member 1 is formed of a material having a thermal conductivity coefficient in a range of 0.001 to 1 kcal/mh °C., preferably 0.005 to 0.8 kcal/mh °C., and more preferably in a range of 0.01 to 0.5 kcal/mh °C., and a longitudinal elastic modulus of $0.1 \times 10^4$ to $100 \times 10^4$ $kg/cm^2$, preferably $0.2 \times 10^4$ to $40 \times 10^4$ $kg/cm^2$, and further preferably in a range of $1 \times 10^4$ to $20 \times 10^4$ $kg/cm^2$. Also, the heat insulative supporting member 1 may be a laminated structure of a material having thermal conductivity coefficient in a range of 0.001 to 1 kcal/mh °C., preferably 0.005 to 0.8 kcal/mh °C., and more preferably in a range of 0.01 to 0.5 kcal/mh °C., and a material having a longitudinal elastic modulus of $0.1 \times 10^4$ to $100 \times 10^4$ $kg/cm^2$, preferably $0.2 \times 10^4$ to $40 \times 10^4$ $kg/cm^2$, and further preferably in a range of $1 \times 10^4$ to $20 \times 10^4$ $kg/cm^2$. Namely, any material of heat insulative supporting material which can thermally insulate the mold body 3 and the main body 4 and can certainly prevent jolt between the mold body 3 and the main body 4 against depression force to be exerted from the side of the mold body 3 to the side of the main body 4.

It should be noted that reason of selection of the above-identified range of the thermal conductivity coefficient of the heat insulative supporting member 1, is that when the thermal conductivity coefficient is less than 0.001 kcal/mh °C., special material is required and thus is impractical, and when the thermal conductivity coefficient exceeds 1 kcal/mh °C., desired heat insulation effect cannot be obtained. Also, the reason why the above-identified range of the longitudinal elastic modulus is selected is that if the longitudinal elastic modulus is smaller than $0.1 \times 10^4$ $kg/cm^2$, stiffness becomes insufficient to make seal insufficient, and when the longitudinal elastic modulus exceeds $100 \times 10^4$ $kg/cm^2$, processing of the heat insulating supporting portion becomes difficult.

A material having thermal conductivity coefficient in the range of 0.001 to 1 kcal/mh° C. and the longitudinal elastic modulus in the range of $0.1 \times 10^4$ to $100 \times 10^4$ $kg/cm^2$, may be selected among polyarylate, polyether ether ketone, polyphenylene oxide, degenerated polyphenylene oxide, polyamide, acetal resin, ethylene tetrafluoride type resin, ceramics, PC, phenol resin, urea resin, melamine, glass unsaturated polyester and so forth, more preferably phenol resin, urea resin, melamine and unsaturated polyester, and further preferably phenol resin.

A space B defined between the back side of the mold body 3 and the main body 4 is sealingly closed by the O ring 9.

Therefore, leakage of heating steam or heating oil as a heating fluid supplied and filled through a valve 72, a piping 71 and a nozzle 70 in the space B during heating, and cooling air or cooling oil filled similarly in the space B during cooling, through connecting portion of the mold body 3 and the main body 4 (portion where the mold body 3 is supported by the main body 4, i.e. portion of the flange 36 and the groove 46), lowering of the pressure in the space B at the occurrence of the leakage above, and distortion of the molding surface 30 caused by lowering of pressure, can be successfully prevented.

In the above embodiment, O-ring is used as a sealing member, other materials, for example, a synthetic resin sheet, a synthetic rubber sheet, felt, leather, cork and so forth can be used. Moreover, since the mold body 3 is heated up to Vicat softening temperature or more, it is required that these materials should withstand such temperatures.

Figure 3C:
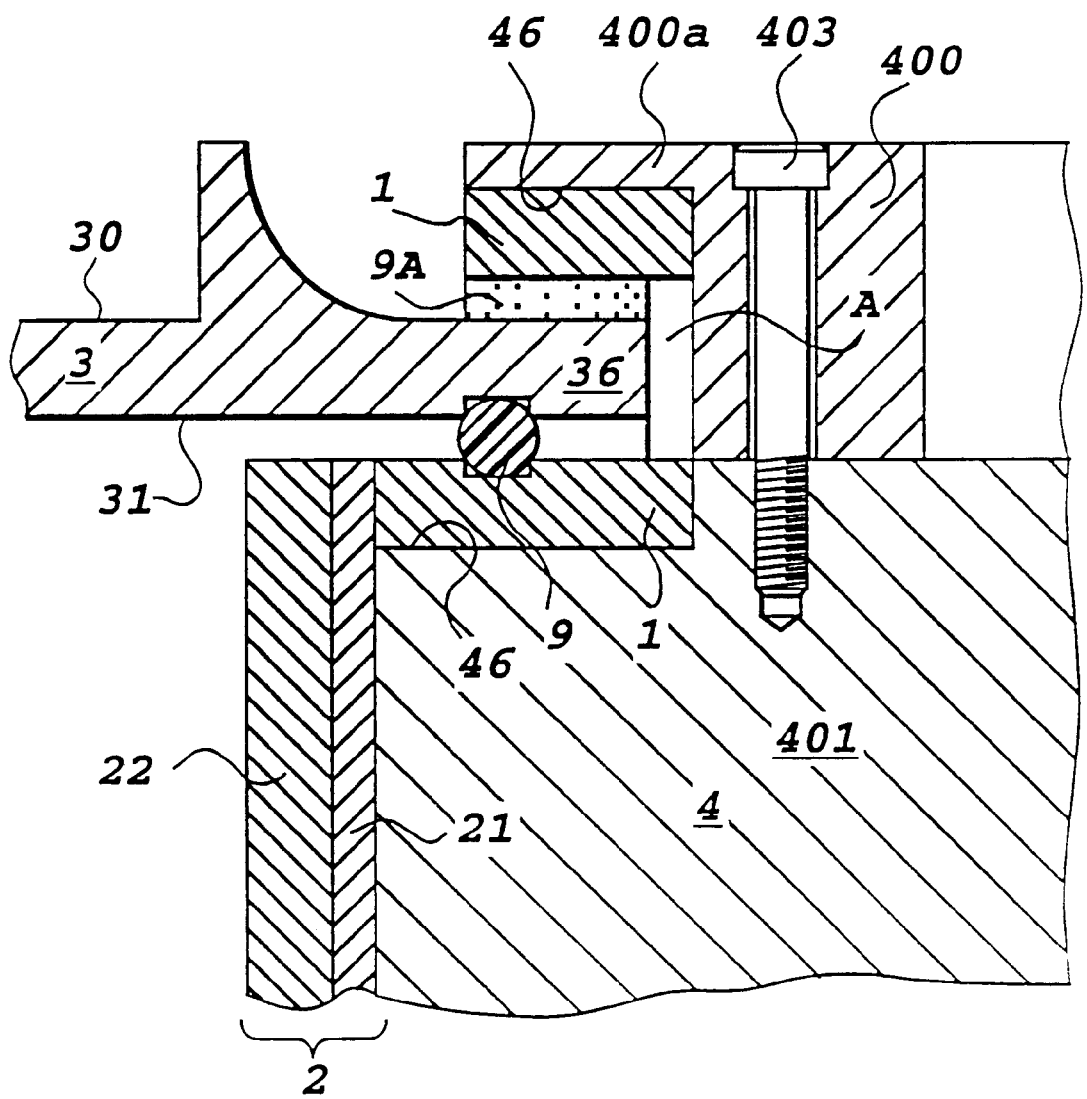
Figure 3D:
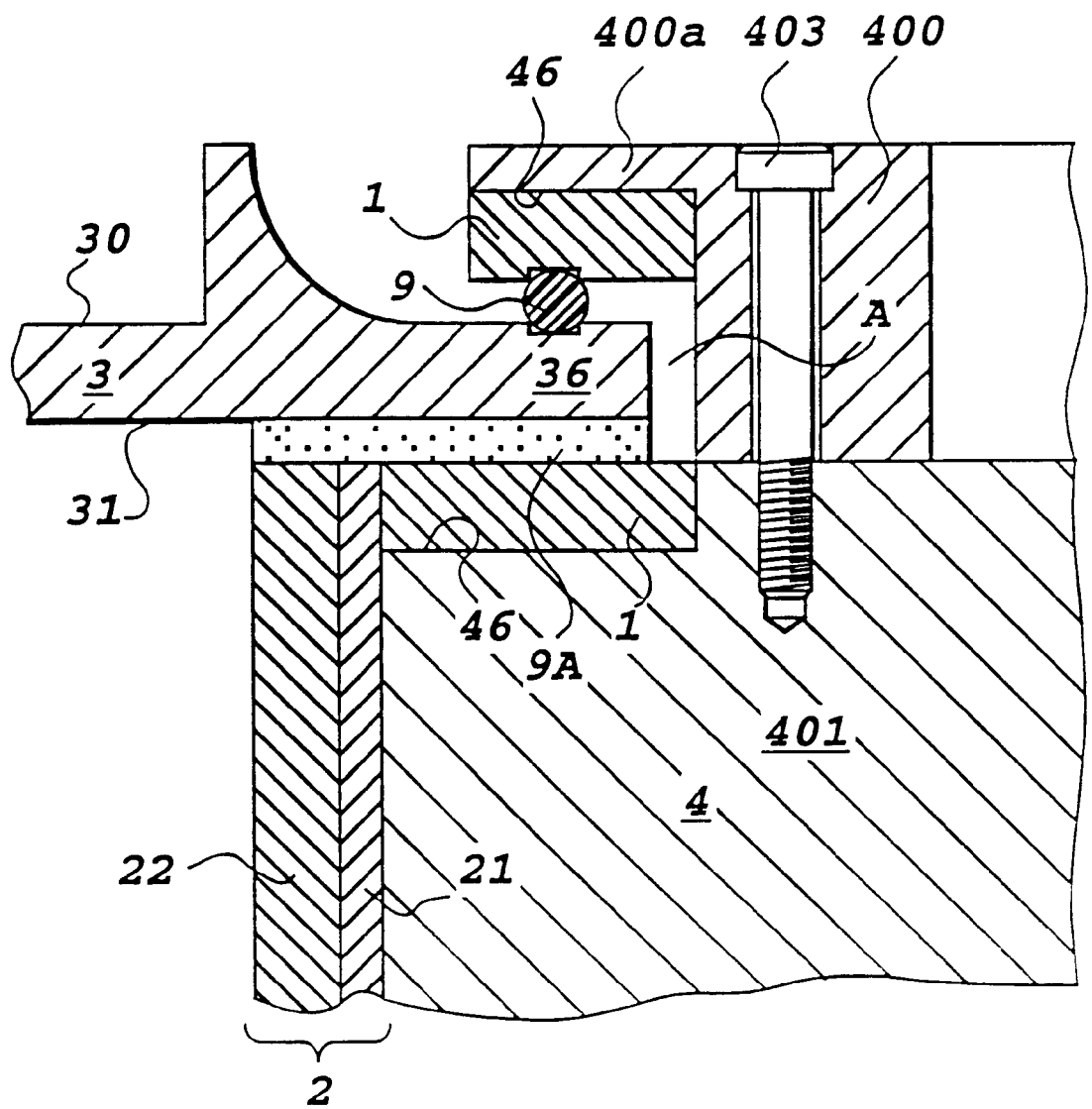
Figure 3E:
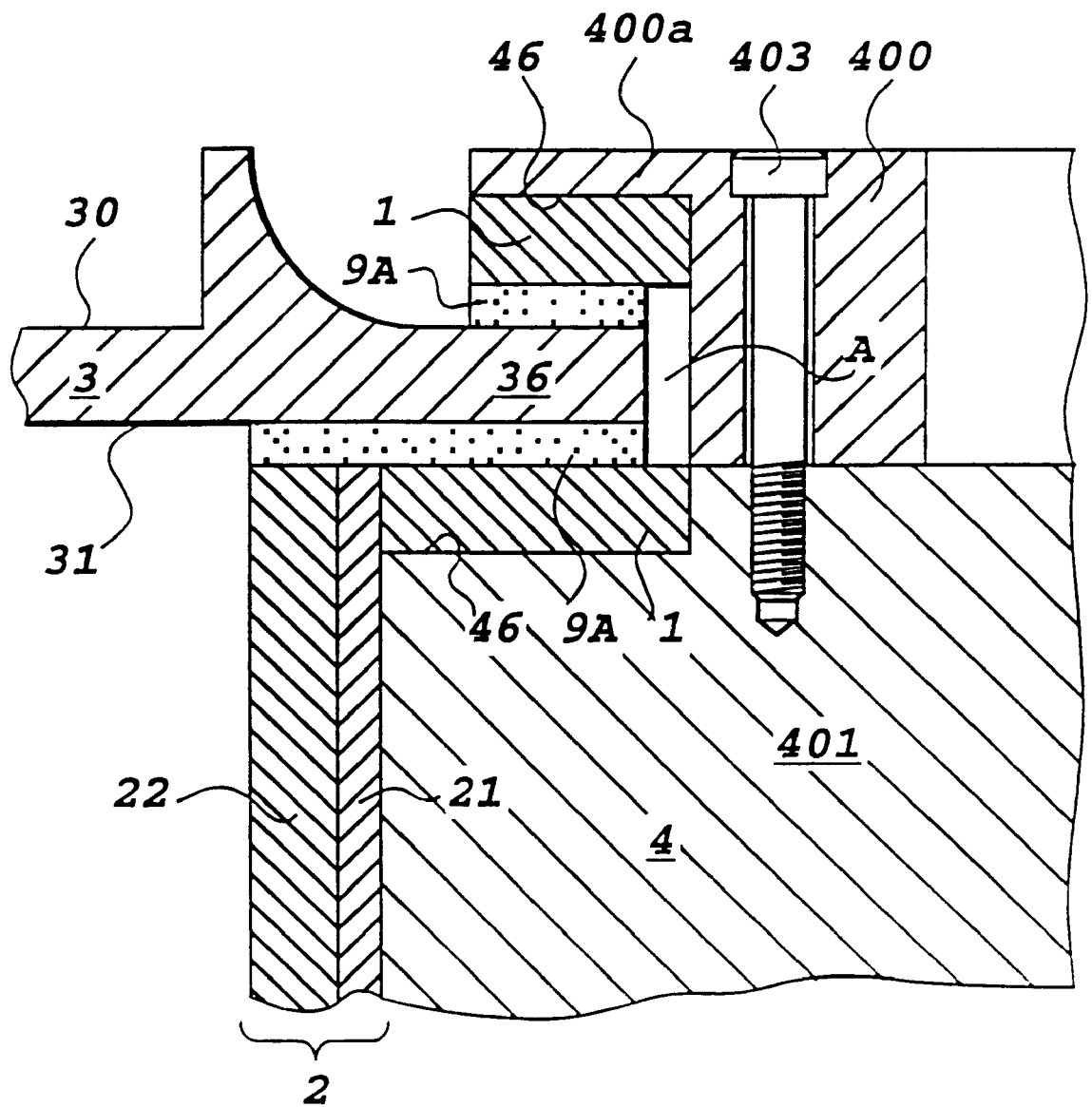

It should be noted that while the O rings 9 as the sealing member are disposed at both sides of the flange 36, it is possible to employ other forms in combination with other sealing member. For example, as shown in FIGS. 3C and 3D, it is possible to form one with a sheet form sealing member 9A. On the other hand, it is also possible to arrange the sheet form sealing members 9A at both sides of the flange 36, as shown in FIG. 3E.

Furthermore, to the space B, heating medium or cooling medium are selectively supplied via the nozzle 70, the piping 71 communicated with the nozzle, and the valve 72 openably closing the piping 71. On the other hand, heating medium or cooling medium is discharged via a piping 76 and a valve 77 openably closing the piping 76.

It should be noted that, as shown in FIG. 3B in detail, a heat insulation layer (heat insulation member) 2 consisted of a 10 mm thick phenol resin layer 22 and 2 mm thick asbestos layer 21 are provided on the inner surface of the main body 4 facing the space B. Therefore, escaping of the heat of the heating medium in the space B through the main body 4 and penetration of the external heat to the cooling medium through the main body 4, and other nonconformity can be avoided. Therefore, lowering of the temperature of the heating steam supplied to the space B can be prevented to improve transfer ability of the molding surface and dimensional stability.

As the heat insulation member 2, polyarylate, polyether ether ketone, polyphenylene oxide, degenerated polyphenylene oxide, polyamide, acetal resin, ethylene tetrafluoride type resin, ceramics, PC, phenol resin, urea resin, melamine, glass unsaturated polyester, asbestos, hard urethan form, rock wool, glass wool, calcium silicate, polystylene foam, water repellant pearlite, cork, wood (cedards), rubber, quartz glass, foamed beads and so forth, may be employed alone or in combination therewith. Preferably, phenol resin, urea resin, melamine, unsaturated polyester, asbestos, hard urethan form, foamed beads may be employed.

"First Example"

Figure 4A:
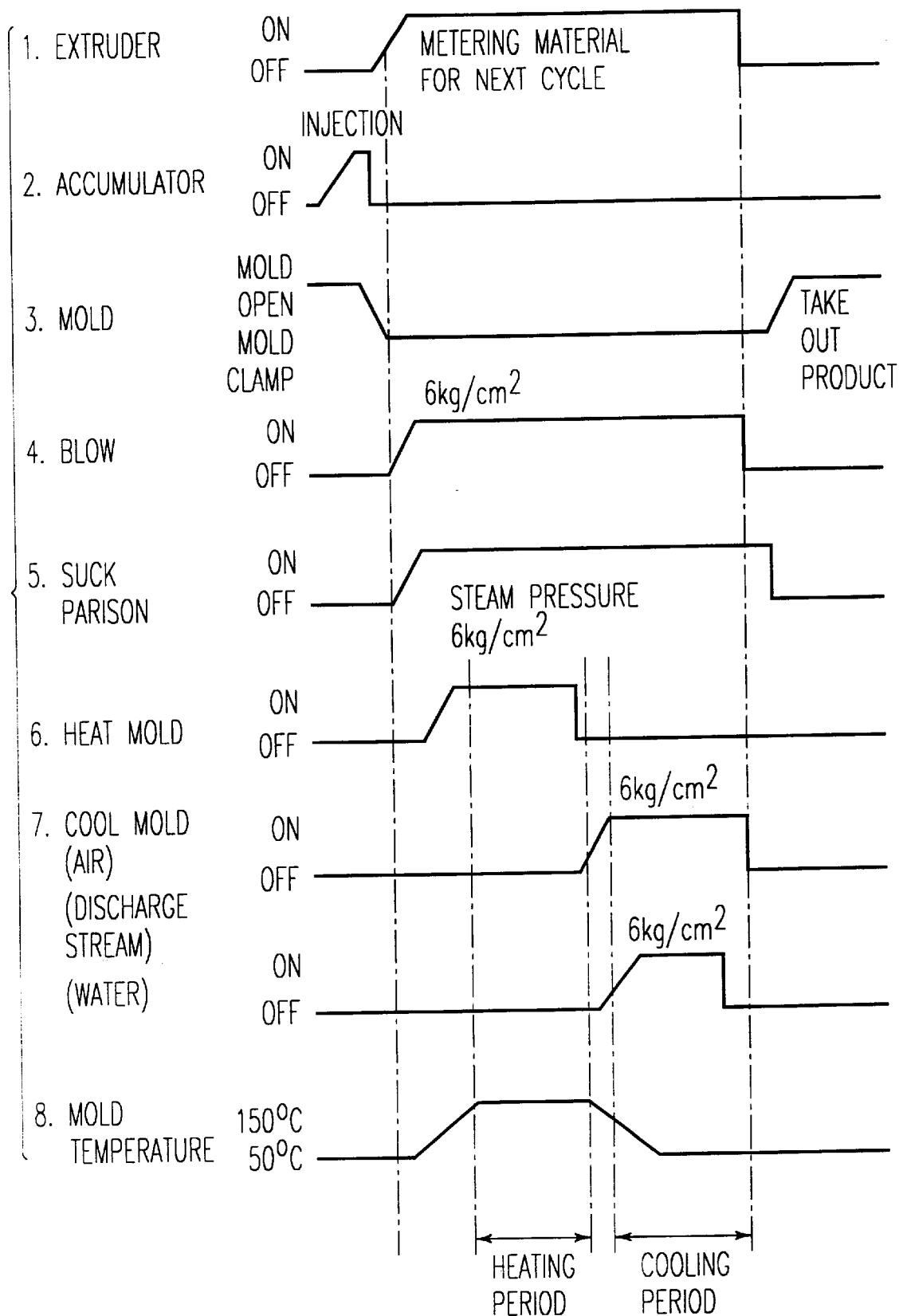
FIGS. 4A, 4B, 4C and 4D are timing charts showing timings of respective process of the blow molding in examples 1, 4, 5 and 7, respectively.

As a thermoplastic resin material, ABS45A (manufactured by Japan Synthetic Rubber Co., Ltd., Vicat softening temperature is 105° C., longitudinal elastic modulus at 205° C. is 0.3 kg/cm$^2$) was employed, and as a blow molding apparatus, IPB-EP-55 (Ishikawajima Harima Heavy Industries Co., Ltd.) was employed. Blow molding was performed at a timing of FIG. 4A under following conditions. Namely, the conditions were:

| (1) | Extrusion Temperature: | 220° C. |
|---|---|---|
| (2) | Clamping Force: | 15 ton |
| (3) | Parison Blowing Pressure: | 6 kg/cm$^2$ |
| (4) | Heating of Molding surface 30 | |
| | Pressure of Heating Steam Injected from Nozzle 70: | 6 kg/cm$^2$ |
| | Final Heating Temperature of Molding surface 30: | 140 to 150° C. |
| | Heating Holding Time of Molding surface 30: | 10 sec |
| (5) | Cooling of Molding surface 30 | |
| | Pressure of (Cooling Water + Air) Injected from Nozzle 70: | 6 kg/cm$^2$ |
| | Final Cooling Temperature of Molding surface 30: | 70° C. |
| | Cooling Holding Time of Molding surface: | 60 sec |
| | All Cycle Time: | 150 sec |

Comparing a molded article (example) thus molded and a molded article (comparative example) molded without the above (4) heating of the molding surface 30, that is, without heating with supplying heating steam in the space B, in the example, the surface gloss value was 95% and curvature of the corner portion was less than or equal to 0.5, and in the comparative example, the surface gloss value was 20% and the curvature of the corner portion was greater than or equal to 0.5. Namely, transferring performance of the molded product was better in the example so that the molded article having smaller curvature at the corner portion which could not be obtained in the conventional blow molding was able to be accurately formed with high dimensional stability.
It should be noted:

Mold External Dimension=460(L)×560(W)×720(H) mm

Molded Article Dimension=120(L)×40(W)×480(H) mm

[Second Embodiment]

FIG. 1B shows the second embodiment of the mold. Hereinafter, a construction different from the first embodiment will be discussed and the construction common to the first embodiment will be identified by the same reference numerals and the detailed description thereof will be omitted.

The second embodiment is constructed by providing the halogen lamp 5 mounted in the space B as a heating means in addition to the first embodiment.

"Second Example"

Total output of the halogen lamp 5 was 60 kW (one side 30 kW), the final temperature of the molding surface 30 was the same as the first example. It should be noted that while injection of the heating steam is not performed, in heating with the halogen lamp 5, 6kg/cm$^2$ of air was injected from the nozzle 70 and the pressure in the space B was balanced with the parison blowing pressure to be exerted from the side of the molding surface 30.

In this second example, the same effect was obtained as the first embodiment in the surface gloss value and the curvature of the corner portion.

"Third Example"

Injection molding was performed with employing the mold represented by the equivalent diagrammatic illustration to FIG. 1A. Namely, as the thermoplastic resin, ABS15 (manufactured by Japan Synthetic Rubber Co., Ltd., Vicat softening temperature is 100° C., longitudinal elastic modulus at 200° C. is 0.2 kg/cm$^2$) was employed, and as an injection molding apparatus, IS170FA3-5A (K. K. Toshiba Corporation) was employed to perform injection molding under the following conditions:

| (1) Cylinder Temperature: | 210° C. |
|---|---|
| (2) Gate: Side Gates at two positions | |
| (3) Heating of Molding surface 30 | |
| Pressure of Heating Steam Injected from Nozzle 70: | 6 kg/cm² |
| Final Heating Temperature of Molding surface 30: | 140 to 150° C. |
| (4) Cooling of Molding surface 30 | |
| Pressure of (Cooling Water + Air) Injected from Nozzle 70: | 6 kg/cm² |
| Final Cooling Temperature of Molding surface 30: | 50° C. |

Comparing a molded article (example) thus molded with a molded article (comparative example) molded without performing heating of the molding surface 30 of (3), the surface gloss value of the example was 95% and weld was not observed. In contrast to this, the comparative example had the surface gloss value of 85% and weld has been observed. Namely, the example achieved higher surface transferring ability than the comparative example, and achieved superior in avoidance of weld and dimensional stability.

It should be noted:

Mold External Dimension=400(L)×400(W)×350(H) mm

Molded Article Dimension=50(L)×3.2(W)×80(H) mm

[Third Embodiment]

Figure 2B:
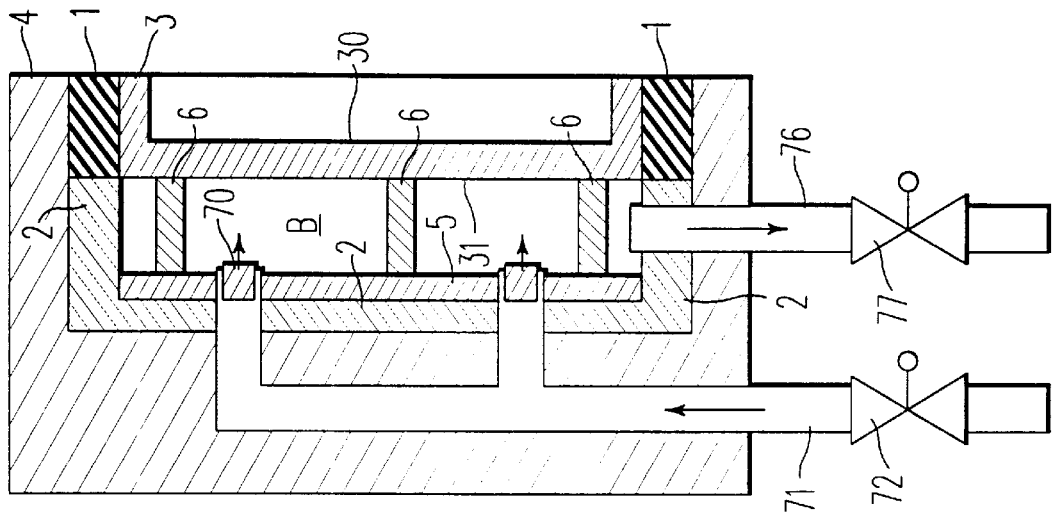
FIGS. 2A and 2B are longitudinal sectional views showing respective mold halves of the third embodiment of the molding apparatus according to the invention.
Figure 2A:
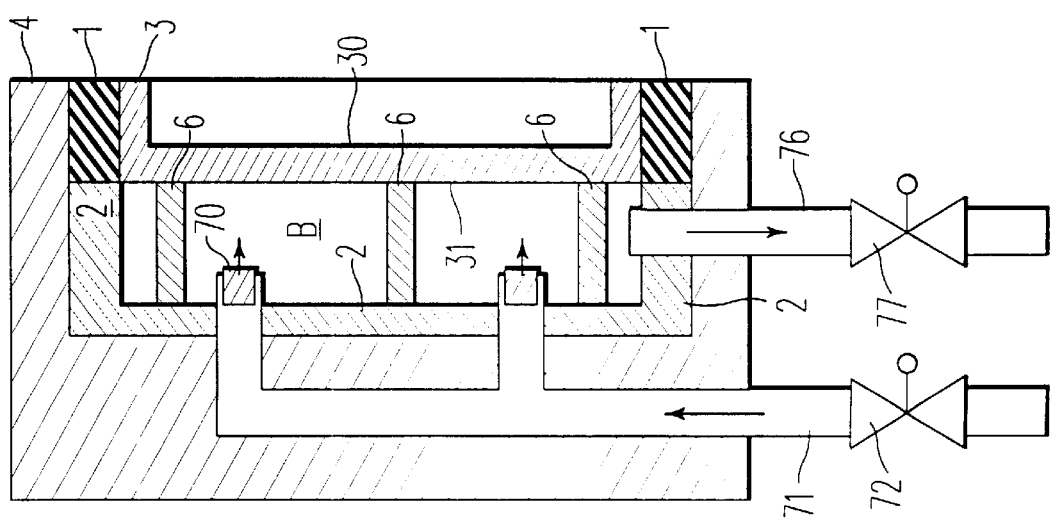

FIG. 2A is a structure providing a plurality of bar-shaped reinforcement ribs 6 between the back surface of the mold body 3 and the inner surface of the main body 4 (surface opposing to the back surface 31 of the mold body) in addition to the mold of FIG. 1A, for supporting at the back side of the mold body 3.

On the other hand, FIG. 2B is a structure providing a plurality of bar-shaped reinforcement ribs 6 between the back surface of the mold body 3 and the inner surface of the main body 4 (surface opposing to the back surface 31 of the mold body) in addition to the mold of FIG. 1B, for supporting at the back side of the mold body 3.

As set forth above, in the third embodiment, since reinforcement ribs 6 are provided, even when the pressure of the heating steam or the cooling water supplied into the space B through the valve 72, the piping 71 and the nozzle 70 under pressure control, becomes smaller than the pressure (parison blowing pressure/injection pressure) applied from the mold surface 30 side of the mold body 3, the mold body 3 can be supported to prevent deformation of the molded article due to distortion of the molding surface 30.

"Fourth Example"

Figure 4B:
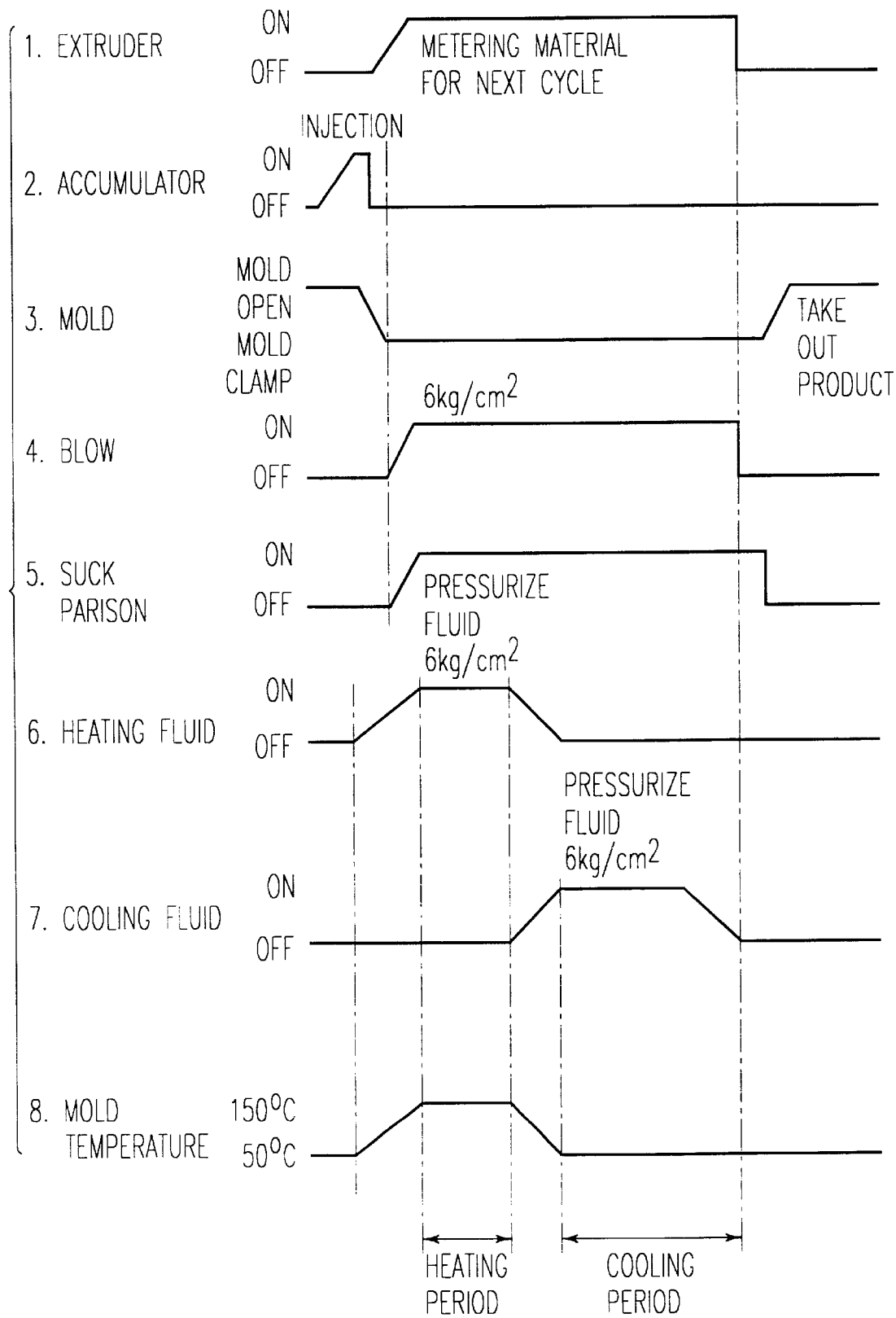

As a thermoplastic resin material, ABS45A (manufactured by Japan Synthetic Rubber Co., Ltd., Vicat softening temperature is 105° C., longitudinal elastic modulus at 205° C. is 0.3 kg/cm²) was employed, and as a blow molding apparatus, IPB-EP-55 (Ishikawajima Harima Heavy Industries Co., Ltd.) was employed. Blow molding was performed at a timing of FIG. 4B under following conditions. Namely, the conditions were:

| (1) Extrusion Temperature: | 220° C. |
|---|---|
| (2) Clamping Force: | 15 ton |
| (3) Parison Blowing Pressure: | 6 kg/cm² |
| (4) Heating of Molding surface 30 | |
| Pressure of Heating Machine Oil filled in Space B: | 6 kg/cm² |
| Final Heating Temperature of Molding surface 30: | 140 to 150° C. |
| Heating Holding Time of Molding surface 30: | 10 sec |
| (5) Cooling of Molding surface 30 | |
| Pressure of Cooling Machine Oil filled in Space B: | 6 kg/cm² |
| Final Cooling Temperature of Molding surface 30: | 70° C. |
| Cooling Holding Time of Molding surface 30: | 60 sec |
| All Cycle Time: | 150 sec |

It should be noted that the machine oil used for heating and cooling was Duffny thermix oil from Idemitsu Kosan Co., Ltd.

Comparing a molded article (example) thus molded and a molded article (comparative example) without the above (4) heating of the molding surface 30, that is, without heating with filling a heating oil in the space B, in the example, the surface gloss value was 95% and curvature of the corner portion was less than or equal to 0.5, and in the comparative example, the surface gloss value was 20% and the curvature of the corner portion was greater than or equal to 0.5. Namely, transferring performance of the molded article was better in the example so that the molded article having smaller curvature at the corner portion which could not be obtained in the conventional blow molding was able to be accurately formed with high dimensional stability. It should be noted:

Mold External Dimension=460(L)×560(W)×720(H) mm

Molded Article Dimension=120(L)×40(W)×480(H) mm

[Fourth Embodiment]

Figure 2C:
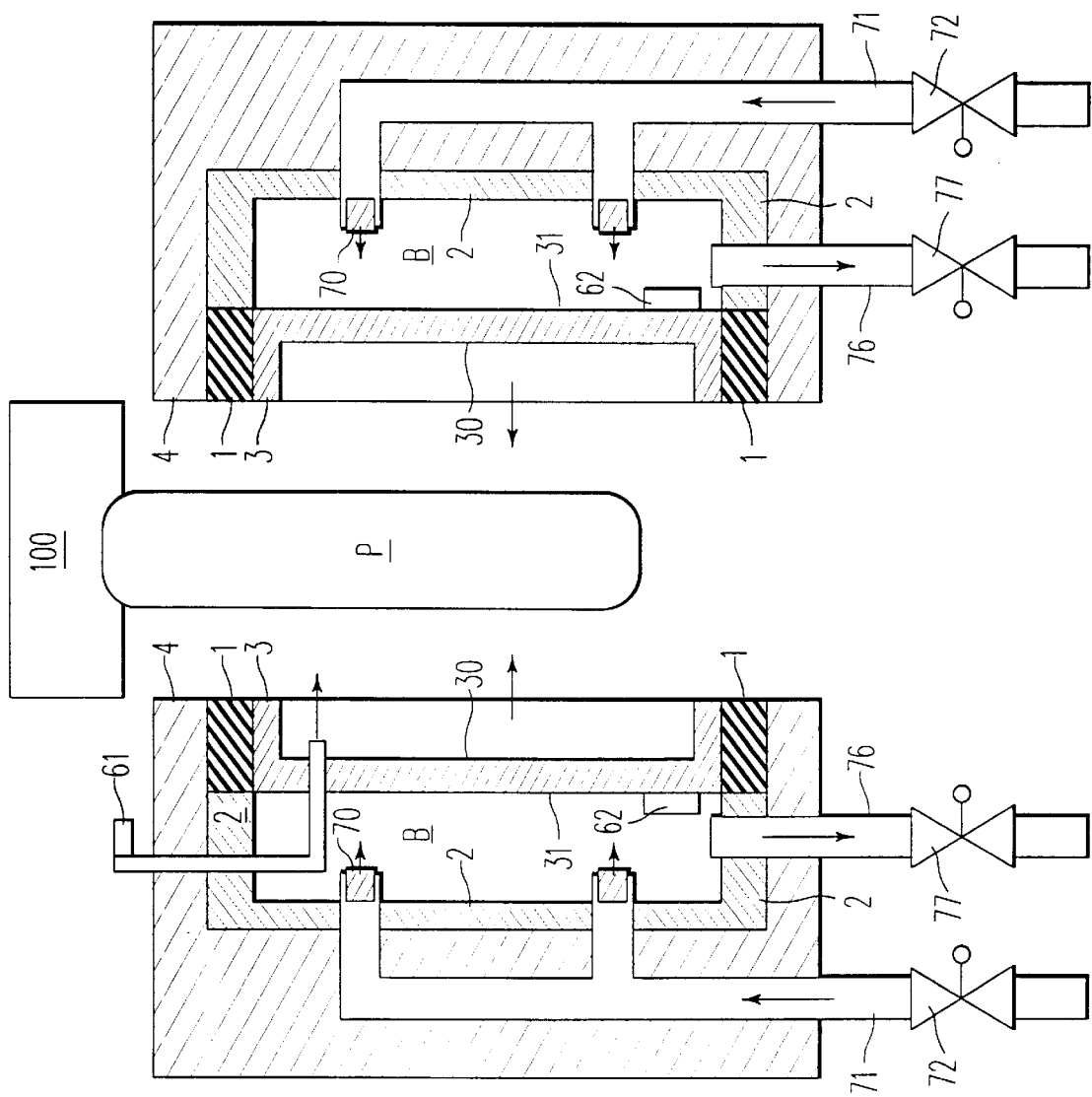
FIG. 2C is a longitudinal sectional view showing the fourth embodiment of the molding apparatus according to the present invention.
Figure 2E:
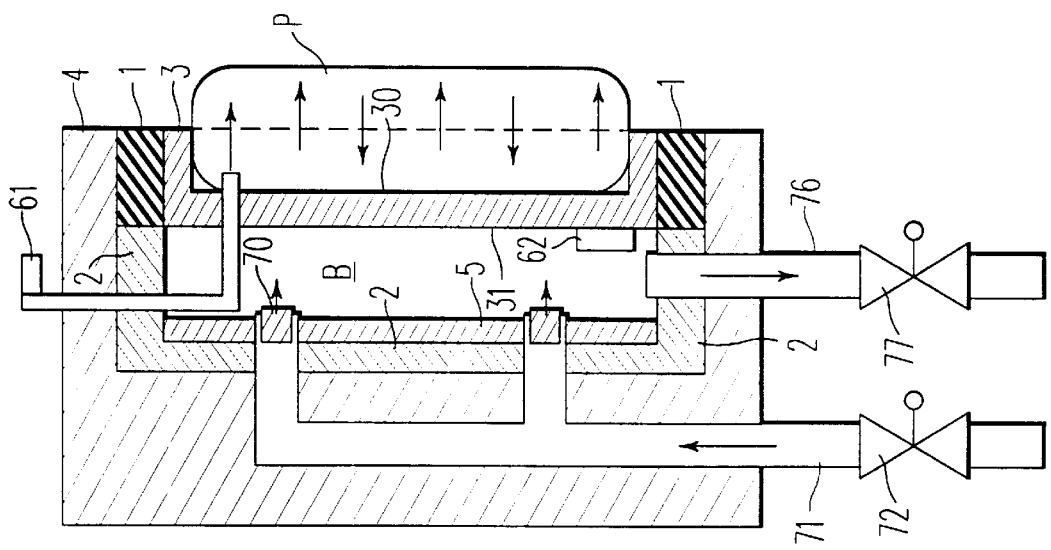
FIGS. 2D and 2E are longitudinal sectional views showing embodiments, in which a sensor for detecting a parison blowing pressure and a sensor for detecting a pressure within a space are provided in the molds of FIGS. 1A and 1B, respectively.
Figure 2D:
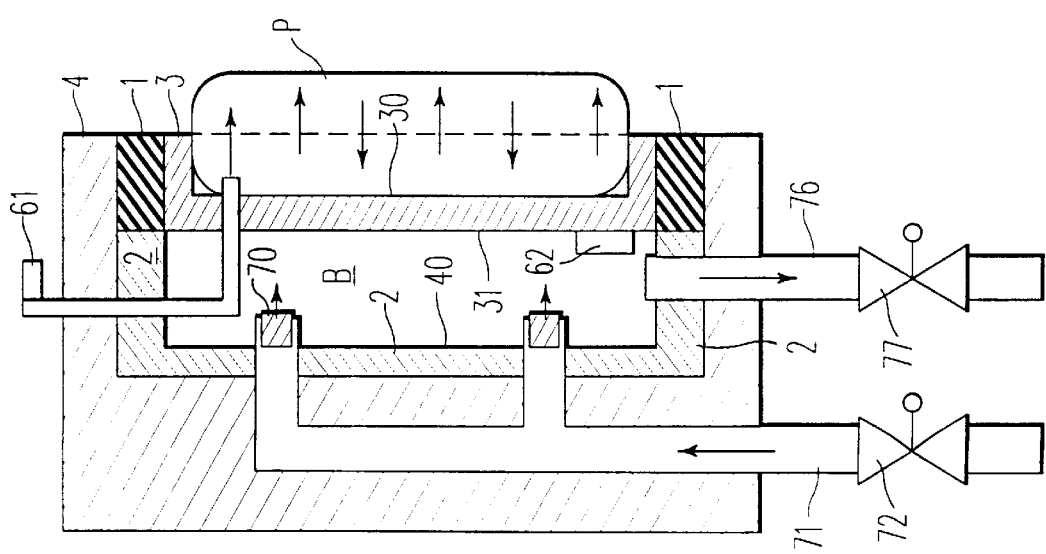
Figure 2F:
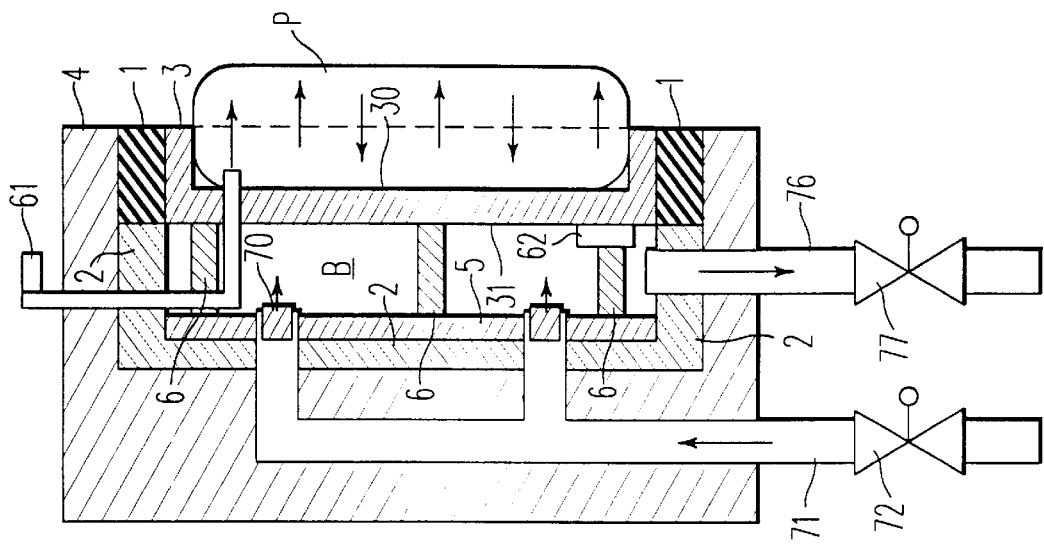
FIGS. 2F and 2G are longitudinal sectional views showing embodiments, in which a sensor for detecting a parison blowing pressure and a sensor for detecting a pressure within a space are provided in the molds of FIGS. 2A and 2B, respectively.
Figure 2G:
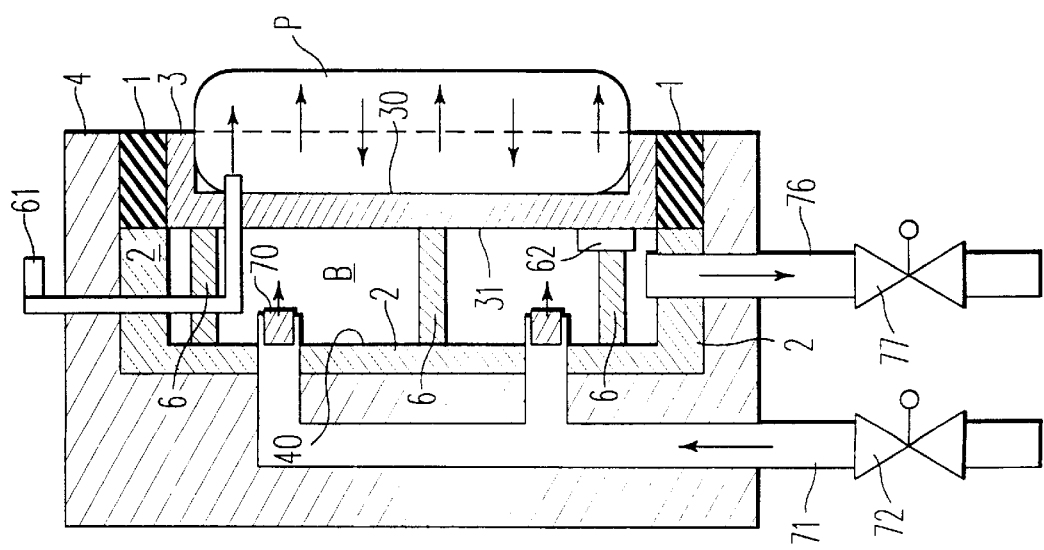

FIG. 2C shows an overall construction of the molding apparatus according to the present invention, constituted of a pair of left and right mold halves. FIGS. 2D and 2E show the fourth embodiment of the mold, in which a sensor 61 for detecting the blowing pressure of the parison P and a sensor 62 for detecting the pressure within the space B are provided in the mold shown in FIGS. 1A and 1B, respectively, and FIGS. 2F and 2G show the fourth embodiment of the mold, in which a sensor 61 for detecting the blowing pressure of the parison P and a sensor 62 for detecting the pressure within the space B are provided in the mold shown in FIGS. 2A and 2B, respectively.

"Fifth Example"

Figure 4C:
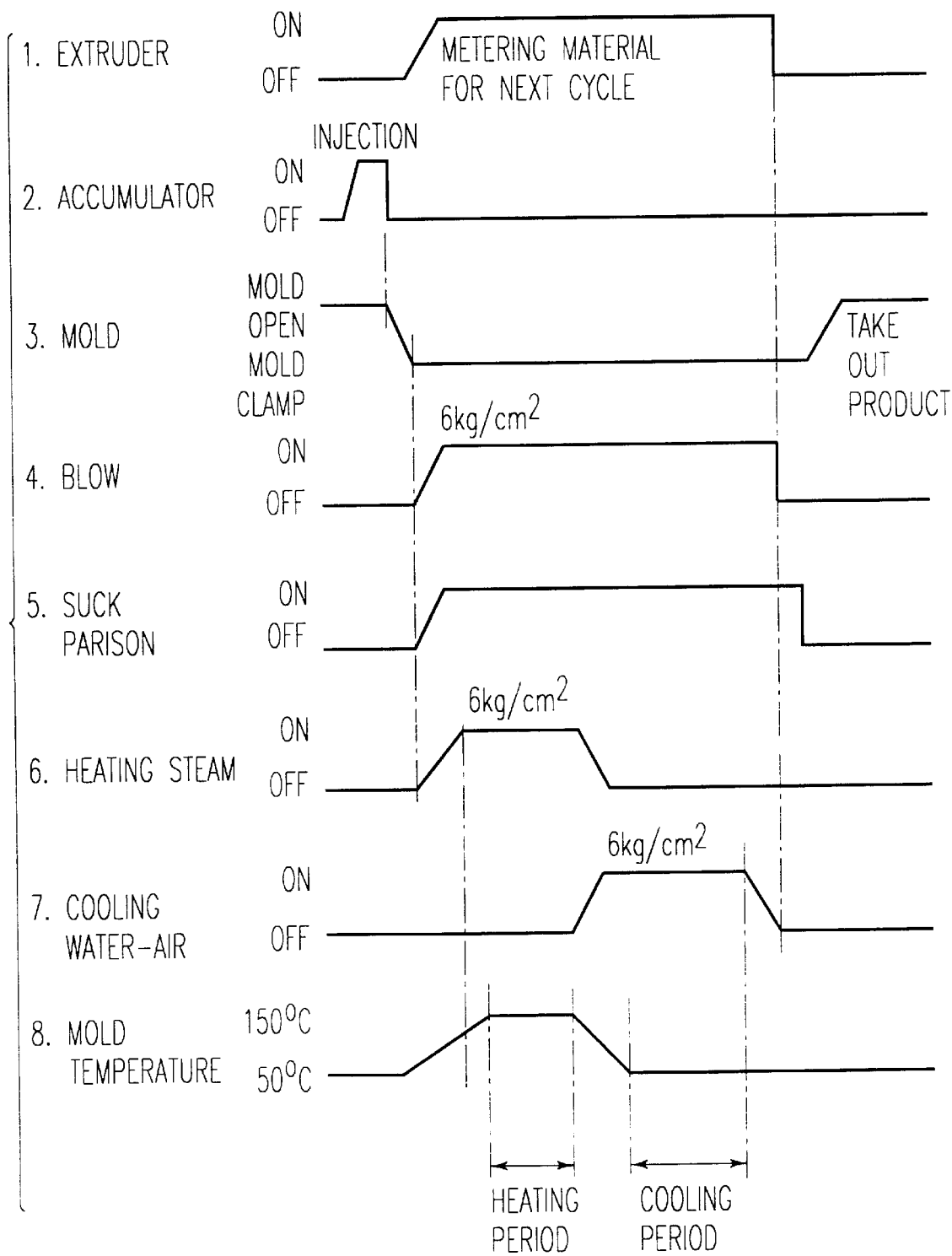

The mold shown in FIG. 2D and, as a thermoplastic resin material, ABS45A (Japan Synthetic Rubber Co., Ltd., Vicat softening temperature is 105° C., longitudinal elastic modulus at 205° C. is 0.3 kg/cm²) were employed, and as a blow molding apparatus, IPB-EP-55 (Ishikawajima Harima Heavy Industries Co., Ltd.) was employed. Blow molding was performed at a timing of FIG. 4C under following conditions. Namely, the conditions were:

| | | |
|---|---|---|
| (1) | Extrusion Temperature: | 220° C. |
| (2) | Clamping Force: | 15 ton |
| (3) | Parison Blowing Pressure: | 6 kg/cm$^2$ |
| (4) | Heating of Molding surface 30 | |
| | Pressure of Heating Steam Supplied to Space B: | 6 kg/cm$^2$ |
| | Final Heating Temperature of Molding surface 30: | 140 to 150° C. |
| | Heating Holding Time of Molding surface 30: | 10 sec |
| (5) | Cooling of Molding surface 30 | |
| | Pressure of (Cooling Water + Air) Supplied to Space B: | 6 kg/cm$^2$ |
| | Final Cooling Temperature of Molding surface 30: | 70° C. |
| | Cooling Holding Time of Molding surface 30: | 60 sec |
| | All Cycle Time: | 150 sec |

It should be noted that the pressure of the heating steam and the blowing pressure of the parison P were balanced by controlling opening degree of the valves 72 and 77 on the basis of the detected values of the pressure sensors 61 and 62. Details will be discussed later.

Comparing a molded article (example) thus molded and a molded article (comparative example) without heating on the forming surface 30 of (4), namely, without heating with supplying heating steam in the space B, in the example, the surface gloss value was 95% and curvature of the corner portion was less than or equal to 0.5, and in the comparative example, the surface gloss value was 20% and the curvature of the corner portion was greater than or equal to 0.5. Namely, transferring performance of the molded article was better in the example so that the molded article having smaller curvature at the corner portion which could not be obtained in the conventional blow molding was able to be accurately formed with high dimensional stability.

It should be noted:

Mold External Dimension=460(L)×560(W)×720(H) mm

Molded Article Dimension=120(L)×40(W)×480(H) mm

Figure 5:
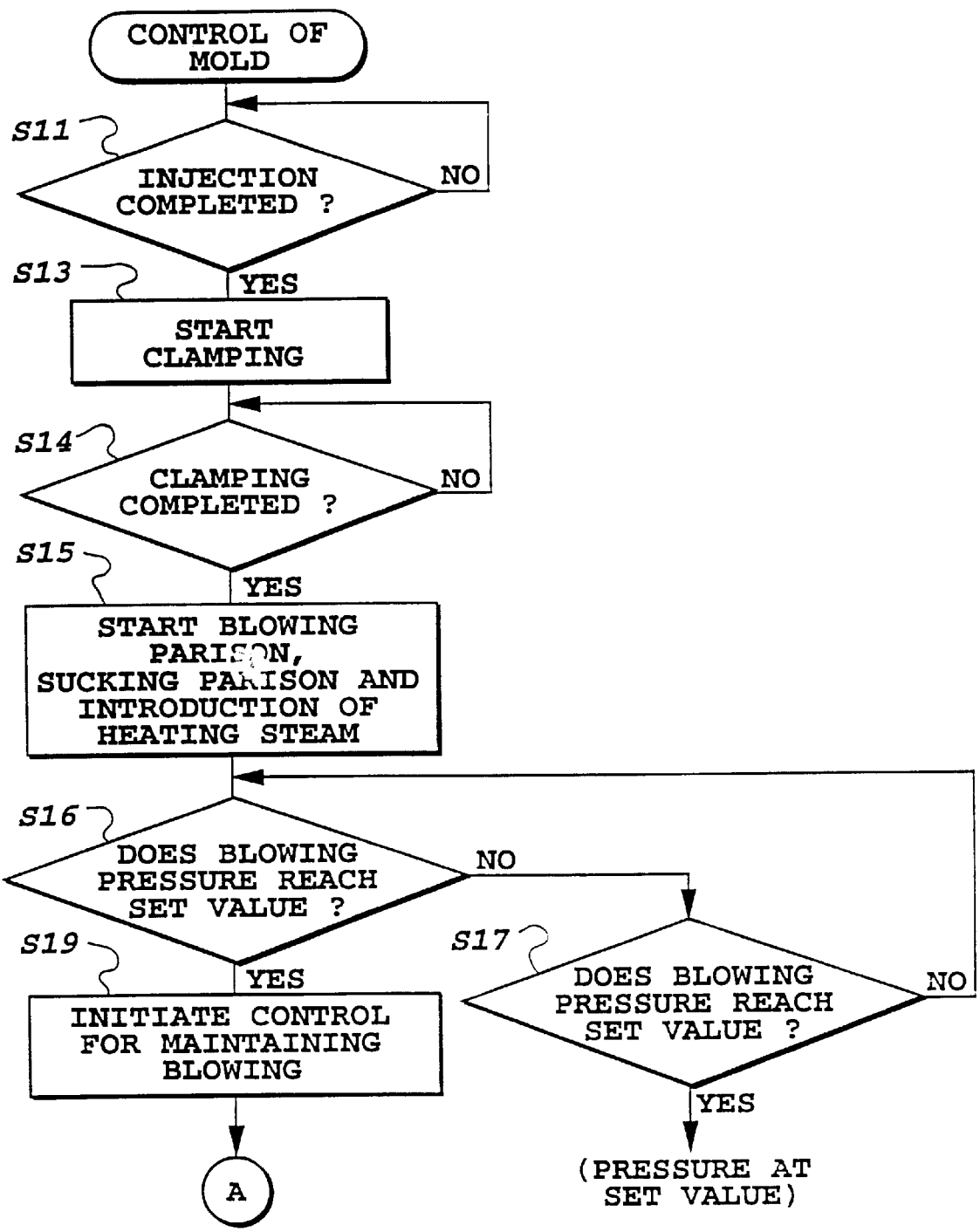
FIGS. 5, 6 and 7 are flowcharts showing one example of control procedure of the fourth embodiment of the molding apparatus according to the invention.
Figure 6:
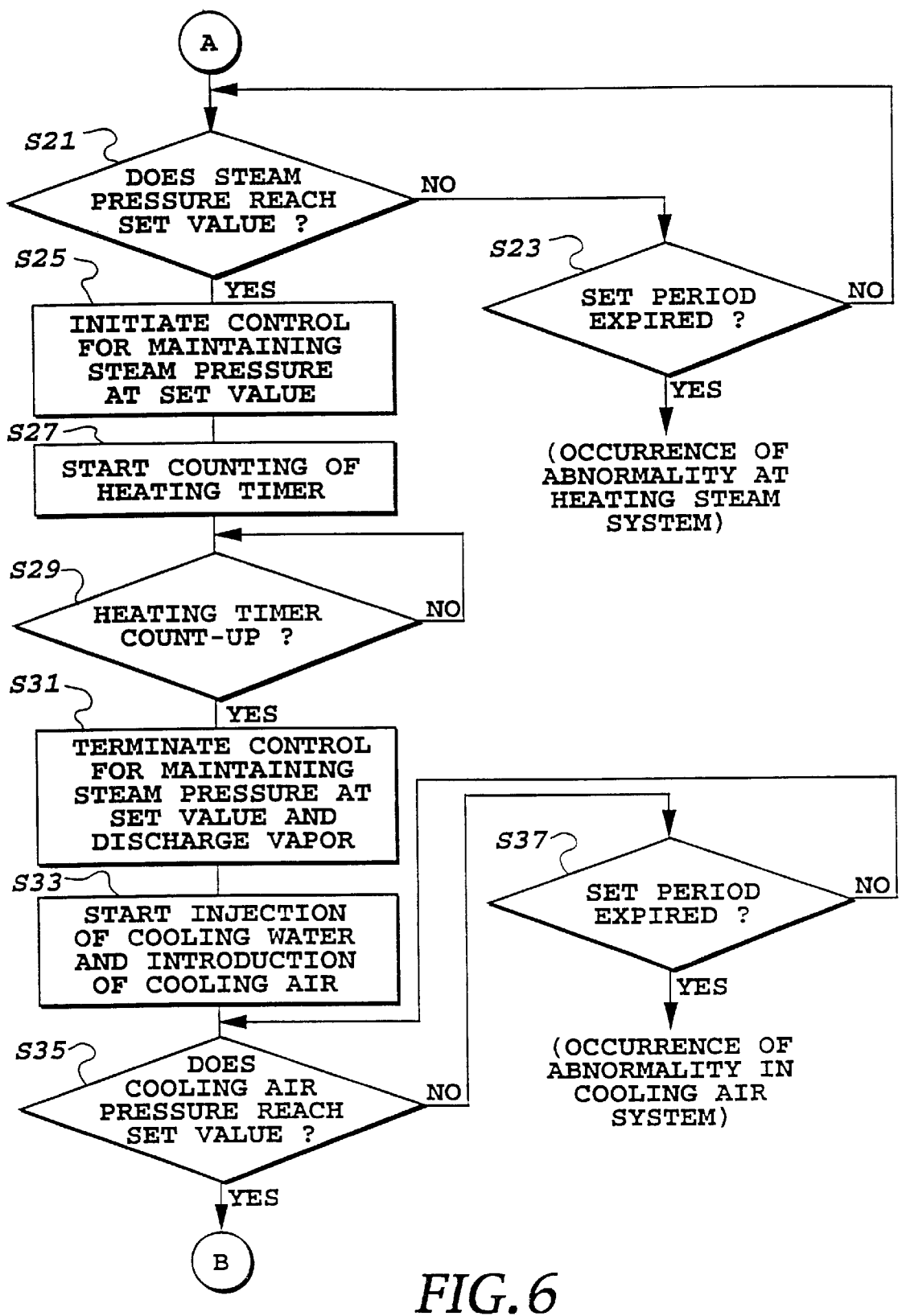
Figure 7:
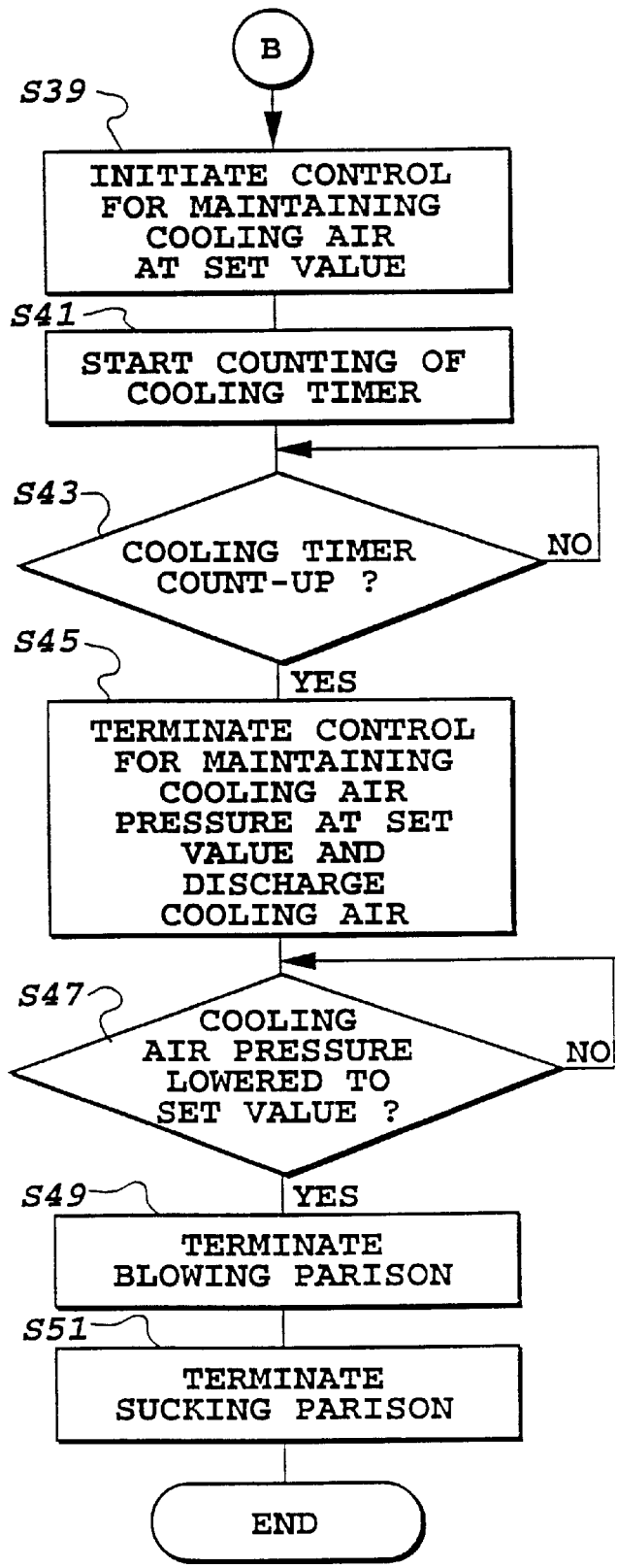
Figure 8:
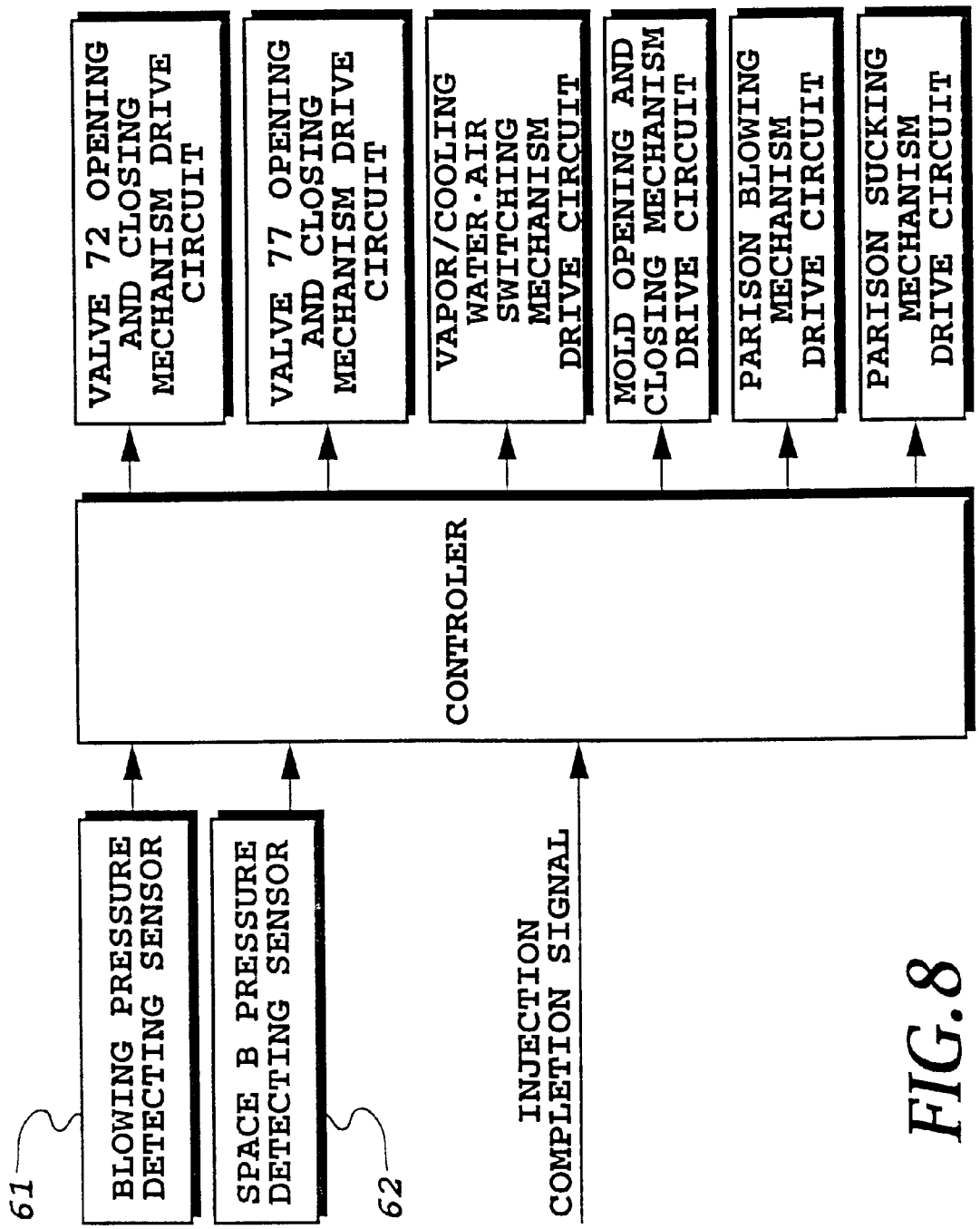
FIG. 8 is a block diagram showing a control circuit to perform the foregoing control.

Next, along FIGS. 5 to 7, and with reference to FIG. 8, control of the mold of the fourth embodiment will be discussed.

When a signal indicative of completion of injection of parison P is input from an extruding machine 100, (Yes in step S11), a mold opening and closing mechanism is driven to initiate clamping of the mold (step S13).

When clamping of the mold is completed (Yes in Step 14), a parison blowing mechanism is driven to start blowing of air into the parison P, and a parison suction mechanism is also driven to start suction of the parison. In conjunction therewith, introduction of the heating steam is initiated by opening of the valve 72 (step S15).

The parison suction mechanism is adapted to make the outer peripheral surface of the parison with the molding surface 30 to firmly fitted with each other for further improving configuration transferring or transcripting ability. By providing not shown fine clearances on the molding surface 30, and vacuum aspiration of the air between the outer peripheral surface of the parison and the molding surface via the clearance is performed.

When the blowing pressure in the parison P reaching a predetermined set value (6 kg/cm$^2$ in this instance) is detected by the blowing pressure detecting sensor 61 (Yes in step S16), a control for maintaining the blowing pressure in the parison P at the predetermined set value is initiated (step S19). This control is for performing fine adjustment of the blowing pressure in the parison P and so forth so as to maintain the blowing pressure of the parison at the set value with monitoring the detected value of the blowing pressure detecting sensor 61. Namely, when the blowing pressure in the parison is out of the set value in an amount exceeding a given value, the blowing mechanism for the parison is driven in response thereto for controlling the pressure in the parison to increase or decrease. It should be noted that if the pressure does not reach the set value even after expiration of sufficient period to reach the blowing pressure in the parison P to the set pressure (No at step S16 and Yes at step S17), it is regarded that certain abnormality is caused in the blowing side to issue an alarm or so forth.

Next, when the pressure of the heating steam in the space B reaching a predetermined set value (6 kg/cm$^2$ in this case) is detected by means of a pressure detecting sensor 62 in the space B (Yes at step S21), control is initiated for maintaining the heating steam pressure in the space B (step S25) at the predetermined set value. In conjunction therewith, a timer for managing a heating continuing period (10 sec) is started (step S27). The control at step S25 is for monitoring the detected value of the pressure detecting sensor 62 in the space B and to perform fine adjustment of the open degree of the valve 72 or so forth so as to maintain the heating steam pressure at the set value. Namely, when the pressure in the space becomes out of the set value to the extent exceeding a given value, the opening and closing mechanism and so forth for the valve 72 is driven in response thereto for increasing or decreasing the pressure within the space B. It should be noted that if the pressure of the heating steam in the space B does not reach the set value even after expiration of sufficient period to reach the heating steam pressure to the set pressure (No at step S21 and Yes at step S23), it is regarded that certain abnormality is caused in the heating steam supplying system to issue an alarm or so forth.

When a given period managed by the heating timer which is started at step S27 is expired (Yes at step S29), the control for maintaining the pressure of the heating steam in the space B at the set value is terminated. Then, the valve 77 is opened to discharge the steam in the space B (step 31). Also, a steam and cooling water/air switching mechanism is driven, and at the same time, the valve 72 is opened to initiate injection of cooling water toward the back surface 31 of the mold body and introduction of the cooling air into the space B (step S33).

On the other hand, when the pressure of the cooling air in the space B reaching the predetermined set value (6 kg/cm$^2$ in this instance) by the pressure detecting sensor 62 in the space B (Yes at step S35), a control for maintaining the pressure of the cooling air in the space B at the set value, is initiated (step 39), and a timer for managing the cooling continuing period (60 sec) is started (step 41).

The control at step S39 is to monitor the detected value of the pressure detecting sensor 62 in the space B and to perform fine adjustment of the open degree of the valve 72 or so forth so as to maintain the cooling air pressure in the space B at the set value. Namely, when the pressure in the space B becomes out of the set value to the extent exceeding a given value, the opening and closing mechanism and so forth for the valve 72 is driven in response thereto for increasing or decreasing the pressure within the space B. It should be noted that if the pressure of the cooling air in the space B does not reach the set value even after expiration of sufficient period to reach the heating steam pressure to the set pressure (No at step S35 and Yes at step S37), it is regarded that certain abnormality is caused in the cooling air supplying system to issue an alarm or so forth.

Subsequently, when the pressure in the space B lowering down to a set value is detected by the pressure detecting sensor 62 (Yes at step 47), blowing into the parison P is terminated (step S49) and also sucking of the parison P is terminated (step S51).

In the manner set forth above, control of the mold of the fourth embodiment is performed.

It should be noted that the foregoing has been discussed in terms of a control system to perform blowing into the parison by transverse blowing. Namely, discussion has been given in terms of the control of the type, in which after completion of clamping of the mold (Yes at step S14), blowing into the parison is initiated (step S15). However, the present invention should not be limited to the disclosed type of control. Namely, it is naturally applicable for the control system to blow into the parison by upward or downward blowing. In such a case, after completion of injection from the extruding machine, the lower end of the parison is sealed by pre-pinching, and then blowing into the parison may be initiated.

"Sixth Embodiment"

In the sixth embodiment, with employing the mold shown in FIG. 2D, and providing a halogen lamp 5 in the space B, heating was performed. Total output of the halogen lamp 5 is 60 kW (one side 30 kW). The final temperature of the molding surface 30 is the same as the foregoing fifth example.

Even in the shown sixth example, equivalent effect to the fifth example was attained in terms of the surface gloss value and the curvature of the corner. Also, concerning the dimensional precision, sixth example was 5/1000 whereas the comparative example was 10/1000 or greater. Thus, the example exhibits higher precision.

As set forth above, the heating means according to the present invention comprises a nozzle 70 for supplying heating medium (heating oil, heating air, steam or so forth) to the space B at back side of the molding surface 30, a piping for communication with the nozzle and a valve 72. It is possible to arrange a radiation heating means, such as a halogen lamp and so forth or other heating means within the space B. By heating the molding surface 30 at a temperature higher than or equal to Vicat softening temperature (T) ° C. by the heating means, the configuration of the molding surface 30 can be clearly transferred or transcripted to the surface of the resin. Thus a grained surface or a mirror surface of the molding surface 30 can be satisfactorily transferred.

The cooling means of the present invention may comprise the nozzle 70 for injecting cooling air or cooling water to the back surface 31 of the molding surface 30 of the mold body 3, the piping 71 communicated with the nozzle and the valve 72. By the cooling means, the molding surface 30 can be quickly cooled down to a temperature lower than or equal to (Vicat softening temperature (T) −10) ° C., the molded product can be quickly taken out to permit shortening of the molding cycle.

Introduction and discharge fluid into and from the space B can be controlled by the valve 72 provided in the supply side piping 71 and the valve 77 provided in the discharge side piping 76.

The control means of the present invention may be constructed with an electronic circuit controlling opening and closing of two valves 72 and 77 and a softwear implementing its function on the basis of the pressure in the space B and the pressure applied to the molding surface 30 from the molten resin. The means for detecting the pressure in the space B is not necessary to directly detect the pressure in the space B but can be means for detecting the fluid pressure supplied to the space B. The same is true even with respect to the detecting means for detecting the pressure to be exerted on the molding surface from the resin.

Moreover, the molding surface 30 of the mold is heated and cooled by a medium containing water as a component, the main body 4 and the mold body 3 may be applied certain measure for corrosion inhibiting, if desired. As a measure, the material to form the main body 4 and the mold body 3 may be selected among stainless, copper alloy, ceramics, aluminum alloy and so on which are difficult to rust. Preferably, stainless steel is employed. As another measure, treatment for making the surface of the metal non-conductive (e.g. nitrating treatment), coating of a corrosion inhibiting paint, or coating of a silicon type sol/gel type paint and so forth may be utilized.

While it is possible to heat the molding surface 30 before firmly fitting the parison P on the molding surface, it is preferable to heat the molding surface at the same timing or after fitting the parison thereonto so that a needle for blowing gas into the parison can be smoothly inserted into the parison by fitting the parison onto the molding surface before heating at a temperature higher than or equal to the Vicat softening temperature (T) ° C. As a result, it becomes possible to stably mold an article which has a mirror surface or a grained surface with high dimensional precision. It should be noted that the preferred temperature of the molding surface upon fitting the parison thereonto is in the range of the Vicat softening temperature (T) −20° C. to (T) −60° C.

On the other hand, after completion of molding, the molded article may be cured by cooling the molding surface down to the temperature lower than or equal to the Vicat softening temperature (T) −10° C.

The thermoplastic resin to be employed in the blow molding process according to the present invention has a property that the longitudinal elastic modulus is in a range of 0.01 to 10 kg/cm$^2$, preferably in a range of 0.05 to 2 kg/cm$^2$, and further preferably in a range of 0.1 to 1 kg/cm$^2$ at a temperature of the Vicat softening temperature (T) +100° C.

After supplying the hollow parison employing such thermoplastic resin between the molding surfaces, the external surface of the hollow parison is depressed onto the molding surfaces under the pressure less than or equal to 100 kg/cm$^2$ for firm fitting and the pressure in the space B is concurrently adjusted to balance with the depressing pressure. At this time, preferably, in order to further improve transferring ability by further tightly fitting the external surface of the parison with the molding surface, the air between the parison and the molding surface is discharged externally by vacuum sucking and so forth through fine gaps provided in the molding surface, for example. Then, the molding surface is heated to the temperature higher than or equal to the Vicat softening temperature (T) ° C., preferably higher than or equal to the Vicat softening temperature +5° C., more preferably higher than or equal to the Vicat softening temperature +10° C., and further preferably higher than or equal to the Vicat softening temperature +20° C., and thereafter is cooled at the temperature lower than or equal to the Vicat softening temperature −10° C., preferably lower than or equal to the Vicat softening temperature −20° C., and more preferably lower than or equal to the Vicat softening temperature −40° C.

It should be noted that the reason why the above-identified range of the longitudinal elastic modulus at the temperature of Vicat softening temperature (T) +100° C. of the thermoplastic resin, is that if the longitudinal elastic modulus is less than 0.01 kg/cm$^2$, draw down of the parison is caused to make it difficult to stably perform molding. On the other hand, if the longitudinal elastic modulus exceeds 10 kg/cm$^2$, a large molding pressure becomes necessary for molding the parison, and further requires quite large blowing pressure for inflating the parison to depress onto the molding surface.

The molding material suitable for such molding process, namely, the thermoplastic resin within a range of the longitudinal elastic modulus 0.01 to 10 kg/cm$^2$ at a temperature of the Vicat softening temperature (T) +100° C., may be selected among, for example, AS resin, polystyrene, high impact polystyrene, graft co-polymer (ABS resin) consisted of acrylonitrile-butadiene type rubber-styrene graft co-polymer (high-temperature ABS resin) consisted of acrylonitrile-butadiene type rubber-styrene-methylstyrene, graft co-polymer (AES resin) consisted of acrylonitrile-etylene-propylene type rubber-stylene and/or metacryl acid methyl, graft co-polymer consisted of acrylonitrile-hydrogenated diene type rubber-styrene and/or metacryl acid methyl, graft co-polymer consisted of acrylonitrile-silicone rubber-styrene and/or metacryl acid methyl, polyethylene, polypropylene, poly carbonate, polyphenylene ether, polyoximethylene, nylon, metacryl acid methyl type co-polymer, polyethersulfon, polyarylate, vinyl chloride, co-polymer consisted of maleimide compound-styrene and/or acrylonitrile and/or α-methylstyrene, graft co-coplymer consisted of rubber form co-polymer-maleimide compound-styrene and/or acrylonitrile and/or metacryl acid methyl and/or α-methylstyrene, and their composition, and resin selected from the above added a filler.

As the molded articles to be suitably molded by the molding process would be housings, sporting products, playing tool, automotive products, furniture products, sanitary products, constructional products, kitchen products and so forth, for example. Furthermore, the molded product may be a molded article having a foamed layer in the hollow portion a molded article which is formed of the multi-layer blowing process, and a molded article which is coated by plating, spattering, steam deposition or painting and so forth.

As concrete examples, the housing may be a housing of a cooler box, a television set, an audio set, a printer, a facsimile machine, a copying machine, a gaming device, a washing machine, an air-conditioner, a refrigerator, a cleaner, an attache case, a musical instrument case, a tool box, a container, a camera case and so forth.

As sporting products, a swimming board, a surfboard, a windsurfing board, skis, a snow board, a skating board, an ice hockey stick, a carting ball, a game ball racket, a tennis racket, a canoe, a boat and so forth may be considered.

As playing tools, a bat, blocks, a building block, a fishing tackle case, a pachinco base (pin ball) frame and so forth may be considered.

As automotive products, an air spoiler, a door, a bumper, a fender, a hood, a sun roof, a rear gate, a wheel cap, an instrument panel, a glove box, a console box, an arm rest, a head rest, a fuel tank, a driver's seat cover, a trunk tool box and so forth may be considered.

As furniture products, a drawer, a table top, a top and a bottom plates of a bed, a dresser frame panel, a shoe cupboard panel, and a front door, a backboard and a bottom plate of a chair, a salver or a tray, an umbrella stand, a vase, a medicine chest, a hanger, a fancy box, a storage box board, a book stand, an office desk top, an office automation rack and so forth may be considered.

As sanitary products, a shower head, a lavatory seat, a lavatory panel, a water pan, a water tank lid, a basin door, a bath room door and so forth may be considered.

As constructional products, a ceiling board, a floor panel, a wall panel, a window frame, a door, a bench and so forth may be considered.

As kitchen products, a cutting board, a kitchen door and so forth may be considered.

As molded products having a foamed layer in the hollow portion, a front door of a refrigerator, a cooler box and so forth may be considered.

As molded products to be produced by the multi-layer blowing process, a fuel tank and so forth can be considered.

As molded products coated by plating, spattering, steam deposition or painting, for example, an exterior part for a vehicle, a housing for an electronic device and so forth can be considered.

The foregoings are mere examples of the molded products. Therefore, naturally, the-present invention is applicable for a variety of other molded products.

[Fifth Embodiment]

Figure 2H:
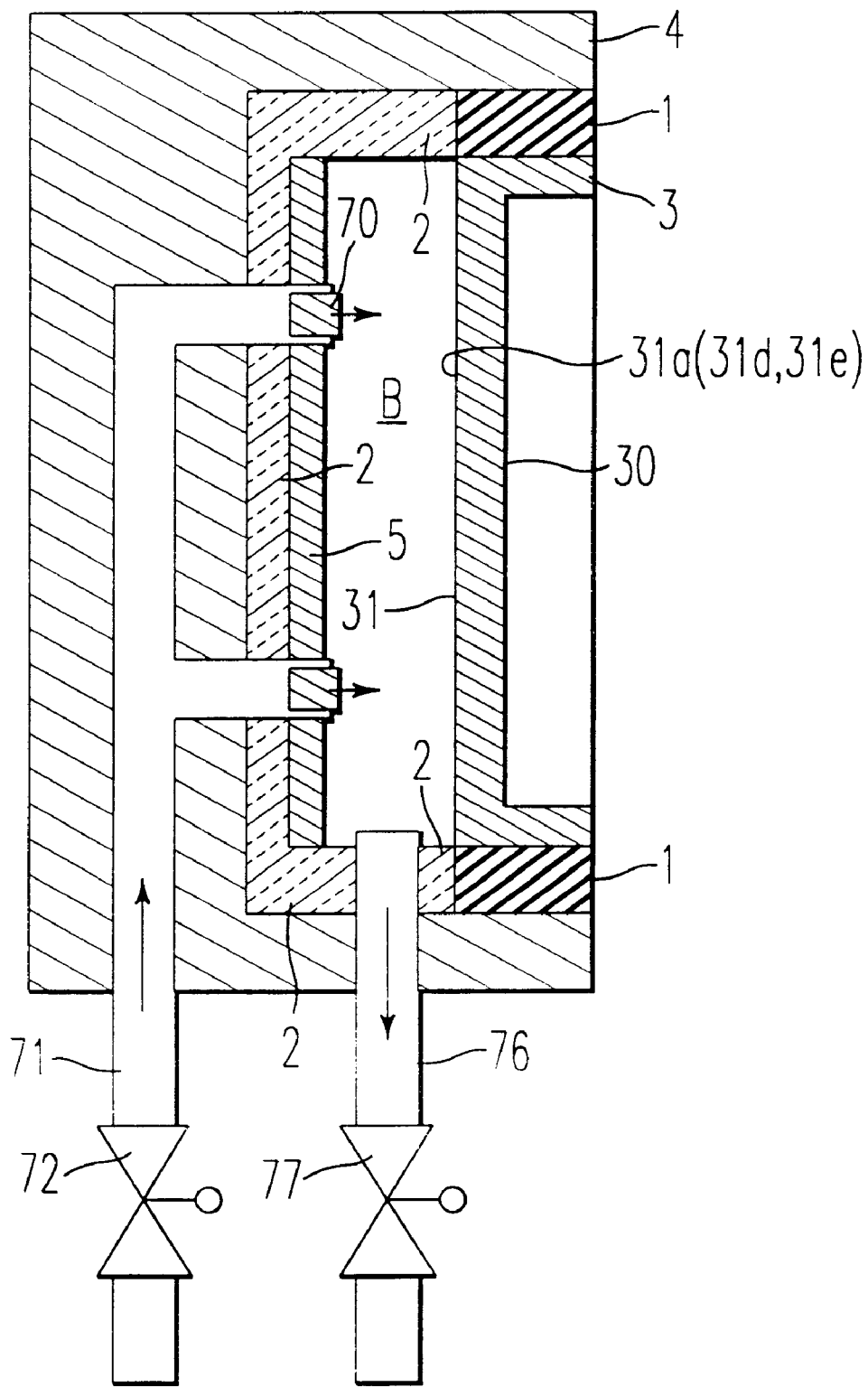
FIG. 2H is a longitudinal sectional view showing a mold half of the fifth embodiment of the molding apparatus according to the present invention.

FIG. 2H shows the fifth embodiment. In the shown embodiment, in order to improve heat absorbing characteristics, surface treatment is provide for the back surface 31 of the molding surface 30. Namely, on the back surface 31, one of the surface treatments shown FIGS. 9A to 9E may be effected.

Figure 9A:
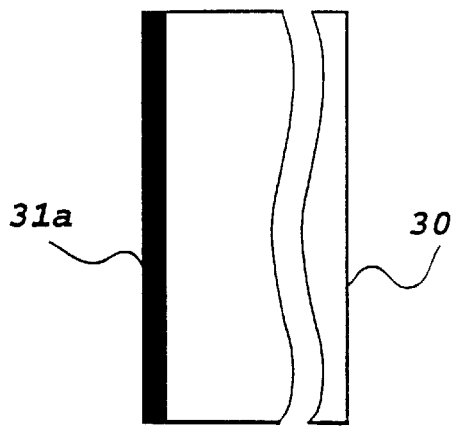
FIGS. 9A, 9B, 9C, 9D and 9E are sectional views of the back side of the molding surface in the fifth embodiment of the molding apparatus according to the invention and showing various modifications thereof, respectively.

FIG. 9A shows an example, in which heat absorption is enhanced by black painting (31a).

Figure 9B:
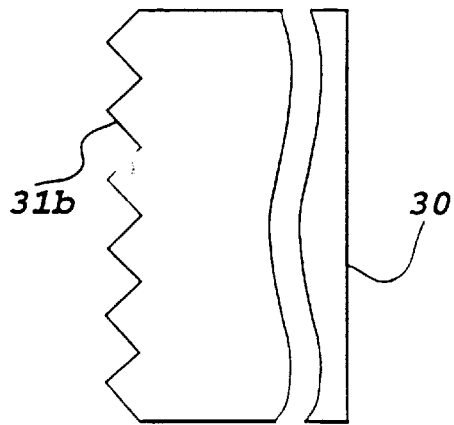

FIG. 9B shows an example, in which the surface area is increased by providing a saw-teeth shaped surface configuration (31b).

Figure 9C:
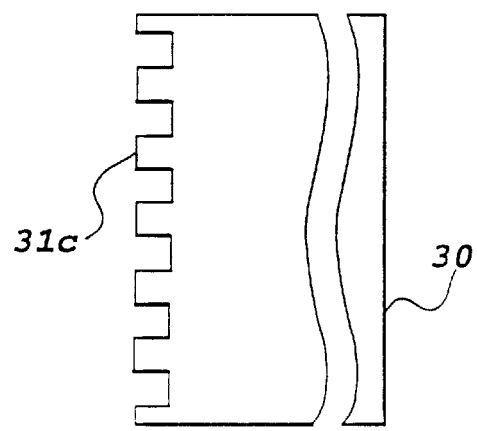

FIG. 9C shows an example, in which the surface area is increased by providing a grooved surface configuration (31c).

Figure 9D:
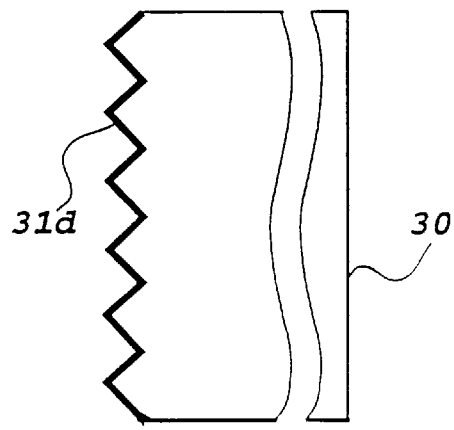

FIG. 9D shows an example, in which treatments (31d) in FIGS. 9A and 9B are effected.

Figure 9E:
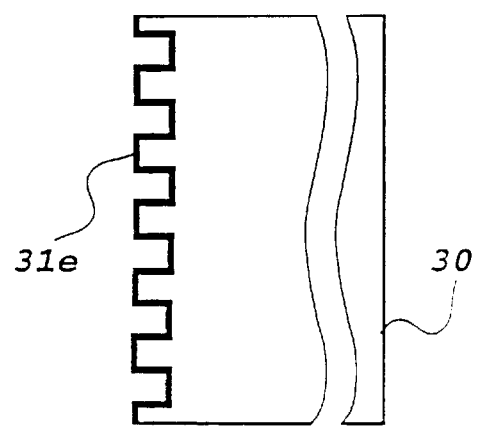

FIG. 9E shows an example, in which treatments (31e) in FIGS. 9A and 9C are effected.

On the other hand, at a position in the space B opposing to the back surface 31 of the molding surface 30, the halogen lamp 5 of total output 60 kW (30 kW at one side) as a radiation heating means is provided. Upon radiation heating of the back surface 31 by the halogen lamp 5, air having pressure of 6 kg/cm$^2$ is introduced into the space B through the valve 72, the piping 71 and the nozzle 70 to balance with the parison blowing pressure applied from the molding surface 30.

"Seventh Example"

Figure 4D:
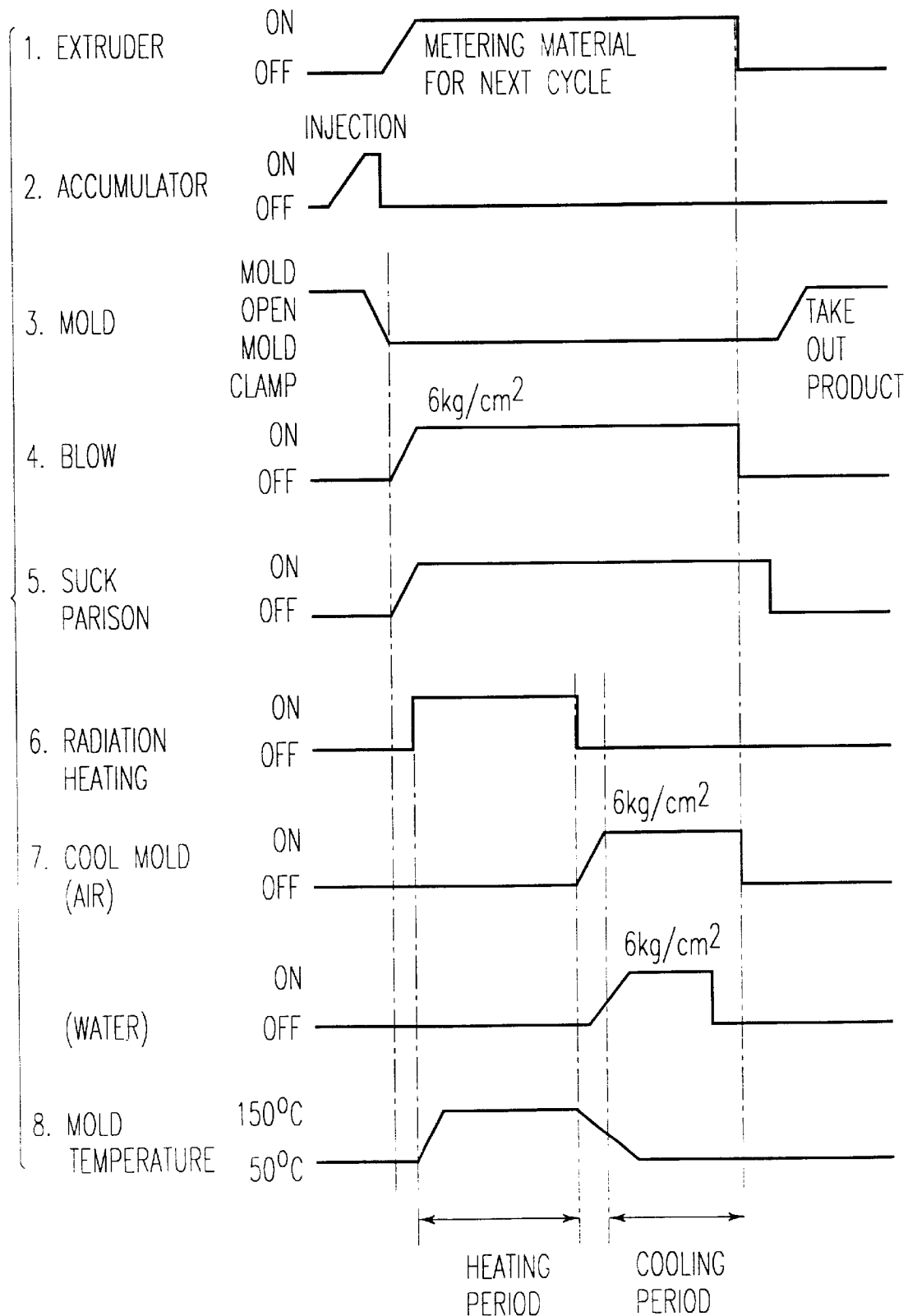

The mold shown in FIG. 2H and, as a thermoplastic resin material, ABS45A (Japan Synthetic Rubber Co. Ltd., Vicat softening temperature is 105° C., longitudinal elastic modulus at 205° C. is 0.3 kg/cm$^2$) were employed, and as a blow molding apparatus, IPB-EP-55 (Ishikawajima Harima Heavy Industries Co., Ltd.) was employed. Blow molding was performed at a timing of FIG. 4D under following conditions. Namely, the conditions were:

| (1) Extrusion Temperature: | 220° C. |
|---|---|
| (2) Clamping Force: | 15 ton |
| (3) Parison Blowing Pressure: | 6 kg/cm$^2$ |

-continued

| | |
|---|---|
| (4) Heating of Molding surface 30 | |
| Radiation of Heating by Halogen lamp 5 | |
| Pressure of Air Injected from Nozzle 70 during Radiation Heating: | 6 kg/cm² |
| Final Heating Temperature of Molding surface 30: | 150° C. |
| Heating Holding Time of Molding surface 30: | 10 sec |
| (5) Cooling of Molding surface 30 | |
| Pressure of (Cooling Water + Air) Injected from Nozzle 70: | 6 kg/cm² |
| Final Cooling Temperature of Molding surface 30: | 70° C. |
| Cooling Holding Time of Molding surface: | 60 sec |
| All Cycle Time: | 150 sec |

A period to reach the temperature of the molding surface 30 at 150° C. in radiation heating by means of the halogen lamp 5 was measured.

| | |
|---|---|
| Case of black painting of FIG. 9A: | 25 sec |
| Case of black painting with Saw-teeth shaped surface of FIG. 9D: | 20 sec |
| Case of no special treatment: | 90 sec |

It has been confirmed that elevation of temperature has become quicker by providing surface treatment for improving heat absorption on the back surface 31 of the molding surface. Similarly, it has been confirmed that even for the examples of FIGS. 9B, 9C and 9E, the required period to reach 150° C. could be shortened.

Comparing the molded article (example) thus molded and the molded product (comparative example) molded without heating the molding surface 30, in the example, the surface gloss value was 95% and curvature of the corner portion was less than or equal to 0.5, and in the comparative example, the surface gloss value was 20% and the curvature of the corner portion was greater than or equal to 0.5. Namely, transferring performance of the molded product is better in the example so that the molded product having smaller curvature at the corner portion which cannot be obtained in the conventional blow molding can be accurately formed with high dimensional stability.

It should be noted:

Mold External Dimension 460(L)×560(W)×720(H) mm

Molded Product Dimension=120(L)×40(W)×480(H) mm

[Sixth Embodiment]

Figure 10B:
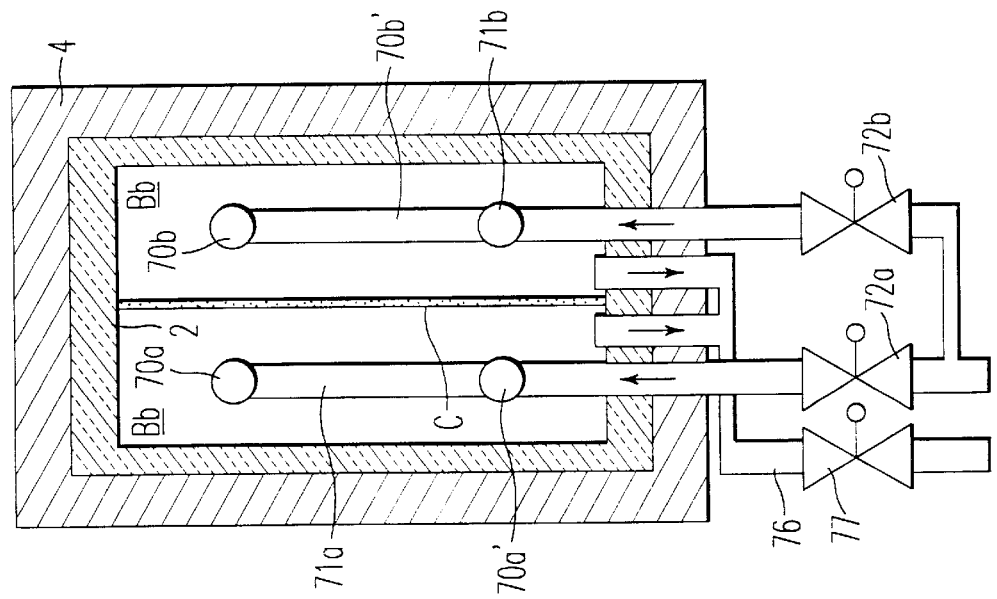
FIG. 10B is a section taken along line B—B of FIG. 10A.
Figure 10A:
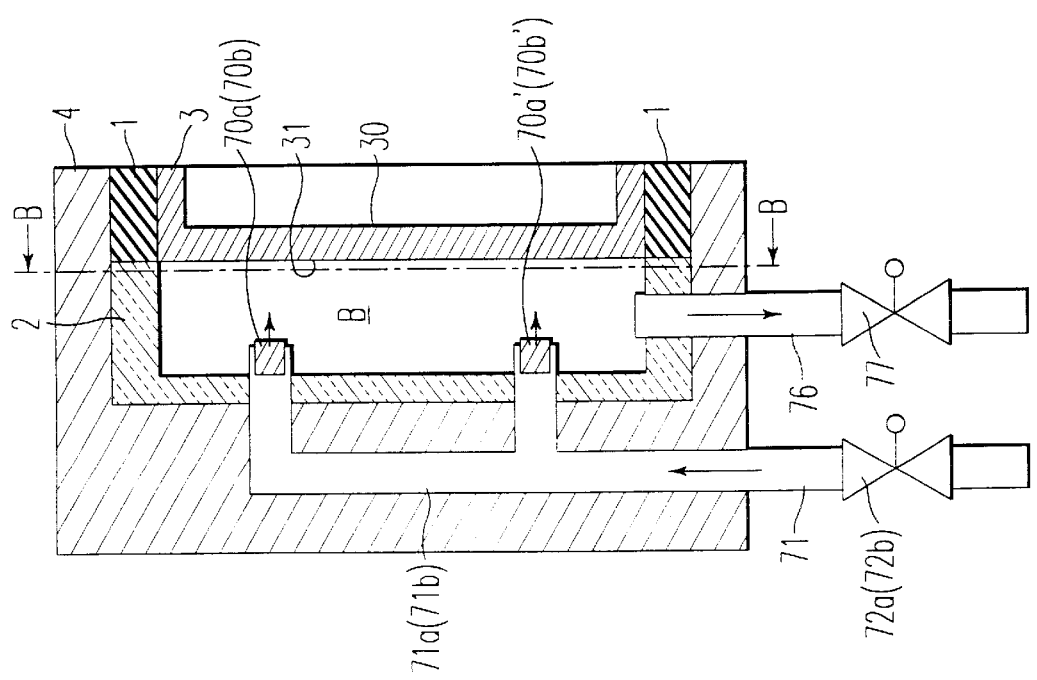
FIG. 10A is a longitudinal sectional view showing the sixth embodiment of the molding apparatus according to the invention.

FIGS. 10A and 10B show the sixth embodiment according to the present invention. In the shown embodiment, a partitioning wall C dividing the space B is provided. The partitioning wall C forms a plurality of divided spaces Ba, Bb, . . . by dividing the space B between the mold body 3 and the main body 4. In respective divided spaces Ba, Bb, . . . , respective part of the back surface 31 of the molding surface 30 are exposed. Each divided space Ba, Bb, . . . is desired to be thermally insulated with each other. Namely, it is desired to construct the partitioning wall C by means of the previously mentioned heat insulative material.

In the shown embodiment, the partitioning wall C is constructed by sandwiching a phenol resin of 10 mm in thick as a heat insulative material between two metal (stainless steel) plates in thickness of 5 mm. Namely, by employing the metal plates, even when a pressure is applied to one of the divided spaces Ba, Bb, the partitioning wall may withstand the pressure difference between the divided spaces Ba and Bb. By employing the heat insulative material, heat loss when heating steam is injected into one of the divided spaces Ba, Bb, can be avoided.

In the divided space Ba, heating steam or cooling water and air is supplied via a valve 72a, a piping 71a and a nozzle 70a, and in the divided space Bb, heating steam or cooling water and air is supplied via a valve 72b, a piping 71b and a nozzle 70b. The valves 72a and 72b are opened and closed independently of each other. Accordingly, it is possible to supply heating steam to any one of the divided spaces Ba, Bb. In order to avoid concentration of stress, respective corners of each divided space are rounded with small curvature. The heating steam, cooling water, air supplied to divided space Ba and/or Bb is discharged through the piping 76 and the valve 77 which is connected to the lower portion of the respective divided spaces Ba and Bb in common.

Here, a product PV of the volume V of each divided spaces and the pressure P of the heating medium supplied to the divided space is set within a range of:

$$10 \text{ Kg·m} \leq PV \leq 2 \times 10^4 \text{ Kg·m}$$

Preferably, the PV is $$10 \text{ Kg·m} \leq PV \leq 2 \times 10^3 \text{ Kg·m}$$

More preferably, the PV is $$10 \text{ Kg·m} \leq PV \leq 2 \times 10^2 \text{ Kg·m}$$

Smaller PV results quicker elevation of pressure in the divided space for better heating efficiency. Conversely, at $PV > 2 \times 10^4$ Kg·m, a long period of time is required for temperature elevation and cooling the divided space, and temperature gradient may be caused to make it difficult to uniformly mold the surface of the molded product.

By thus setting the PV, the mold of the present invention can be constructed at relatively low cost and relatively low strength employing a material which can be utilized relatively easily.

"Eighth Example"

With employing the mold shown in FIGS. 10A and 10B, as a thermoplastic resin material, ABS45A (Japan Synthetic Rubber Co., Ltd., Vicat softening temperature is 105° C., longitudinal elastic modulus at 205° C. is 0.3 kg/cm²) was employed, and as a blow molding apparatus, IPB-EP-55 (Ishikawajima Harima Heavy Industries Co., Ltd.) was employed. Blow molding was performed at a timing of FIG. 4A under following conditions. Namely, the conditions were:

| | |
|---|---|
| (1) Extrusion Temperature: | 220° C. |
| (2) Clamping Force: | 15 ton |
| (3) Parison Blowing Pressure: | 6 kg/cm² |
| (4) Heating of Molding surface 30 | |
| Pressure of Heating Steam Injected from Nozzle 70a, 70b: | 6 kg/cm² |
| Final Heating Temperature of Molding surface 30: | 140 to 150° C. |
| Heating Holding Time of Molding surface 30: | 10 sec |

-continued

| (5) Cooling of Molding surface 30 | |
|---|---|
| Pressure of (Cooling Water + Air) Injected from Nozzles 70a, 70b: | 6 kg/cm$^2$ |
| Final Cooling Temperature of Molding surface 30: | 70° C. |
| Cooling Holding Time of Molding surface 30: | 60 sec |
| All Cycle Time: | 150 sec |

Comparing the molded article (example) thus molded and the molded product (comparative example) molded without the above (4) heating of the molding surface 30, in the example, the surface gloss value was 95% and curvature of the corner portion was less than or equal to 0.5, and in the comparative example, the surface gloss value was 20% and the curvature of the corner portion was greater than or equal to 0.5. Namely, transferring performance of the molded product was better in the example so that the molding product having smaller curvature at the corner portion which could not be obtained in the conventional blow molding was able to be accurately formed with high dimensional stability. It should be noted:

Mold External Dimension=460(L)×560(W)×720(H) mm

Molded Product Dimension=120(L)×40(W)×480(H) mm

Space Dimension of Ba, Bb=70(L)×70(W)×500(H) mm

In the above-mentioned example is the case where the overall molding surface 30 is heated by injecting heating steam into both of the divided spaces Ba and Bb. When the similar molded product was molded by opening only valve 72a to introduce the heating steam only into the divided space Ba to only partially heat the molding surface. The product had a good surface gloss value similarly to the foregoing example for the portion corresponding to the divided space Ba, whereas the portion corresponding to the divided space Bb (portion not heated) had a surface gloss value comparable with the comparative example. At the boundary, the surface gloss value varied gradually.

Namely, this means that, by controlling heating of the divided spaces Ba and Bb independently, the product having a local gloss only at the desired portion can be easily produced.

It should be noted that while the foregoing embodiment discloses the case where the space B is divided into two, a molded product having good quality similarly to the foregoing embodiment can be obtained by dividing the space into two to ten, preferably two to five. On the other hand, by dividing the space, the volume of respective divided spaces can be made small to set PV at a relatively small value. Therefore, parts for a variety of members to be employed in production of the mold can be easily obtained.

[Seventh Embodiment]

Next, discussion will be given for the seventh embodiment of the present invention. This embodiment is constructed for minimizing deformation of the mold body to obtain a molded product with high precision by making one of the pressures of on the molding surface side and the back surface side to vary according to variation of the pressure on the other side. For this purpose, a fluid supply mechanism and a pressure adjusting mechanism are provided.

The fluid supply mechanism is a mechanism for supplying pressurized fluid into the space on the back side of the molding surface and into the parison on the molding surface side of the mold body, respectively, and comprises a fluid supply source and pipings. Respective fluid supply sources may be common or independent. Also, the fluid to be supplied to the space on the back side of the mold body can be a medium for cooling or a medium for heating. As the cooling medium, cooling water, cooling air, cooling oil or so forth can be employed and as the heating medium, steam, heating air and so forth may be employed.

The pressure adjusting mechanism can be any mechanisms which can vary one of the pressures exerted onto a front surface side and a back surface side of the mold body following to variation of the pressure on the other side. Namely, the pressure adjusting mechanism may adjust the fluid pressure to be supplied into the parison on the front surface side of the mold body following to variation of the pressure to be supplied to the space on the back surface side of the mold body, or conversely, the pressure adjusting mechanism may adjust the fluid pressure to be introduced into the space on the back surface side of the mold body following to variation of the pressure to be introduced into the parison on the front surface side of the mold body. The former case is generally advantageous for requiring a relatively simple mechanism. The reason is that, since the steam has to be continuously supplied to the space on the back surface side of the mold body for heating, and thus is required a relatively long period of time to elevate the pressure in the space to a desired pressure level, whereas, since the parison is closed, the internal air pressure thereof may be elevated to the desired pressure level in a relatively short period of time. Therefore, in order to synchronize variation of the steam pressure to variation of the air pressure, a large scale mechanism becomes necessary and it is impossible to simplify it. The pressure adjusting mechanism may be constructed, for example, as shown in FIG. 11, by communicating the respective pipings for supplying pressurized fluid to the front side and the back side of the mold body 3 with each other. In such a case, an one-way check valve may be provided for avoiding penetration of steam into the interior space of the parison.

On the other hand, in place of the communication of the pipings, it is possible to make the pressure in the respective pipings to follow each other by coupling the piping for supplying fluid on the front side of the mold body and the piping for supplying fluid to the space via a cylinder with a piston displacably disposed therein for establishing balance between the fluid pressure in both pipings.

Here, discussion will be given for the embodiment illustrated in FIG. 11. In this embodiment, to the space between the back side of the mold body 3 and the main body 4, steam in heating and cooling water or cooling air in cooling are supplied through a piping 50 and the nozzle 70 from the supply source of the steam/cooling water/cooling air.

Figure 12A:
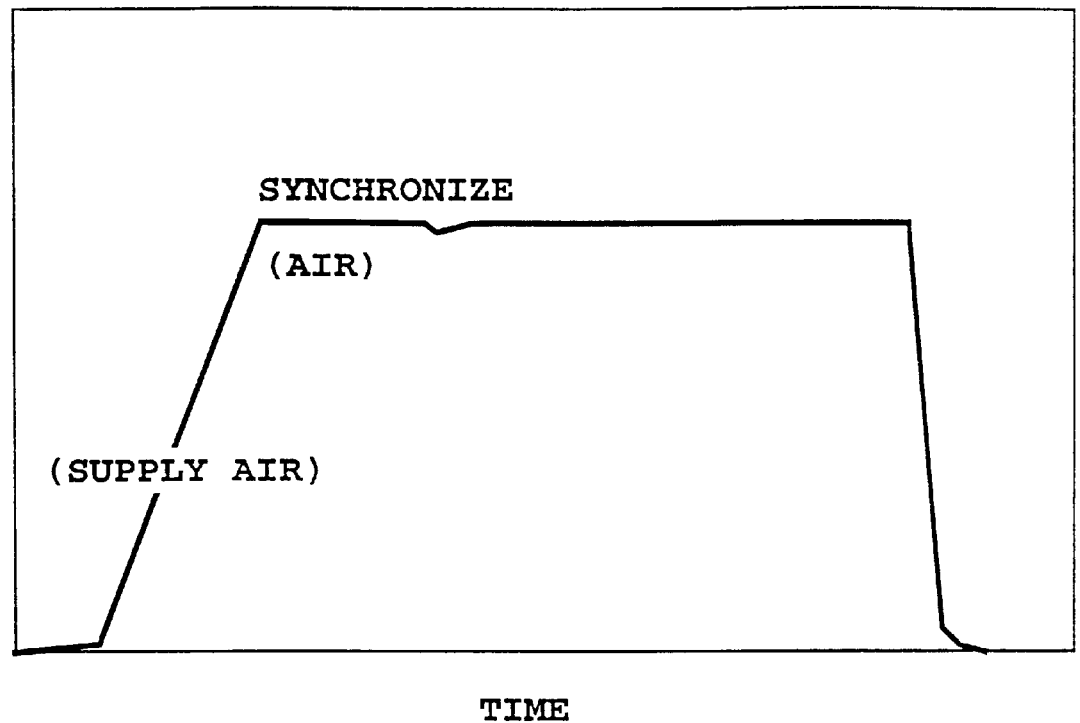
FIGS. 12A and 12B are graphs showing a relationship between the internal pressure of a parison and the pressure within the space of the mold, in the seventh embodiment of the molding apparatus according to the invention.
Figure 12B:
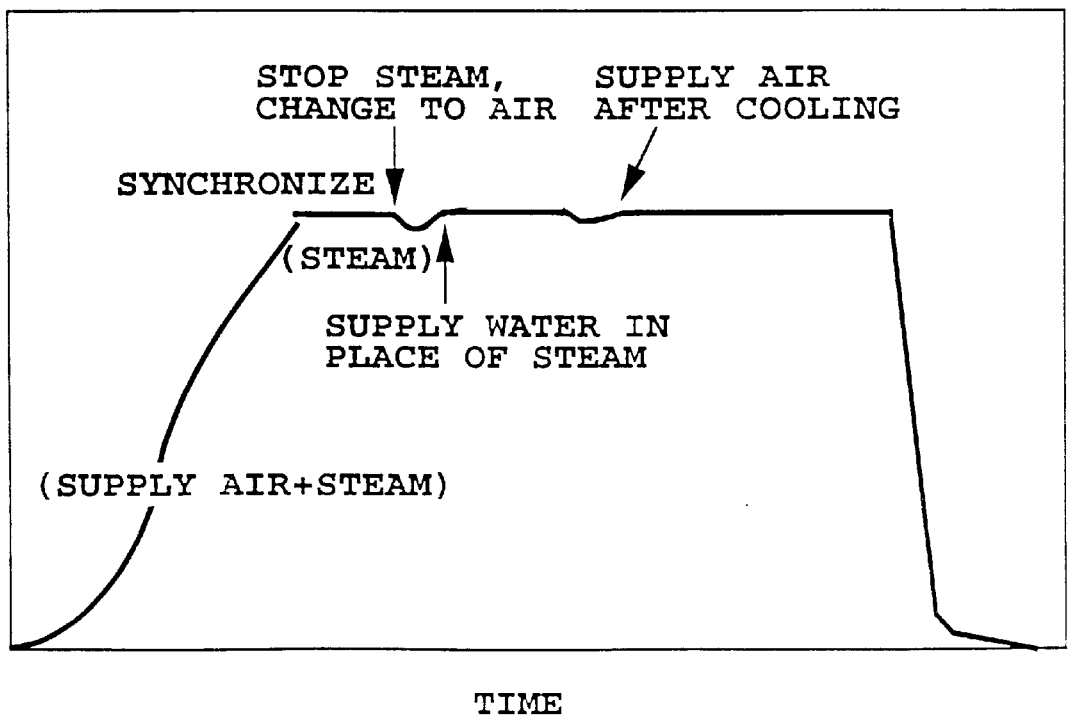

On the other hand, into the parison to be depressed onto the molding surface 30, air is supplied via a piping 55 from an air supply source. By this, the external surface of the parison is depressed onto the molding surface 30. The pressure of the air is followed by the fluid pressure to be supplied to the space B. Namely, the pipings 50 and 55 are communicated via the one-way check valve 51 which blocks flow from the piping 50 to the piping 55. Therefore, by supplying air into the parison via the piping 55 from the air source, and in conjunction therewith, the steam at the equal pressure to the air pressure is supplied to the space B via the piping 50 from the steam supply source. Then, air flows from the piping 55 which takes up the pressure to the desired level in a relatively short period, to the piping 50 which takes up the pressure in a relatively short period. As a result, the pressure in the space B can be taken up as shown in FIG. 12B, with following variation or elevation of the pressure in the parison as shown in FIG. 12A.

Figure 15:
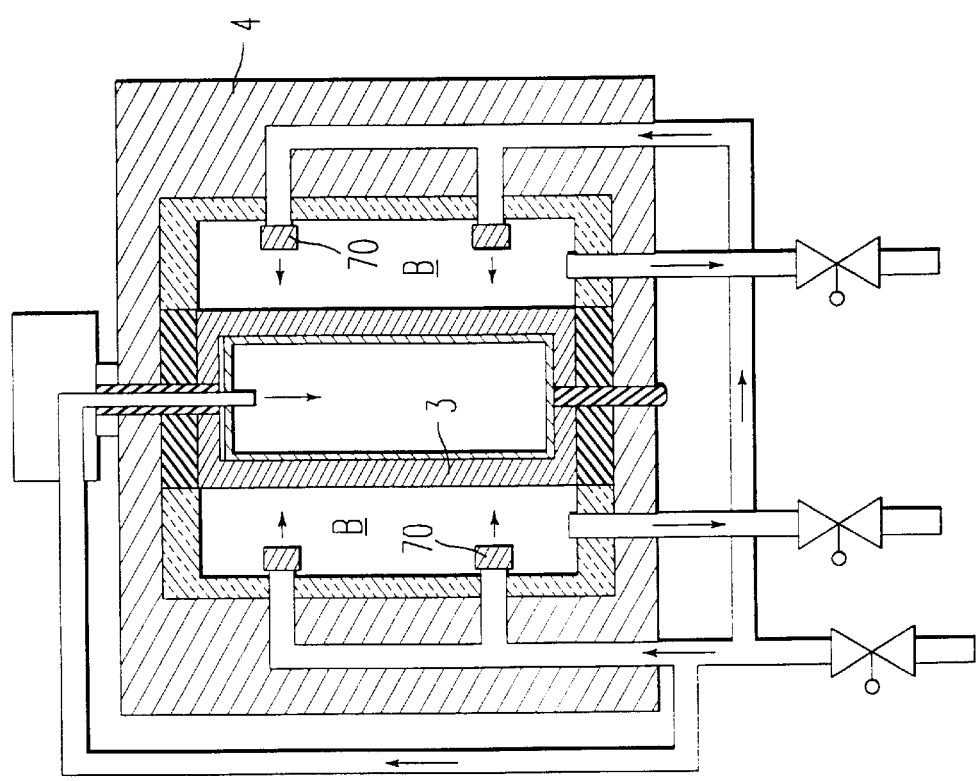
FIG. 15 is one modification of the seventh embodiment of the molding apparatus of the invention.

The embodiment shown in FIG. 15 is mold different from that illustrated in FIG. 11. It should be noted that a piping system is illustrated for easy understanding and is not necessary to be disposed in a section. In the mold shown in FIG. 15, the piping system is constructed such that the steam to be supplied to the space B on the back side of the mold body 3 is also supplied into the parison on the molding surface side, thereby the pressure in the parison and the pressure in the space B being synchronized.

Also, in the mold of FIG. 15, similarly to the embodiment shown in FIG. 10B, the space B is divided into two sub-spaces Ba and Bb, and the heating vapor (steam) or cooling air may be supplied only to one of divided spaces Ba and Bb.

It should be noted that, in the case of the mold of FIG. 11, the similar partitioning wall may be provided to divide the space B into a plurality of divided spaces. This can be a measure for avoiding the pressure difference between the divided spaces. Namely, the pressure difference can be reduced by introducing the air in place of the steam in the divided space, in which the steam is not introduced.

Figure 16:
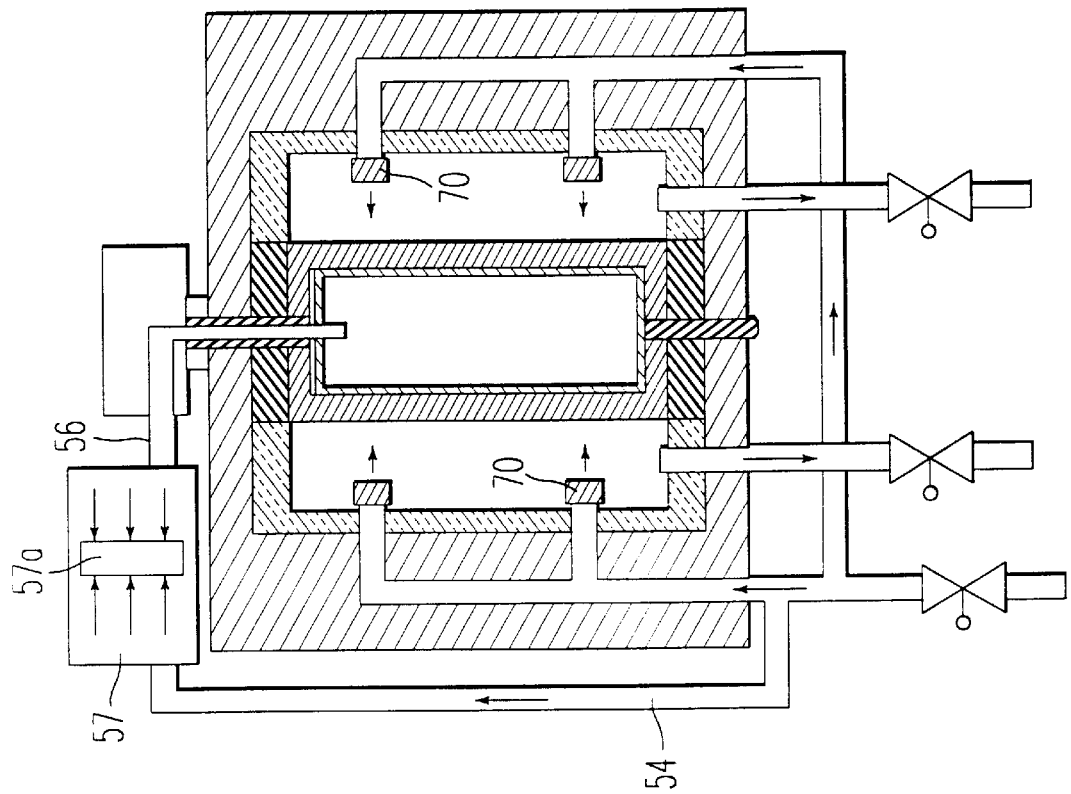
FIG. 16 is another modification of the seventh embodiment of the molding apparatus of the invention.

FIG. 16 shows the mold, according to this embodiment, which is slightly different from FIGS. 11 and 15. The shown mold synchronizes the pressure in the piping 54 and the pressure in the piping 56 by disposing a cylinder 57 having a movable piston 57a therein between the piping 54 supplying steam into the space B on the back side of the mold body and the piping 56 communicated with the piping supplying air into the parison on the front side of the mold body. By this, the pressure in the space B and the pressure in the parison are equalized.

On the other hand, in the mold shown in FIG. 16, the space B is divided into two divided spaces Ba and Bb by the partition C, similarly to the mold of FIG. 15.

"Ninth Example"

Employing the mold shown in FIG. 11, and at a timing shown in FIG. 12 (horizontal axis of FIG. 12 is a time axis), steam air, and the cooling water and the cooling air were selectively supplied. As a thermoplastic resin material, ABS45A (Japan Synthetic Rubber Co., Ltd., Vicat softening temperature is 105° C., longitudinal elastic modulus at 205° C. is 0.3 kg/cm²) was employed, and as a blow molding apparatus, IPB-EP-55 (Ishikawajima Harima Heavy Industries Co., Ltd.) was employed. Blow molding was performed under following conditions. Namely, the conditions were:

| (1) Extrusion Temperature: | 220° C. |
|---|---|
| (2) Clamping Force: | 15 ton |
| (3) Parison Blowing Pressure: | 6 kg/cm² |
| (4) Heating of Molding surface 30 | |
| Pressure of Heating Steam Injected from Nozzle 70: | 6 kg/cm² |
| Final Heating Temperature of Molding surface 30: | 140 to 150° C. |
| Heating Holding Time of Molding surface 30: | 10 sec |
| (5) Cooling of Molding surface 30 | |
| Pressure of (Cooling Water + Air) Injected from Nozzle 70: | 6 kg/cm² |
| Final Cooling Temperature of Molding surface 30: | 70° C. |
| Cooling Holding Time of Molding surface 30: | 60 sec |
| All Cycle Time: | 150 sec |

Figure 13:
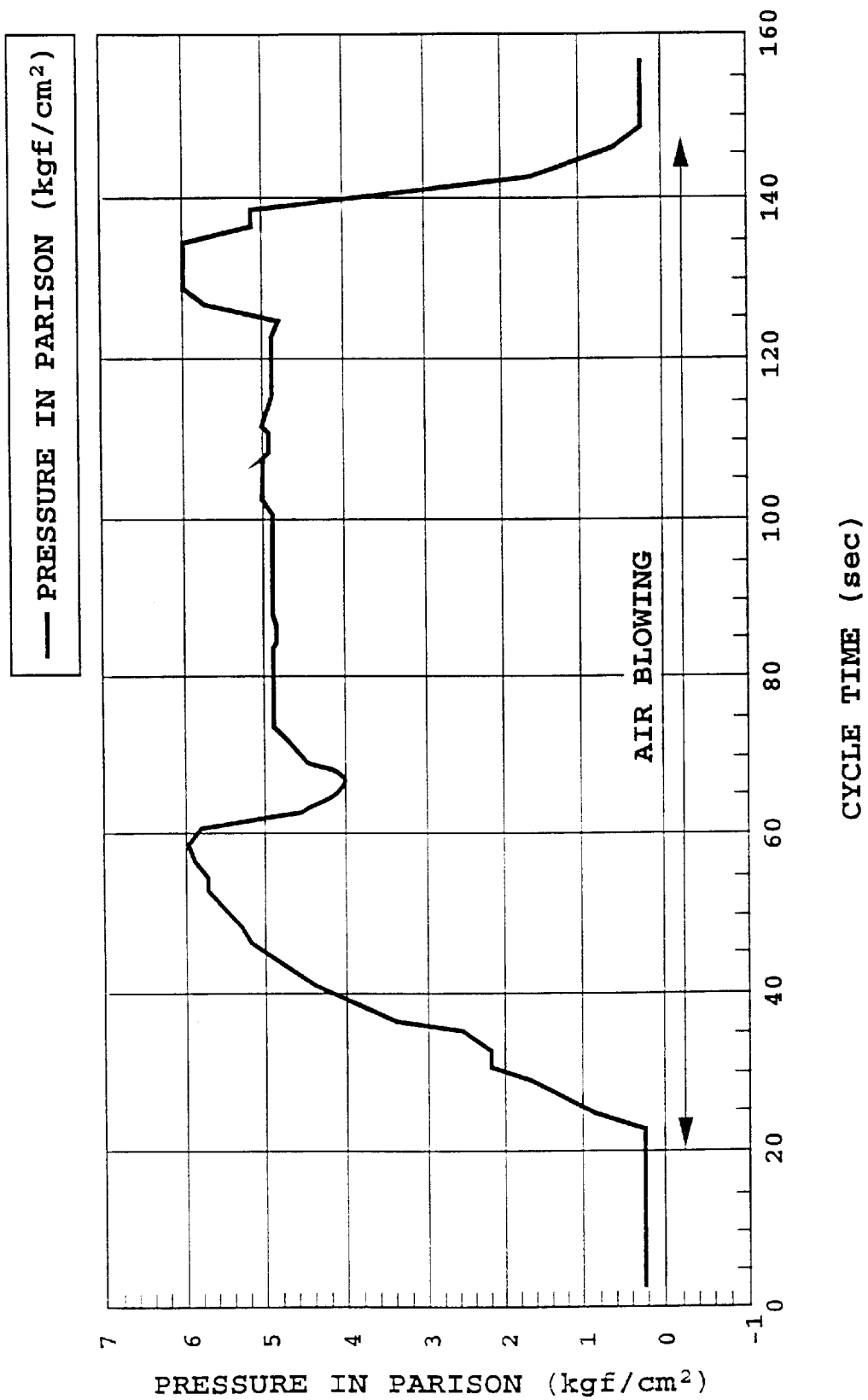
FIG. 13 is a graph showing variation of the pressure in the parison.
Figure 14:
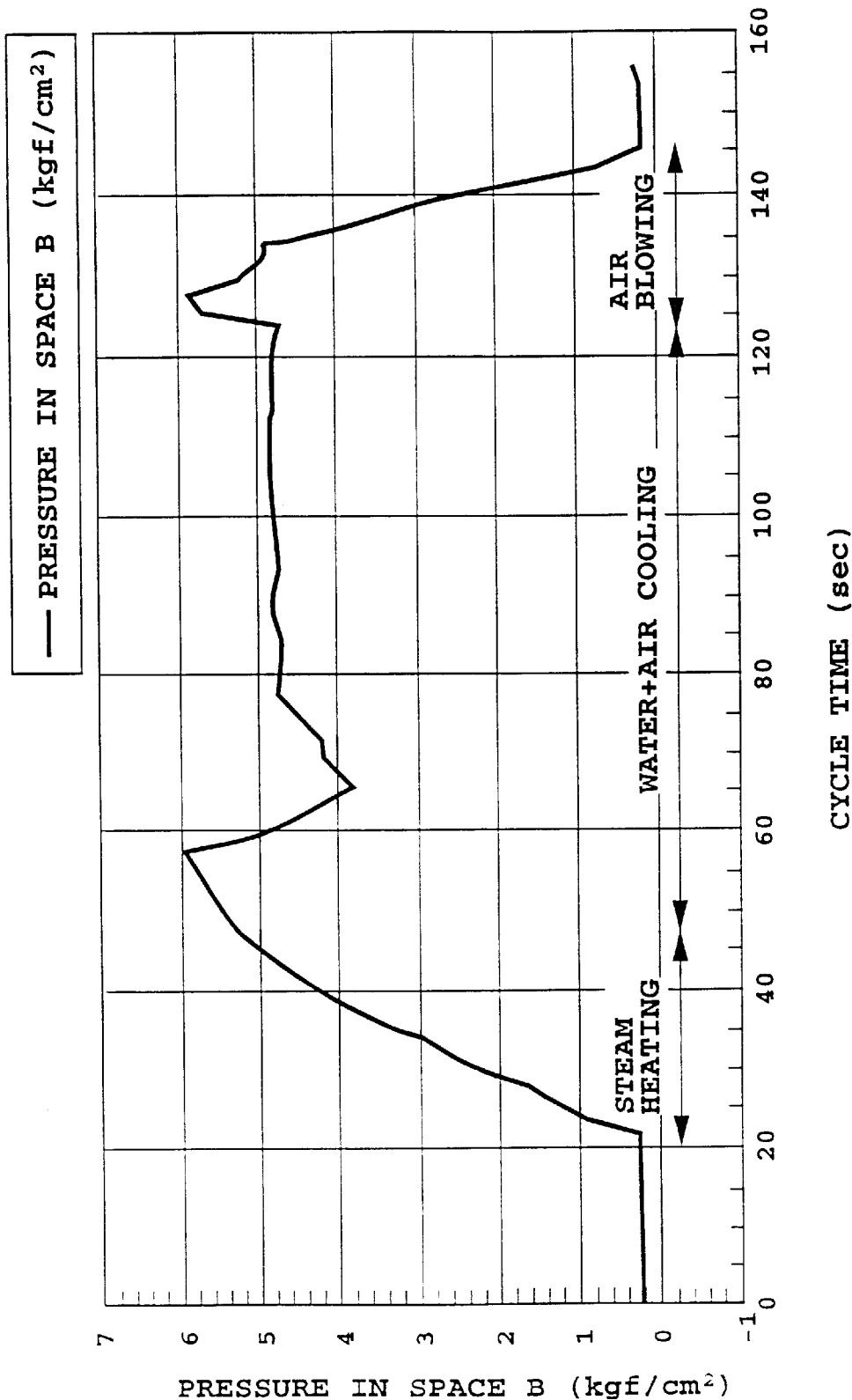
FIG. 14 is a graph showing variation of the pressure in the space of the mold.

As a result, the pressure in the parison was varied as illustrated in FIG. 13, the pressure in the space B was varied as illustrated in FIG. 14. Namely, both pressures exhibited quite high following ability to each other, and the pressures in the parison and the space B could be maintained at substantially the same pressure throughout all process steps. Therefore, even when the thickness of the mold body 3 is relatively thin, it can satisfactorily bear against the pressure to be exerted from the parison side. Also, since the thickness of the mold body 3 can be made thin, reduction of weight and quicker heating and cooling from the back side of the molding surface, shortening of the molding cycle and excellent mirror surface finishing of the molded product can be achieved.

Comparing the molded product (example) thus molded and the molded product (comparative example) molded without heating the molding surface 30 of (4), in the example, the surface gloss value was 95% and curvature of the corner portion was less than or equal to 0.5, and in the comparative example, the surface gloss value was 20% and the curvature of the corner portion was greater than or equal to 0.5. Namely, transferring performance of the molded product was better in the example so that the molding product having smaller curvature at the corner portion which had not been achieved in the conventional blow molding process could be accurately formed with high dimensional stability.

It should be noted:

Mold External Dimension=460(L)×560(W)×720(H) mm

Molded Product Dimension=120(L)×40(W)×480(H) mm

Space Dimension of Ba, Bb=70(L)×70(W)×500(H) mm

[Eighth Embodiment]

Figure 17:
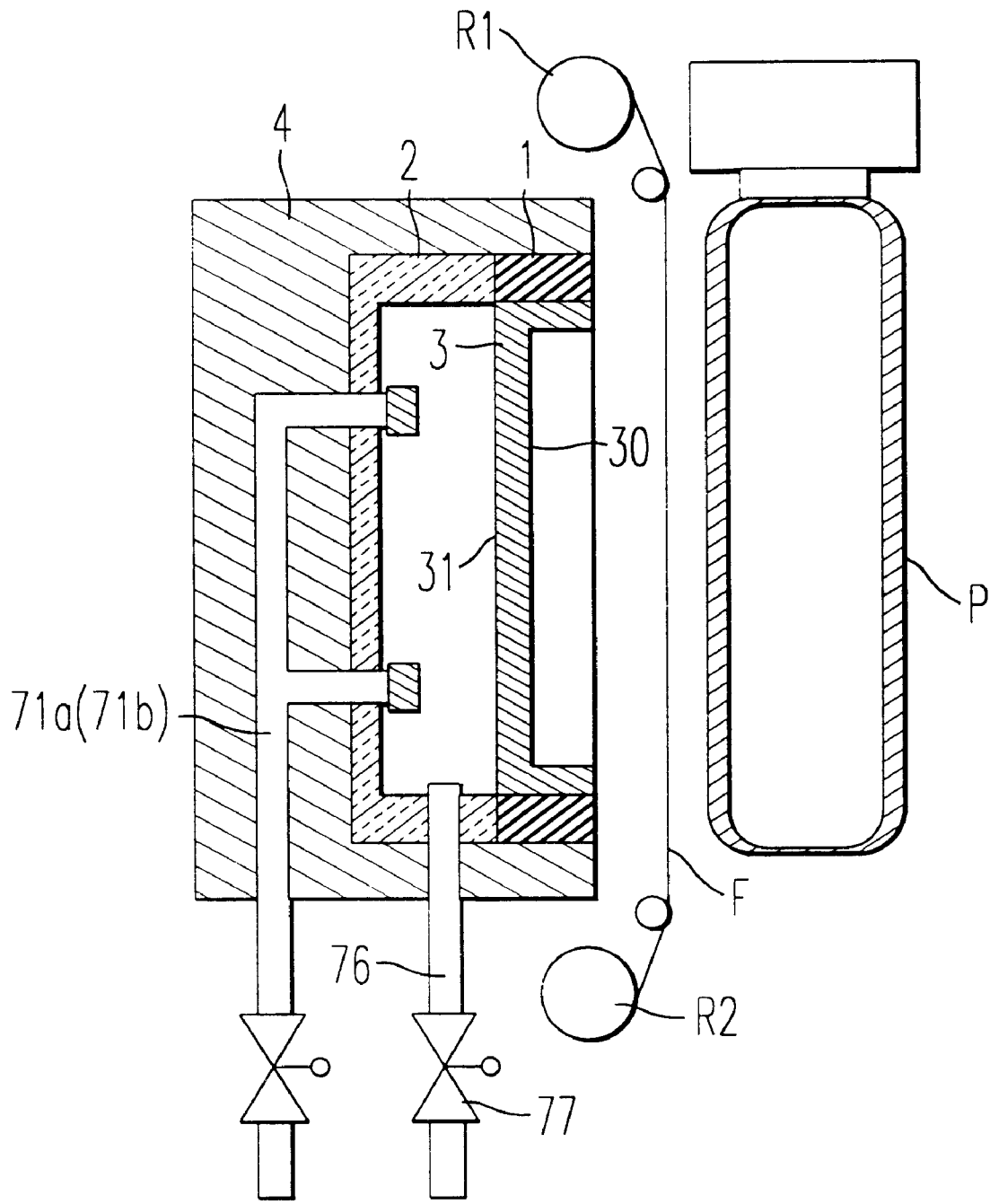
FIG. 17 is a sectional view showing a mold half of the eighth embodiment of the molding apparatus according to the invention.

The eighth embodiment of the present invention will be discussed with reference to FIG. 17. The shown embodiment is adapted to form a resin film layer on the outer surface of a molded product.

The resin film F is supplied to be disposed between the molding surface 30 and the outer periphery of the parison P. Namely, the film is fed from an upper roller and stretched between a lower roller to be disposed between the molding surface 30 and the parison P. The film F thus supplied is depressed onto the molding surface by the pressure of the fluid supplied into the parison P.

The resin film is selected depending upon the kind of the parison. As the resin film applicable for the present invention may be a low density polyethylene film, a medium density polyethylene film, a high density polyethylene film, a polyprophylene film, lacquer type moistureproofing cellophane, polymer type moistureproofing cellophane, polyethylene cellophane, an acetate film, a soft polyvinyl chroride film, a hard polyvinyl chroride film, a polyvinyl alcohol film, a polystyrene film, a polyester film, a rubber hydrochrolide film and so forth, for example.

Next, discussion will be given for an embodiment which permits blow molding of a resin product having an excellent mirror surface or a grained surface on the outer surface and having a foaming component there within through relatively simple process and in a relatively short cycle time.

The foaming component employed in this invention consists of only a foaming agent or a combination of a forming agent and resin. In the case of a foaming agent above it is used to expand a part of a parison foamed.

As a foaming agent, either a physical foaming agent or a chemical foaming agent may be used. As a physical foaming agent, inorganic type gas, such as air, carbon dioxide gas, nitrogen gas or so forth and organic type gas, such as butan, pentan, hexan, fluon and so forth may be used, for example.

As a chemical foaming agent, an inorganic type agent, such as sodium bicarbonate, bicarbonate, carbonate and so forth, and organic type, such as isocyanate compound, azo compound, hidrazine compound, semicarbazide compound, azide compound, nitroso compound, triazole compound and so forth, for example, may be used.

As resin, thermosetting resin and thermoplastic resin may be applicable. As thermosetting resin, phenol resin, urea resin, epoxy resin, polyurethane and so forth may be considered, for example. Amongst, the preferred thermosetting resin is polyurethane. On the other hand, as thermoplastic resin, styrene type resin (polystyrene ABS resin and so on), polyethylene, polypropylene, vinyl chroride resin, cellulose acetate, acryl type resin, fluoride resin, polyester, polyamide, polycarbonate and so forth may be considered, for example. Amongst, the preferred thermoplastic resin is styrene resin. It should be noted that the resin may not be required to be resin before injection into the parison but should be resin after injection.

A method for supplying a foaming component to a parison may be selected among:

(1) a method for injecting it into a parison after formation of the parison;

(2) a method for injecting it into a parison enclosed in a mold; and (3) a method for injecting it into a parison after the parison firmly fits onto a molding surface.

A method for injecting a foaming component may be selected among:

(1) a method for forming a through hole from an outer surface of a parison to a hollow portion by an injection needle from the outer surface side of the parison and injecting the foaming component into the hollow portion;

(2) a method for injecting from the inside of a parison forming die;

(3) a method for utilizing a blowing device which firmly fits a parison onto a molding surface; and 4) a method for utilizing a device supplying a heating fluid.

Foaming in a parison may be performed through the following processes listed below, for example. These processes may be appropriately combined, if necessary.

(1) Elevating the temperature to be higher than or equal to Vicat softening temperature (T) ° C. by heating the molding surface with a heating means so as to cause to foam utilizing the heat thus obtained;

(2) to foam by supplying heating fluid into the hollow portion of the parison; and (3) to foam by reaction of the foaming component.

[Ninth Embodiment]

Figure 18B:
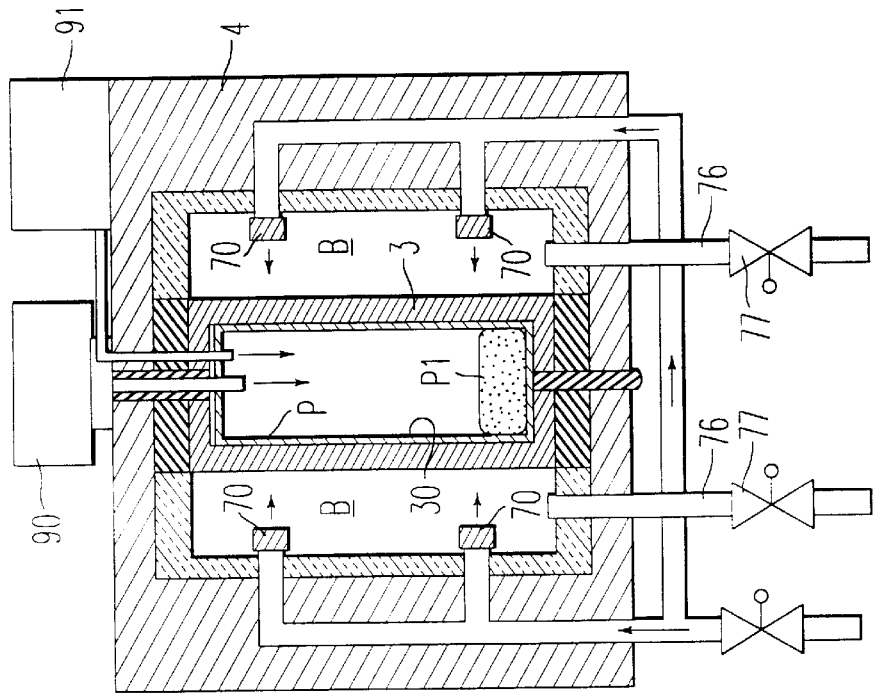
FIGS. 18A, 18B, 18C and 18D are sections respectively showing mold halves of the ninth embodiment of the molding apparatus of the invention.

FIGS. 18A to 18D show a mold according to the ninth embodiment of the present invention and a sequence of a molding process. Also, FIG. 19 shows timings at respective process steps of the molding process. The mold shown diagrammatically in FIGS. 18A to 18D includes a mold body 3 having a molding surface 30, and a main body 4 supporting the mold body 3. On the other hand, a space B is defined between the back side of the mold body 3 and the main body 4. Also, a mechanism (comprising an induction valve 72, a supply piping 71, an injection nozzle 70, a discharge piping 76 and a discharge valve 77) for injecting heating steam as a heating medium and cooling water or air as a cooling medium into the space B. It should be noted that the mold body 3 and the main body 4 are formed of stainless steel.

Reference numeral 90 denotes an air supply source for blowing and 91 denotes a foaming component supply source.

Here, discussion will be given for the sequence of the molding process employing the mold as set forth above.

Figure 18A:
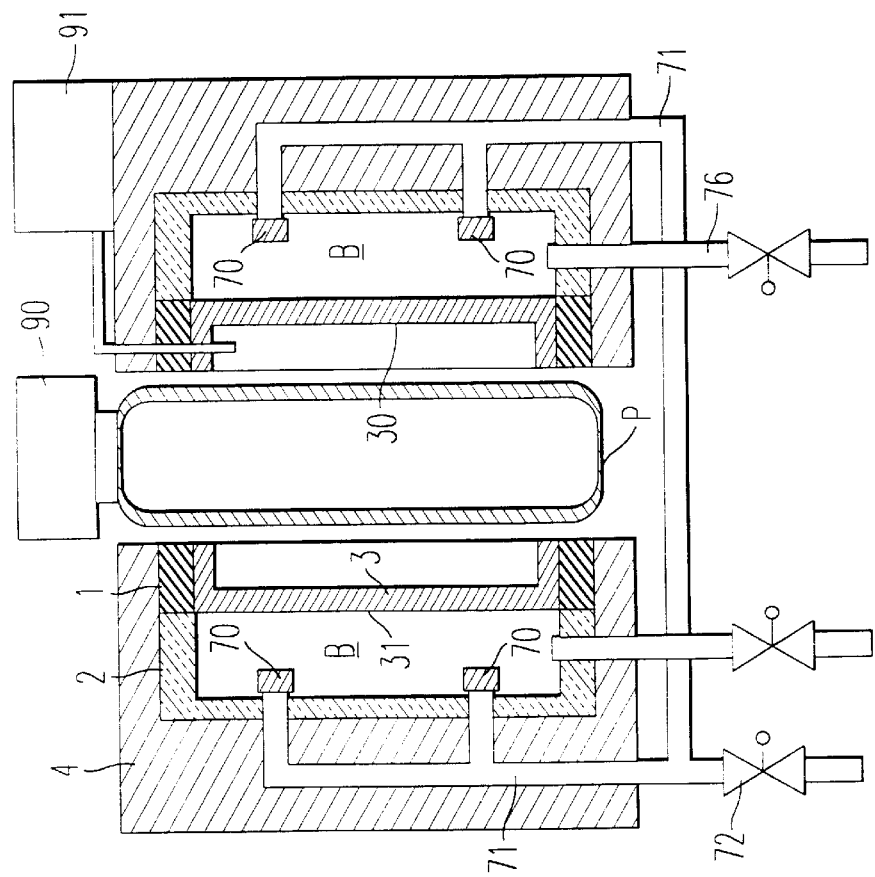
Figure 19:
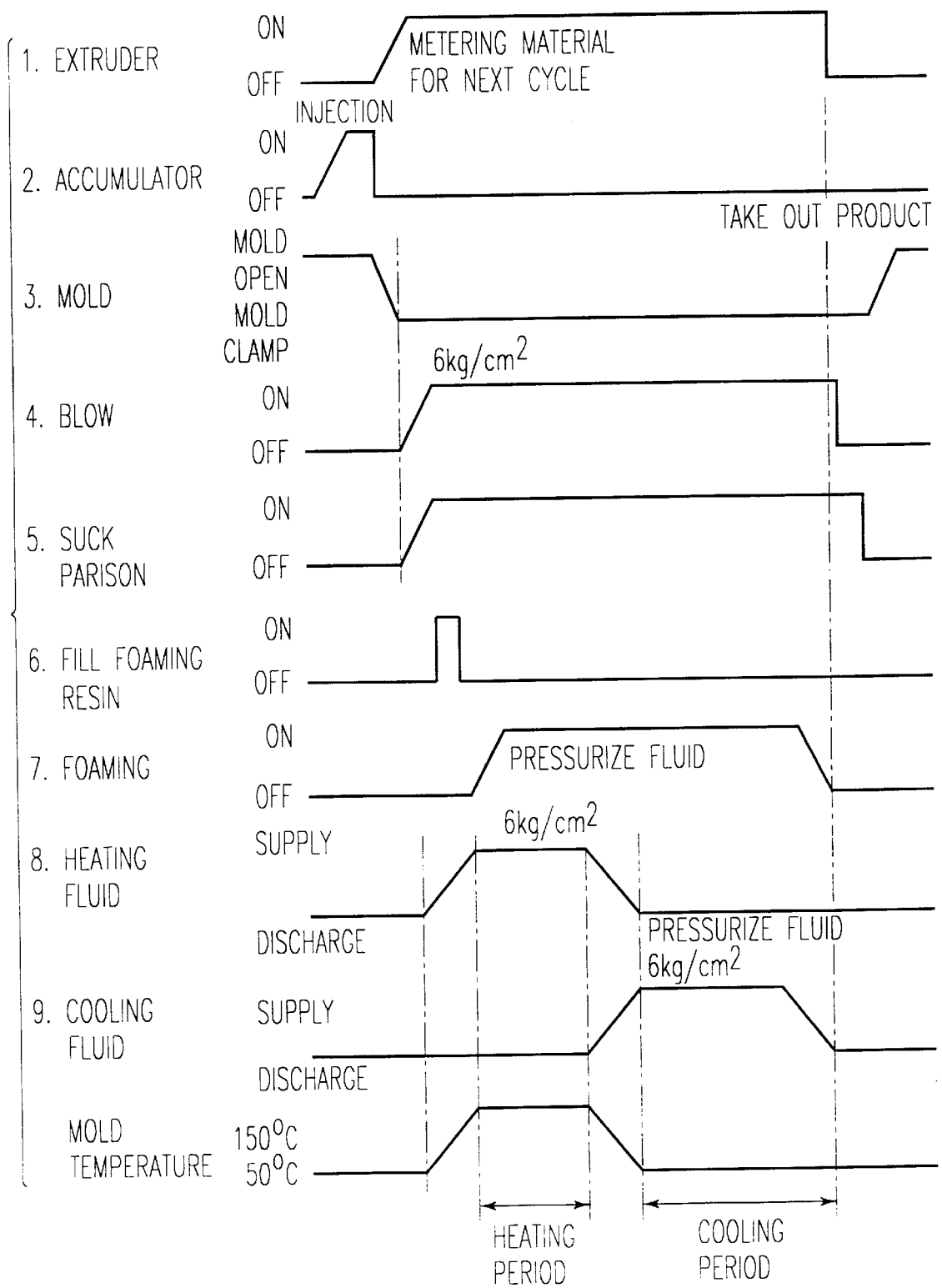
FIG. 19 is a timing chart showing a timing of respective step of the molding process.

At first, as shown in FIG. 18A, the parison P is depended between both molding surfaces 30 of the mold halves. As shown in FIG. 18B, after closing the hollow portion, air is supplied from the air supply source 90 to distend the parison P to firmly fit the outer surface of the parison P onto the molding surfaces 30. At the same time, a foaming component (polyurethane type foaming component) P1 is supplied from the foaming component supply source 91. Furthermore, heating steam is injected into the space B on the back side 31 of the molding surface from the nozzle 70.

Figure 18D:
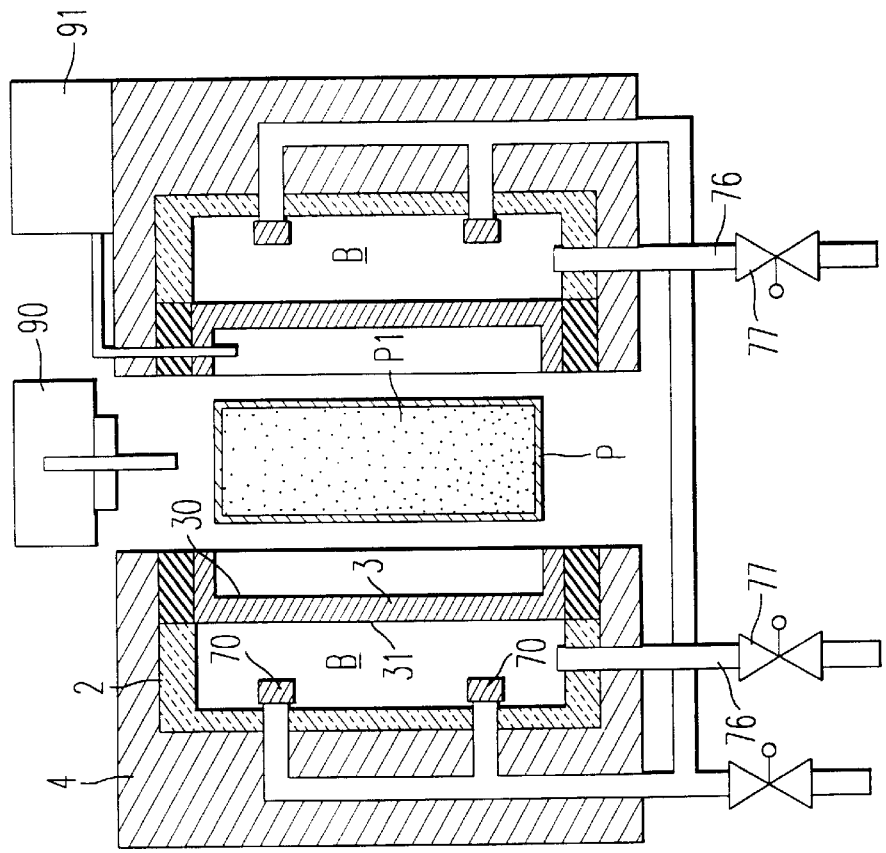
Figure 18C:
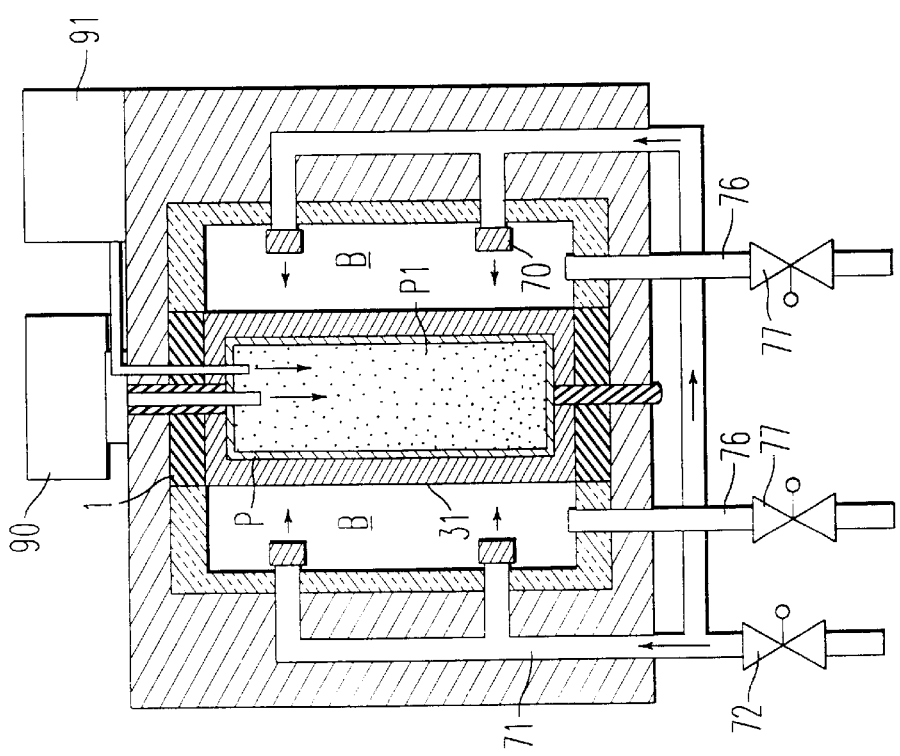

By this, the parison P is heated up to the temperature higher than or equal to the Vicat softening temperature (T) °C. By this heating, the foaming component P1 in the hollow portion of the parison P is foamed to spread over entirely in the hollow portion of the parison P, as shown in FIG. 18C.

Next, the heating steam in the space B is discharged through the discharge piping 76 and the discharge valve 77. In conjunction therewith, the cooling water and the cooling air are injected into the space B via the nozzle 70. By this, the parison P is quickly cooled down to the temperature lower than or equal to (Vicat softening temperature (T) −10) °C. On the other hand, after cooling, as shown in FIG. 18D, the mold is opened and a molded product (having a mirror surface or a grained surface on the surface and a foamed layer inside) is taken out.

[Tenth Embodiment]

FIGS. 20A to 20D show a mold according to the tenth embodiment of the present invention and a sequence of a molding process. Also, FIG. 21 shows timings at respective process steps. The mold shown diagrammatically in FIGS. 20A to 20D is substantially the same as those shown in FIGS. 18A to 18D, except for air supply source. Namely, in the shown embodiment, different from the molding process in the former embodiment, air is not supplied to the parison P. The parison P is depressed onto the molding surfaces 30 by the pressure of the foaming component (polyurethane type foaming component) P1 supplied into the hollow portion in the parison P.

Figure 20B:
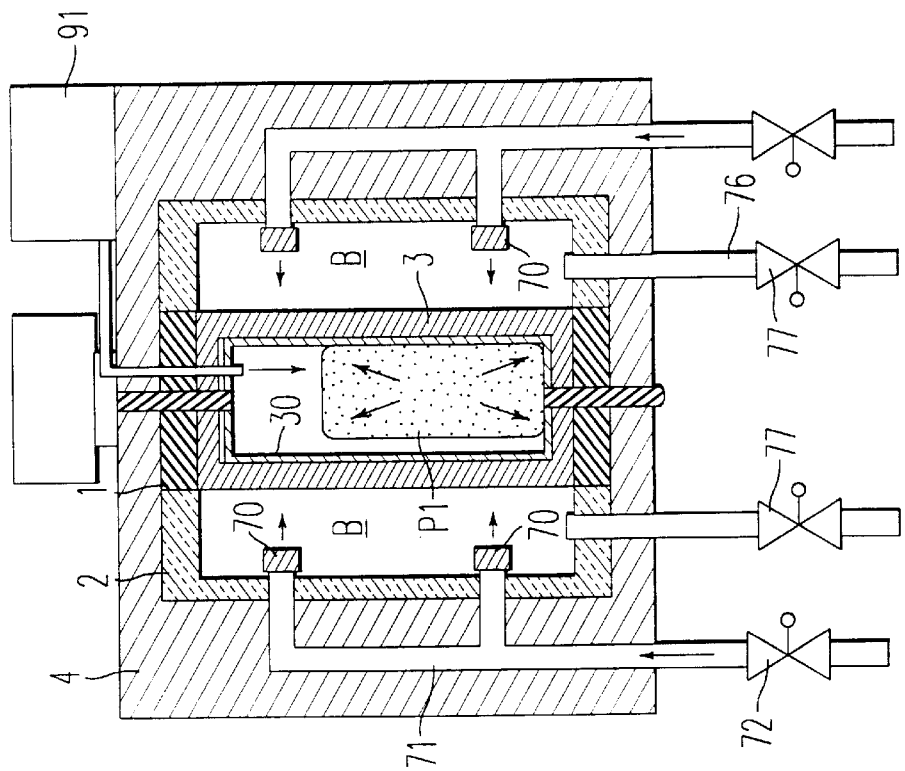
FIGS. 20A, 20B, 20C and 20D are sections showing respective mold halves of the tenth embodiment of the molding apparatus of the invention showing a sequence of the molding process, in order.
Figure 20A:
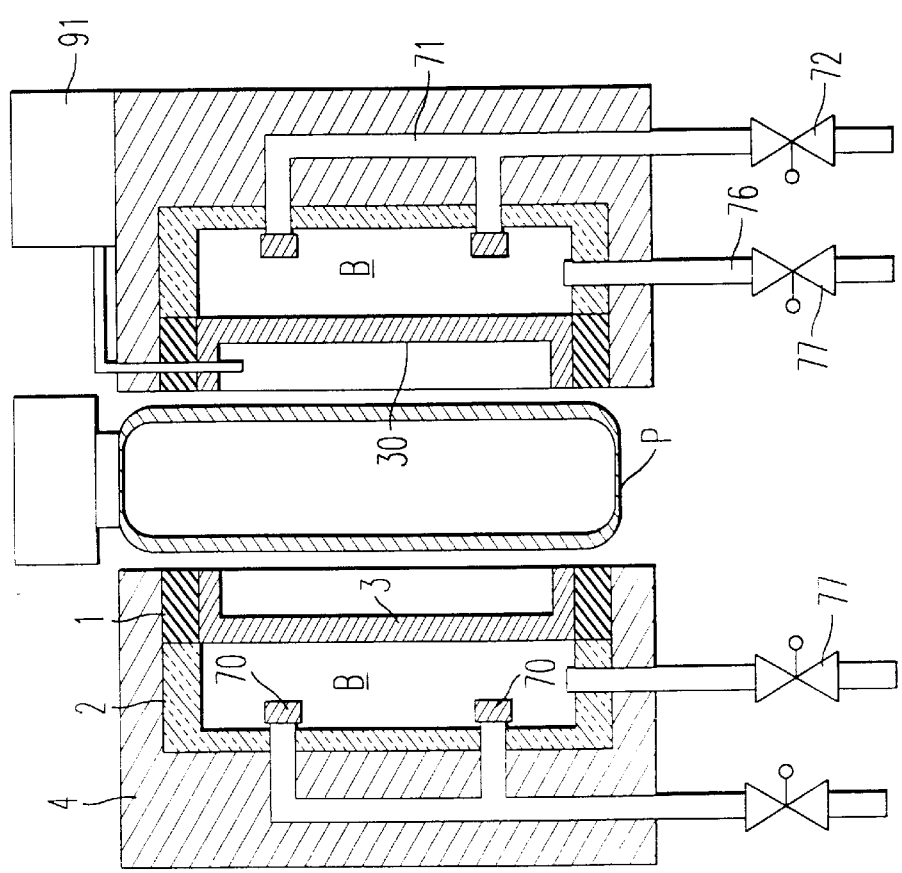

At first, as shown in FIG. 20A, the parison P depends between both molding surfaces 30. After closing the hollow portion shown in FIG. 20B, the foaming component (polyurethane type foaming component) P1 is supplied from the foaming resin supply source 91. Furthermore, heating steam from the nozzle 70 is injected into the space B on the back side 31 of the molding surface.

Figure 20D:
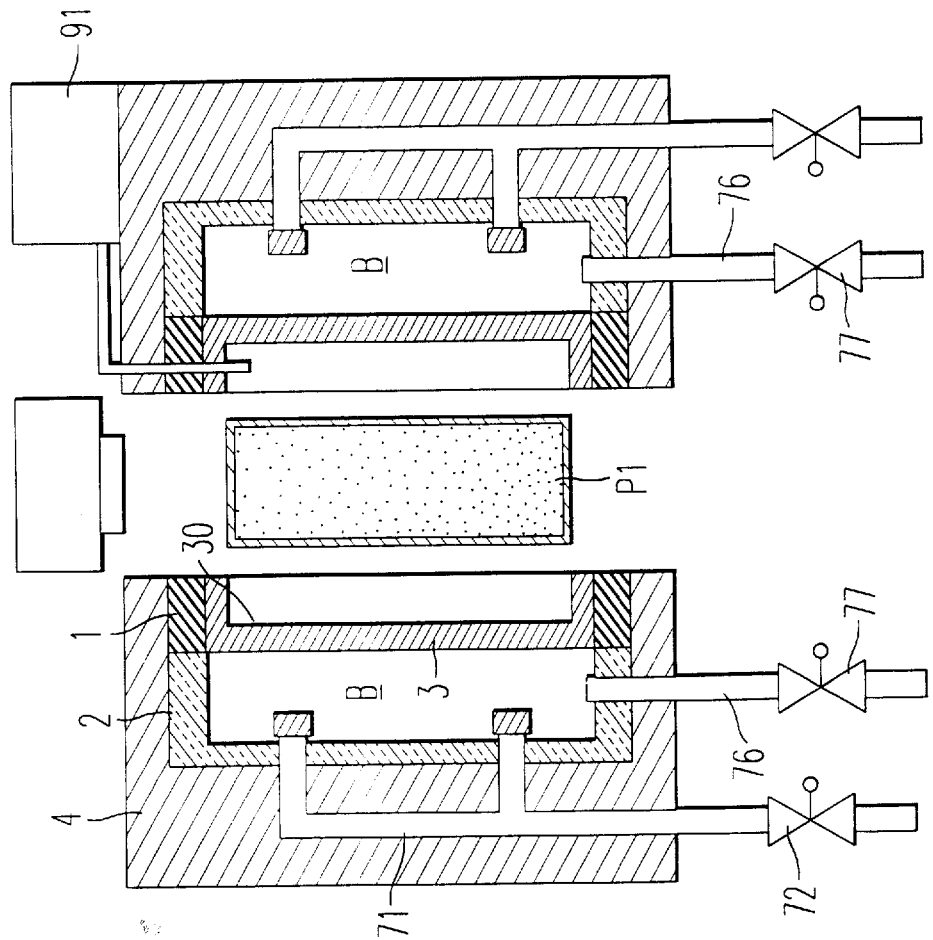
Figure 20C:
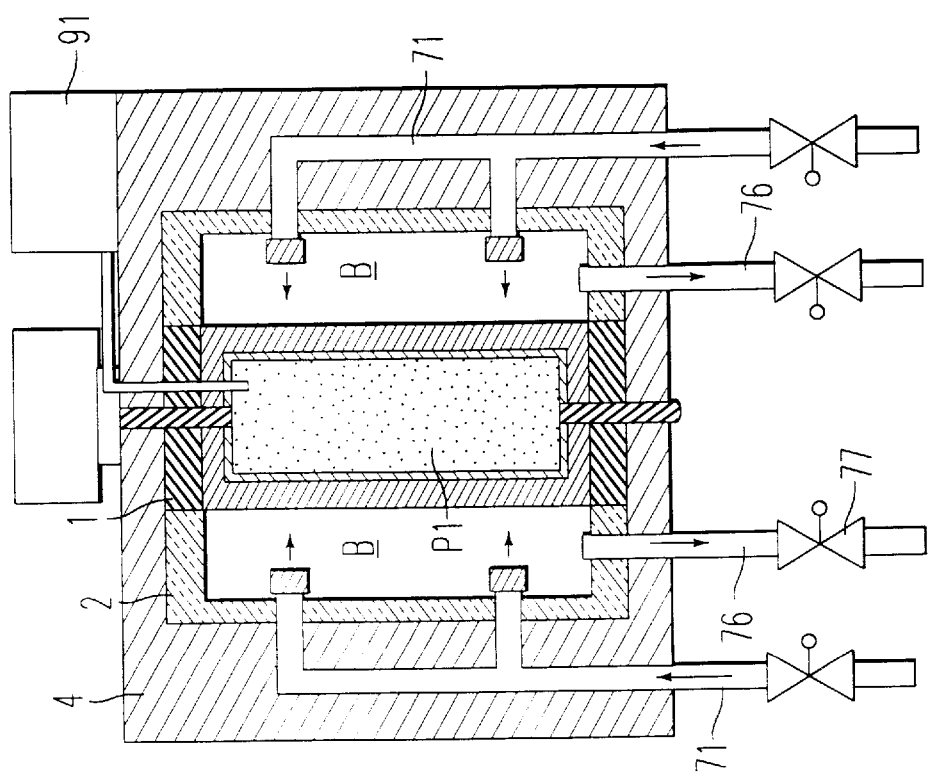

By this, the parison P is heated up to the temperature higher than or equal to the Vicat softening temperature (T) °C. and the forming component P1 in the hollow portion of the parison P foams. By the pressure of the foaming component, the outer surface of the parison P is depressed onto the molding surfaces 30. Namely, as shown in FIG. 20C, the foamed foaming component P1 is spread over the entire area of the hollow portion of the parison P to depress the outer surface of the parison onto the molding surfaces. Here, foaming may be caused by heating from the back side 31 of the molding surface or by reaction of the foaming component P1 itself.

Next, the heating steam in the space B is discharged through the discharge piping 76 and the discharge valve 77, the cooling water and the cooling air are injected into the space B via the nozzle 70. By this, the parison P can be quickly cooled down to the temperature lower than or equal to (Vicat softening temperature (T) −10) °C. On the other hand, after cooling, as shown in FIG. 20D, the mold is opened and a molded product (having a mirror surface or a grained surface outside and a foamed layer inside) is taken out.

Figure 22B:
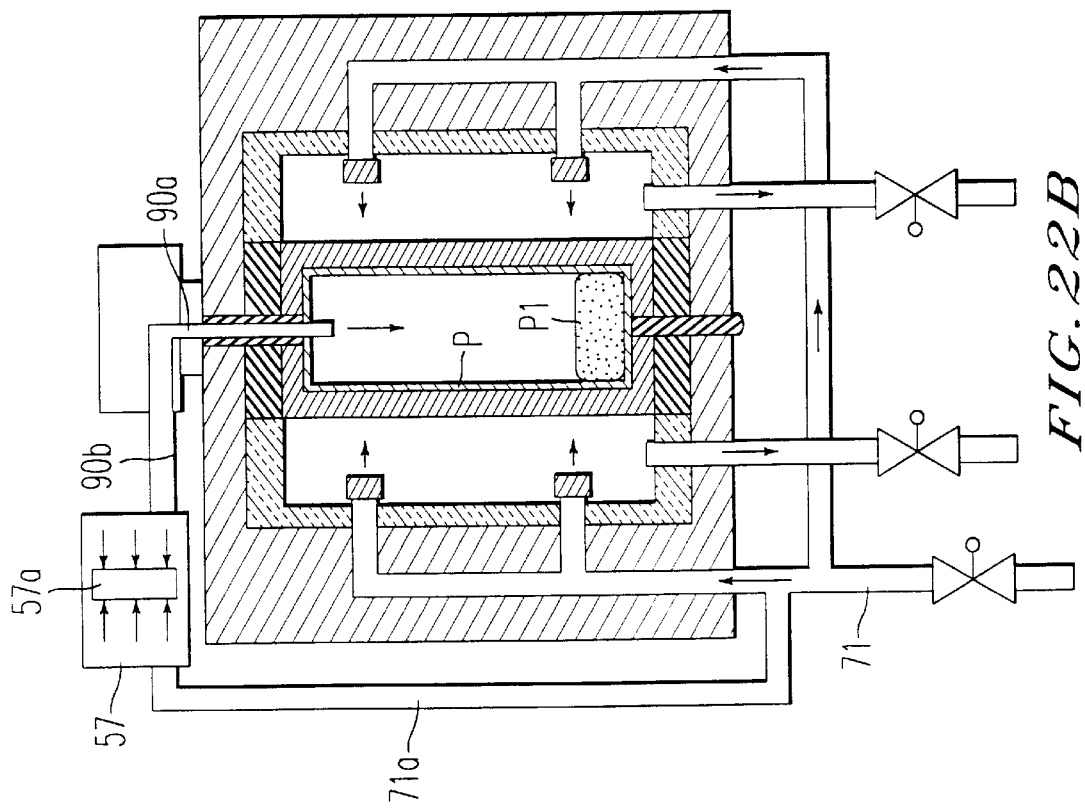
FIG. 22B shows a modification of FIG. 20A.
Figure 22A:
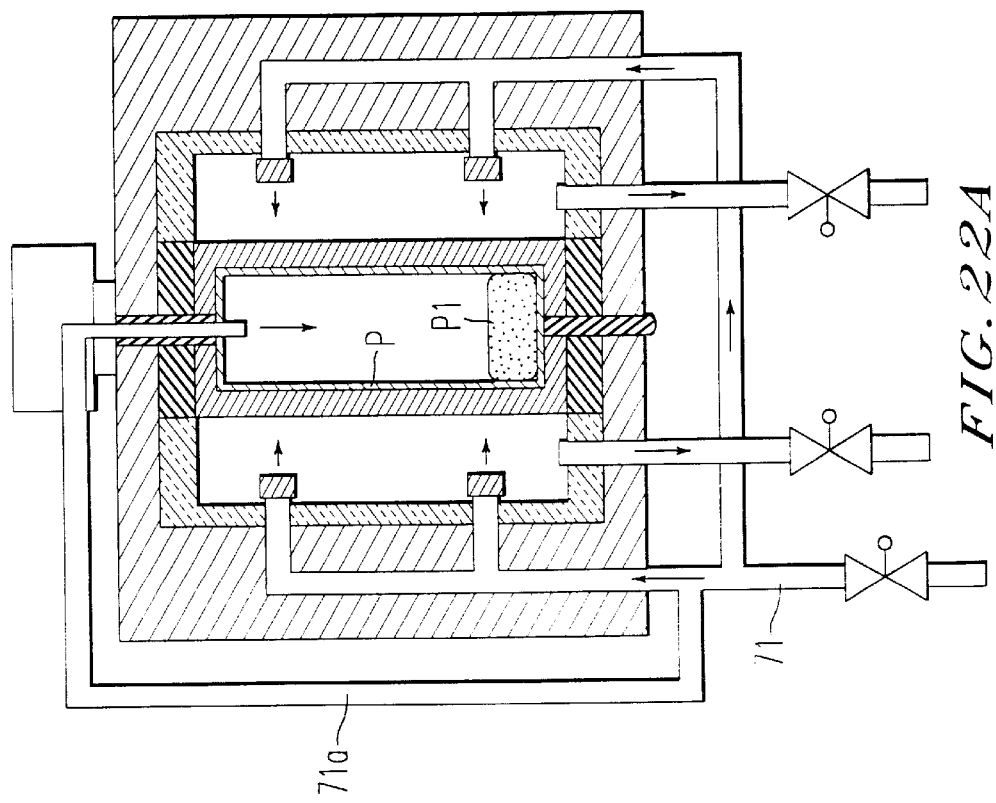
FIG. 22A shows a modification of FIG. 18A.

A mold shown in FIG. 22A is a modification of the mold of FIGS. 18A to 18D. In this modification, a communication piping 71a is branched from the piping 71 such that the steam to be supplied to the space B on the back side of the molding surface 30 is also supplied to the position P on the molding surface side. By this, the pressure in the space B and the pressure in the parison P are synchronized.

A mold shown in FIG. 22A, is another modification of the mold of FIGS. 18A to 18D. In the modification, a cylinder 57 with a piston 57a is disposed between a communication piping 71a branched from the piping 71 supplying the steam into the space B on the back side of the molding surface 30, and a piping 90b communicated with a piping 90a supplying the air into the parison P on the molding surface side to synchronize the pressure of the piping 90a and the pressure of the piping 71a. By this, the pressure in the space B and the pressure in the parison P are synchronized.

"Tenth and Eleventh Example"

With each of the molds illustrated in FIGS. 18A to 18D and 20A to 20D, as a thermoplastic resin material, ABS45A (Japan Synthetic Rubber Co., Ltd., Vicat softening temperature is 105° C., longitudinal elastic modulus at 205° C. is 0.3 kg/cm$^2$), as a forming component, polyurethane type forming component and as a blow molding apparatus, IPB-EP-55 (Ishikawajima Harima Heavy Industries Co., Ltd.) were employed. Blow molding was performed under following conditions. Namely, the conditions were:

| Ninth Embodiment | | |
|---|---|---|
| (1) | Extrusion Temperature: | 220° C. |
| (2) | Clamping Force: | 15 ton |
| (3) | Parison Blowing Pressure: | 6 kg/cm$^2$ |
| (4) | Heating of Molding surface 30 | |
| | Pressure of Heating Steam Injected from Nozzle 70 (70a, 70b): | 6 kg/cm$^2$ |
| | Final Heating Temperature of Molding surface 30: | 140 to 150° C. |
| | Heating Holding Time of Molding surface 30: | 10 sec |
| (5) | Cooling of Molding surface 30 | |
| | Pressure of (Cooling Water + Air) Injected from Nozzle 70 (70a, 70b): | 6 kg/cm$^2$ |
| | Final Cooling Temperature of Molding surface 30: | 70° C. |
| | Cooling Holding Time of Molding surface 30: | 60 sec |
| | All Cycle Time: | 150 sec |

| Tenth Embodiment | | |
|---|---|---|
| (1) | Extrusion on Temperature: | 220° C. |
| (2) | Clamping Force: | 15 ton |
| (3) | Heating of Molding surface 30 | |
| | Pressure of Heating Steam Injected from Nozzle 70 (70a, 70b): | 6 kg/cm$^2$ |
| | Final Heating Temperature of Molding surface 30: | 140 to 150° C. |
| | Heating Holding Time of Molding surface 30: | 10 sec |
| (4) | Cooling of Molding surface | |
| | Pressure of (Cooling Water + Air) Injected from Nozzle 70 (70a, 70b): | 6 kg/cm$^2$ |
| | Final Cooling Temperature of Molding surface 30: | 70° C. |
| | Cooling Holding Time of Molding surface 30: | 60 sec |
| | All Cycle Time: | 150 sec |

Comparing molded products (examples) thus molded according to the ninth and tenth embodiments, and molded products (comparative examples) molded without heating the molding surfaces of the ninth and tenth embodiments, in the respective examples of the ninth and tenth embodiments, the surface gloss value was 95% and curvature of the corner portion was less than or equal to 0.5, and in the respective comparative examples, the surface gloss value was 20% and the curvature of the corner portion was greater than or equal to 0.5.

On the other hand, the foaming condition was that foaming is caused uniformly in entirety of the hollow portion of the molded products. By injecting the foaming resin into the hollow portion of the molded product, the coefficient of thermal conductivity in the thickness direction of the molded product is 0.0278 kcal/mh °C. which is comparable with-the coefficient 0.0227 kcal/mh °C. of the sole foaming resin.

Namely, the examples exhibit better molding surface transferring performance than the comparative examples. Also, the condition of the foamed layer is satisfactorily good. It should be noted:

Mold External Dimension=460(L)×560(W)×720(H) mm

Molded Product Dimension=120(L)×40(W)×480(H) mm

Next, an embodiment which may improve energy efficiency in heating and cooling with shortening a cycle time and maintaining good molding surface transferring performance.

As shown in FIGS. 23A and 23B, through nozzles 701 to 705 which are arranged at substantially equal interval R in the vertical direction opposing the reverse side 31 of the molding surface 30, the cooling water is supplied to the reverse side 31 of the molding surface uniformly. The cooling water supplied to the upper portion of the reverse side 31 falls down depositing on the surface 31 to reach the lower portion. As a result, about termination of cooling, as shown in FIG. 23A, the water film of the lower portion becomes thicker to present a large amount of water in the lower portion. Therefore, the lower portion can be excessively cooled. In addition, in the next heating step, since the large amount of water in the lower portion has to be removed by evaporation and so forth, a large amount of thermal energy has to be consumed. As a result, elevation of temperature at the lower portion is delayed to cause temperature fluctuation of the molding surface 30.

Figure 24:
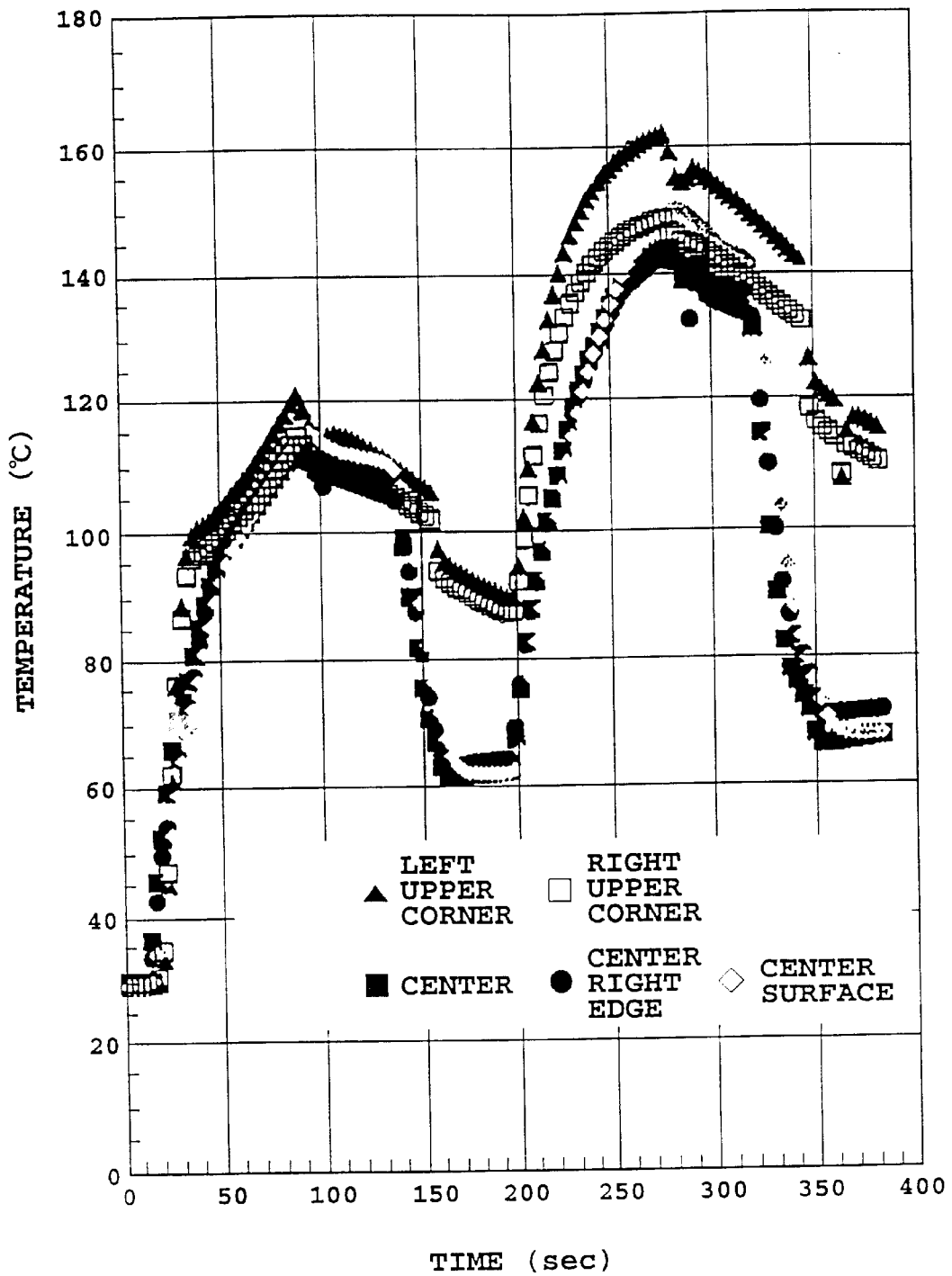
FIG. 24 is a graph showing a temperature variation at respective measuring points of FIG. 23B in the case where the molding surface is heated by injecting superheated steam from respective nozzles of the mold of FIG. 23A and subsequently cooled by injecting cooling water from respective nozzles.

FIG. 24 is a graph showing a result of measurement of temperatures of the molding surface 30 at four points, i.e., at upper portion (right upper corner, left upper corner: see FIG.

23B) and at relatively lower central portion (center, central right edge: see FIG. 23B) by means of respective thermocouples, when the cooling water is injected from the nozzles 701 to 705 through a piping 710 shown in FIG. 23A after heating from the reverse side 31 of the molding surface 30 by injecting superheated steam from the nozzles 701 to 705 via the piping 710 (the cooling water is discharged from a piping 760). In the horizontal axis, the period of 6 to 96 sec is in heating state, 96 to 156 sec is in cooling state, 156 to 189 sec is in air supplying state, 189 to 282 sec is in heating state, 282 to 342 sec is in cooling state, and 342 and subsequent period is in air supplying sate. It should be noted that each of installation positions of respective thermocouples is within a hole in the depth of about 5 mm formed at the back surface 31 of the molding surface 30. A thermocouple is also provided at the center of the molding surface 30 in order to make sure that a temperature in the hole is substantially the same as that of a portion corresponding to the hole on the molding surface side. This is illustrated as "center front surface" in the figure. As shown in the figure, it should be appreciated that the "center" and the "center front surface" shows substantially the same temperature variation. The thickness between the front surface and the back surface of the mold body 3 is 10 mm.

As shown in FIG. 24, the center portion of the molding surface 30 becomes lower temperature than the upper portion of the molding surface 30 upon completion of cooling at the first cycle. Namely, the center portion of the molding surface 30 is cooled to the temperature significantly lower than the (Vicat softening temperature (T) −10) °C. This is considered for a thicker water film at the lower portion of the reverse 31 of the molding surface, as shown in FIG. 23A. On the other hand, since the water may reside, elevating of the temperature in the next heating step can be delayed. As a result, when the center portion of the molding surface 30 is heated to the Vicat softening temperature (T) °C., the upper portion of the molding surface 30 which has a relatively high temperature is elevated to the temperature far beyond the Vicat softening temperature (T) °C. Also, this influence may appear in the next cooling step in an accumulative manner. Therefore, the upper portion of the molding surface 30 becomes more difficult to be cooled.

[Eleventh Embodiment]

To avoid the deficiencies set forth above, in the eleventh embodiment, a greater amount of cooling water is supplied to the upper portion of the reverse 31 of the molding surface 30 than the lower portion thereof so as to uniform the thickness of a water film. Moreover, a residual cooling medium disposed on the reverse of the molding surface is forcedly removed therefrom before heating.

A mold according to the eleventh embodiment is substantially the same as the molds of the former embodiments except for having capability of control of the flow rate independently with respect to each of nozzles.

Accordingly, the mold shown in FIGS. 10A and 10B may be employed and the nozzles 70a, 70a', 70b, 70b' are controlled independently. Here, the nozzles 70a and 70b are located at the upper portion and the nozzles 70a' and 70b' are located at the lower portion. In addition, in the air supplying state set forth in connection with FIG. 24, by forcedly sucking air from the spaces Ba and Bb via the piping 76 by means of a suction pump or so forth, the water film depositing on the reverse 31 of the molding surface 30 can be removed.

On the other hand, it is desired to elevate the temperature to be higher than or equal to the Vicat softening temperature (T) °C. with restricting the temperature difference on the molding surface less than or equal to 30 °C., preferably less than or equal to 25° C., and further preferably less than or equal to 20°C., and to cool down to the temperature lower than or equal to (Vicat softening temperature (T) −10) °C. with restricting the temperature difference on the molding surface less than or equal to 40° C., preferably less than or equal to 30° C., and further preferably less than or equal to 25° C. In order to achieve this, there are a method to supply a relatively greater amount of the cooling medium to the upper portion of the reverse of the molding surface, a method for forcedly removing the cooling medium depositing on the reverse of the molding surface before the next heating step, and so forth. The foregoing may also be achieved by a method for dividing the space on the back side of the molding surface into a plurality of divided spaces and adjusting the pressure of the heating medium and the cooling medium to be supplied to each of the divided spaces to permit concentrically heating or cooling a certain region of the back surface of a molding surface, a method for selectively heating the portion where temperature is low by means of a radiation heating device, a method for locally varying the thickness of the mold body to adjust the heat capacity, and so forth. It should be noted that when a mechanism for injecting high pressure superheated steam is employed as a heating means and the space on the back side is divided into a plurality of divided spaces, and when the superheated steam is injected into the divided space Ba (see FIG. 10B) and the superheated steam is not injected into the divided space Bb, a pressure difference is caused between the divided spaces Ba and Bb. Therefore, a partitioning wall provided for dividing the space B and thus defining the divided spaces Ba and Bb has to withstand against the pressure difference. The partitioning wall satisfying this requirement may be realized by a construction, in which a heat insulation plate is sandwiched between two metal plates.

"Twelfth Example"

With employing the mold shown in FIGS. 10A and 10B, as a thermoplastic resin material, ABS45A (Japan Synthetic Rubber Co., Ltd., Vicat softening temperature is 105° C., longitudinal elastic modulus at 205° C. is 0.3 kg/cm$^2$) was employed, and as a blow molding apparatus, IPB-EP-55 (Ishikawajima Harima Heavy Industries Co., Ltd.) was employed. Then blow molding was performed.

Heating and cooling of the molding surface 30 of the mold was performed by controlling the nozzles 70a and 70b at the upper portion as a set and the nozzles 70a' and 70b' at the lower portion as a set with independently controlling injecting and not injecting the superheated steam or the cooling water and the cooling air independently per set.

The conditions were:

| | | |
|---|---|---|
| (1) | Extrusion Temperature: | 220° C. |
| (2) | Clamping Force: | 15 ton |
| (3) | Parison Blowing Pressure: | 6 kg/cm$^2$ |
| (4) | Heating of Molding surface 30 | |
| | Pressure of Heating Steam Injected from Nozzles 70a, 70b: | 6 kg/cm$^2$ |
| | Pressure of Heating Steam Injected from Nozzles 70a', 70b': | 6 kg/cm$^2$ |
| | Pressure of Heating Steam Injected from all Nozzles 70a, 70b, 70a', 70b': | 6 kg/cm$^2$ |
| | Final Heating Temperature of Molding surface 30 at the lowest temperature portion: | 140° C. |

-continued

|  |  |  |
|---|---|---|
|  | Heating Holding Time of Molding surface 30: | 10 sec |
| (5) | Cooling of Molding surface 30 |  |
|  | Pressure of Cooling Water and so forth Injected from Nozzles 70a, 70b: | 6 kg/cm² |
|  | Pressure of Cooling Water and so forth Injected from Nozzles 70a', 70b': | 6 kg/cm² |
|  | Pressure of Cooling Water and so forth Injected from all Nozzles 70a, 70b, 70a', 70b': | 6 kg/cm² |
|  | Final Cooling Temperature of Molding surface 30 at the highest temperature portion: | 70° C. |
|  | Cooling Holding Time of Molding surface 30: | 60 sec |

(A) Sample A was molded by injecting superheated steam through all of the nozzles 70a, 70b, 70a' and 70b' in the heating step and by injecting cooling water and so forth only through the nozzles 70a and 70b at the upper portion in the cooling step. In this case, a required period in the heating step in the second and subsequent cycles was about 57 sec with the temperature difference during the heating step less than or equal to 17° C., and a required period for the cooling step wad about 53 sec with the temperature difference during the cooling step less than or equal to 13° C. Also, a necessary period for one cycle was about 140 sec. Here, the required period in the heating step is a period required for elevating the temperature at the lowest temperature portion to 140° C., and the required period in the cooling state is a period required for lowering the temperature at the highest temperature portion down to 70° C. This would be same in all of the following examples.

(B) Sample B was molded by injecting superheated steam through all of the nozzles 70a, 70b, 70a' and 70b' in the heating step, and by injecting cooling water only through the nozzles 70a and 70b at the upper portion, subsequently injecting only cooling air and in conjunction therewith forcedly removing the cooling water by sucking the air through the piping 76 in the cooling step. In this case, the required period in the heating step in the second and subsequent cycles was about 47 sec with the temperature difference during the heating step less than or equal to 12° C., and the required period for the cooling step wad about 44 sec with the temperature difference during the cooling step less than or equal to 10° C. Also, the necessary period for one cycle was about 121 sec.

(C) Sample C was molded by injecting superheated steam through the nozzles 70a' and 70b' at the lower portion in the heating step and by injecting cooling water and so forth only through the nozzles 70a and 70b at the upper portion. In this case, the required period in the heating step in the second and subsequent cycles was about 62 sec with the temperature difference during the heating step less than or equal to 22° C., and the required period for the cooling step wad about 53 sec with the temperature difference during the cooling step less than or equal to 16° C. Also, the necessary period for one cycle was about 145 sec.

(D) Sample D was molded by injecting superheated steam through the nozzles 70a' and 70b' at the lower portion in the heating step, and by injecting cooling water only through the nozzles 70a and 70b at the upper portion, subsequently injecting only cooling air and in conjunction therewith forcedly removing the cooling water by sucking the air through the piping 76 in the cooling step. In this case, the required period in the heating step in the second and subsequent cycles was about 56 sec with the temperature difference during the heating step less than or equal to 15° C., and the required period for the cooling step was about 51 sec with the temperature difference during the cooling step less than or equal to 12° C. Also, the necessary period for one cycle was about 137 sec.

(E) Comparative sample E was molded by injecting superheated steam through all of the nozzles 70a, 70b, 70a' and 70b' in the heating step and by injecting cooling water and so forth through all of the nozzles 70a, 70b, 70a' and 70b' in the cooling step. In this case, the required period in the heating step in the second and subsequent cycles was about 83 sec with the temperature difference during the heating step less than or equal to 34° C., and the required period for the cooling step wad about 77 sec with the temperature difference during the cooling step less than or equal to 50° C. Also, the necessary period for one cycle was about 190 sec.

As set forth above, while molding of samples A to D could be done with a relatively short period, molding of comparative sample E required a much longer period than samples A to D. Comparing with each of samples, both the molded samples A to D and the comparative sample E had good quality that the surface gloss value was 95% and curvature of the corner portion was less than or equal to 0.5. Namely, transferring performance of the molded product was satisfactory in all of the samples A to D and the comparative sample E in that the molded product having smaller curvature at the corner portion which had not been obtained in the conventional blow molding was able to be accurately formed with high dimensional stability.

However, in the case of the molding process of the comparative sample E, when the period of the heating step was shortened as in the samples A to D, the final temperature at the lowest temperature portion of the molding surface could not reach 140° C., resulting in causing poor transferring portions on the surface of the molded product.

Also, in the case of the molding process of the comparative sample E, when the period of the cooling step was shortened as in the samples A to D, the final temperature at the highest temperature portion of the molding surface could not be cooled down to 70° C., resulting in causing a failure in taking out the molded product.

It should be noted:

Mold External Dimension=460(L)×560(W)×720(H) mm

Molded Product Dimension=120(L)×40(W)×480(H) mm

"Other Examples"

Further discussion will be given for other examples of the present invention and comparative examples. In the following examples and the comparative examples, ABS resin is used as a thermoplastic resin. The thermoplastic resin material is ABS45A (Japan Synthetic Rubber Co. Ltd., Vicat softening temperature is 105° C., longitudinal elastic modulus at 205° C. is 0.3 kg/cm²).

Figure 25:
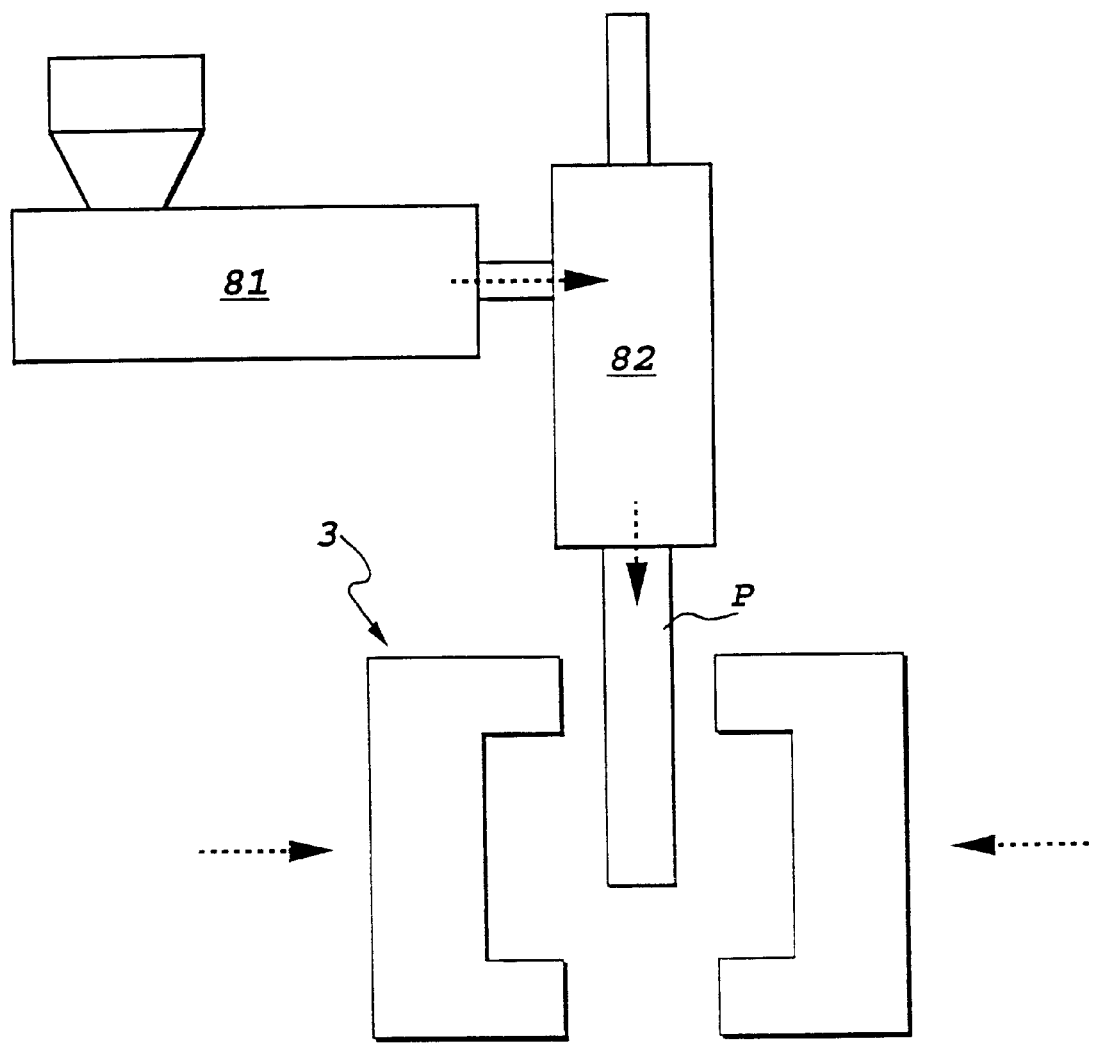
FIG. 25 is a diagrammatic illustration showing overall construction of a blow molding apparatus.
Figure 26:
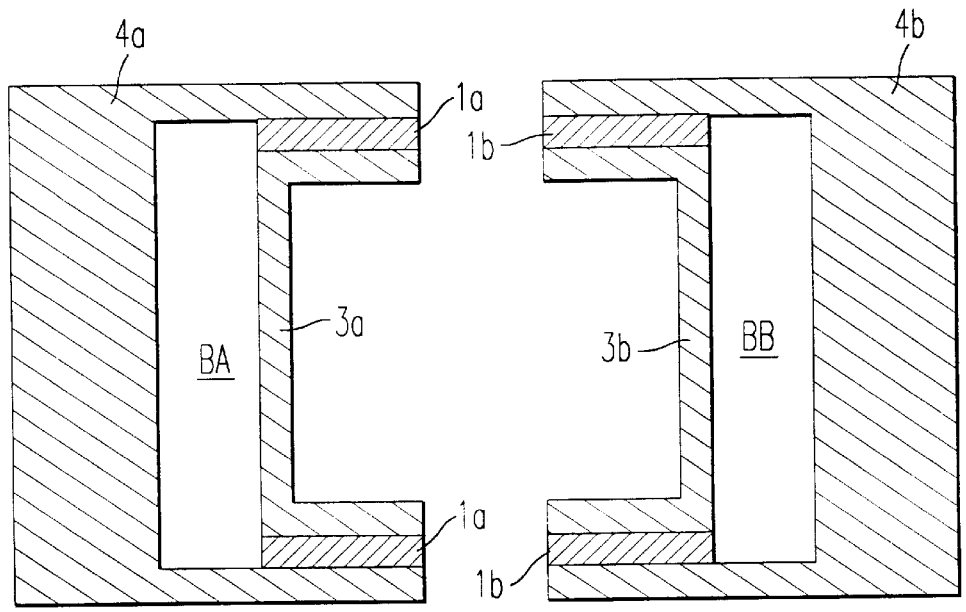
FIG. 26 is a sectional view showing a mold according to one aspect of the invention.

In the following examples and the comparative examples, blow molding is performed employing ABS resin (JSR ABS45A) to form a box-shaped molded product. Namely, in each of examples and the comparative examples, as shown in FIG. 25, ABS resin is molten and fed into an accumulator die 82 by means of an extruder 81. In the accumulator die, a hollow cylindrical parison P is formed and fed downwardly. The parison P is then set in one of the mold 3 (examples A to C, comparative examples a to e) to perform blow molding.

Here, a screw diameter of the extruder 81 is 55 mm and a maximum extruding capacity is 2000 cc. On the other hand, a diameter of the parison fed out from the accumulator die 82 is 100 mm and temperature thereof is 200° C. The feeding period to the mold 3 is 2 sec in any case. Also, the width of the mold is 250 mm and the height thereof is 600 mm, and the thickness is 50 mm. The maximum clamping force to be exerted on the mold is 15 tons. The molding surfaces of respective mold halves are mirror surfaces.

On the other hand, upon initiation of blow molding, in any of the mold, by maintaining a vacuum degree of 30 mmHg for ten seconds between the parison P and the molding surface of the mold 3, the outer periphery of the parison is contacted to or placed in the vicinity of the molding surface by suction force. During this, an air feeding needle disposed in a mold cavity is inserted into the parison. By continuing feeding of air under the pressure of 7 kg/cm$^2$ into the interior hollow space of the parison P the outer periphery of the parison is firmly fitted onto the molding surface of the mold. Namely, with setting the molding or blowing pressure at 7 kg/cm$^2$, molding is performed. It should be noted that the clamping force was 15 tons for all the cases.

Next, discussion will be given for different conditions and so forth with respect to each mold.

[Example A]

Figure 28:
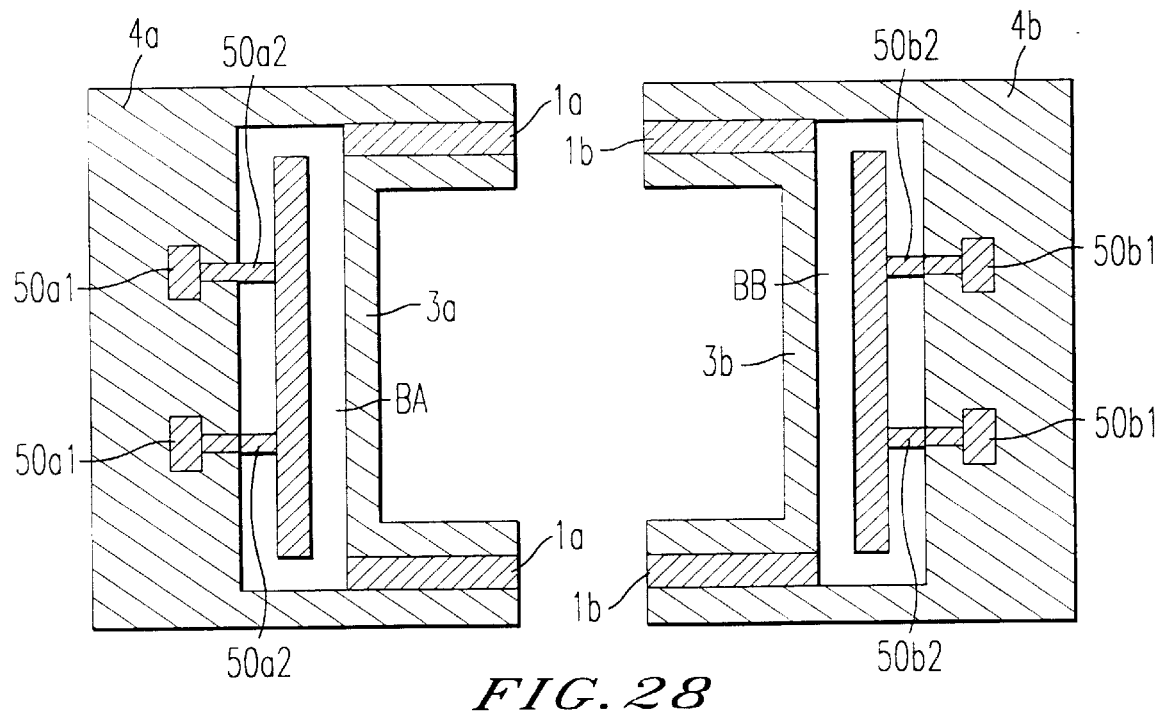
Figure 34:
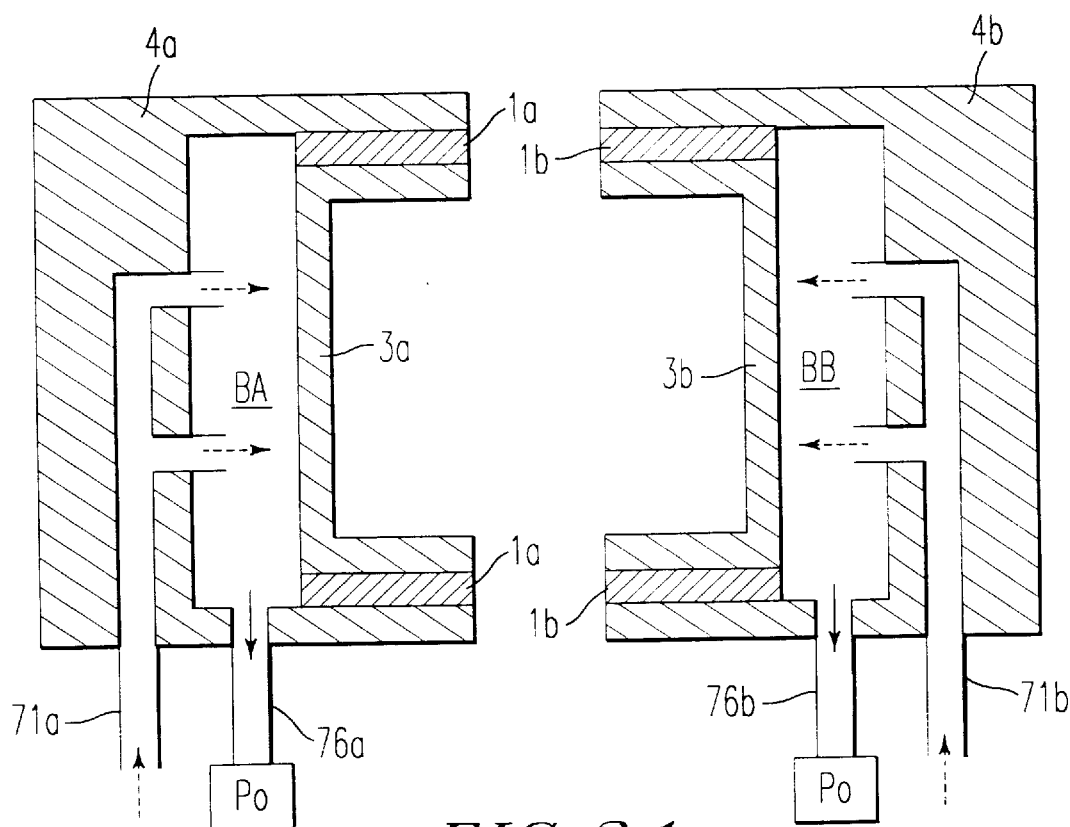
FIG. 34 is a diagrammatic sectional illustration of the mold for explaining a cooling system by evaporation of liquid.

In this mold, heating was performed by the system illustrated in FIG. 28 and cooled by the system illustrated in FIG. 34. Namely, for the mold bodies 3a and 3b having the molding surface temperature at 50° C., the outer periphery of the parison P was firmly fitted. Then, the molding surface of the mold bodies 3a and 3b were heated to 120° C. by heat generation bodies (electric heaters) 50a and 50b provided in respective spaces BA and BB defined between the mold bodies 3a and 3b and the main bodies 4a and 4b, and abutting the heat generating bodies 50a and 50b onto the back surfaces of the mold bodies 3a and 3b by the action of hydraulic cylinders 50a1 and 50b1 via rods 50a2 and 50b2. Also, respective heat generating bodies 50a and 50b were retracted to the initial positions respectively by the action of the hydraulic cylinders 50a1 and 50b1 during cooling. It should be noted that, in FIG. 28, 1a and 1b denote heat insulating bodies.

On the other hand, after firmly fitting the outer surface of the parison P onto the molding surfaces of the mold bodies 3a and 3b, cooling water (pressurized water) was injected into the spaces BA and BB through the pipings 71a and 71b. The flow rate of the cooling water was 100 cc/sec. Also, the injecting direction was the direction toward the back surface of the mold bodies 3a and 3b. By this, heat exchange was caused at the back surface to evaporate the cooling water and at the same time, the mold bodies 3a and 3b were cooled. The cooling period was 30 sec. On the other hand, the steam was sucked and discharged through the pipings 76a and 76b by a vacuum pump P0. Namely, the spaces BA and BB were in the vacuum condition to promote evaporation of the cooling water.

After cooling, ventilation of gas in the molded product was performed and the product was taken out after opening or unclamping the mold. At this time, transferring condition of the mirror surface was quite good. Also, the product did not contain bending or warp and exhibited high dimensional precision. A necessary period up to taking out of the molded product was 60 sec and the overall cycle time was 70 sec. With the case of the mold having a grained pattern on the molding surface, like result was obtained.

[Example B]

Figure 29:
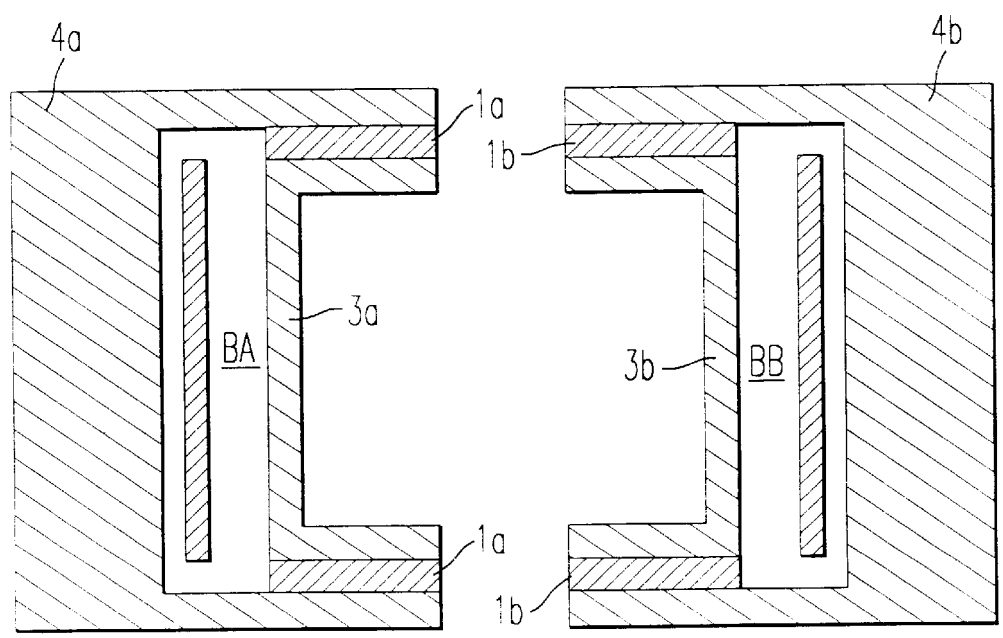
Figure 33:
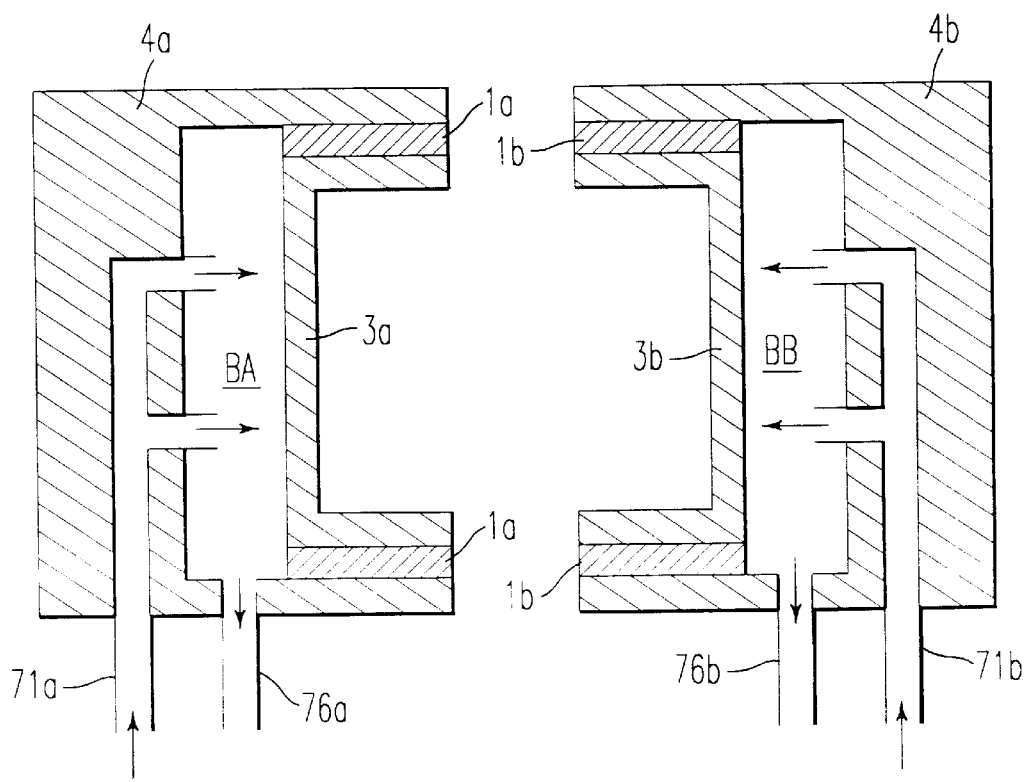
FIG. 33 is a diagrammatic sectional view showing a manner of cooling from the space side of the mold body where the molding surface of the mold of FIG. 26 is formed.

In this mold, heating was performed by the system illustrated in FIG. 29 and cooled by the system illustrated in FIG. 33. Namely, for the mold bodies 3a and 3b having the molding surface temperature at 50° C., the outer periphery of the parison P was firmly fitted. Then, as shown in FIG. 29, by means of line condensing type heaters 51a and 51b provided in respective spaces BA and BB, heat was radiated onto the back surface of the mold bodies 3a and 3b to heat the molding surface to 120° C., respectively. It should be noted that this heating was stopped after 2 sec from initiation of feeding of air into the parison P.

After termination of heating by means of the line condensing type heaters 51a and 51b, air at the temperature of −10° C. was fed at a flow rate of 50 l/min into respective spaces BA and BB via the pipings 71a and 71b, as shown in FIG. 33. Feeding of the air was performed by means of dispersing nozzles so that the air was injected toward the back surface of the mold bodies 3a and 3b. Thus, heat exchange was caused at the back surface to cool the mold bodies 3a and 3b from the back side. It should be noted that the air fed into respective spaces BA and BB were discharged via the pipings 76a and 76b after heat exchanging.

After cooling, gas ventilation was performed in the molded product and the product was taken out after opening the mold. The product exhibited excellent mirror surface transfer performance. Also, the product did not contain bending or warp and exhibited high dimensional precision. A necessary period up to taking out of the molded product was 110 sec. On the other hand, the overall cycle time was 130 sec. With the case of the mold having a grained pattern on the molding surface like result was obtained.

[Example C]

Figure 27:
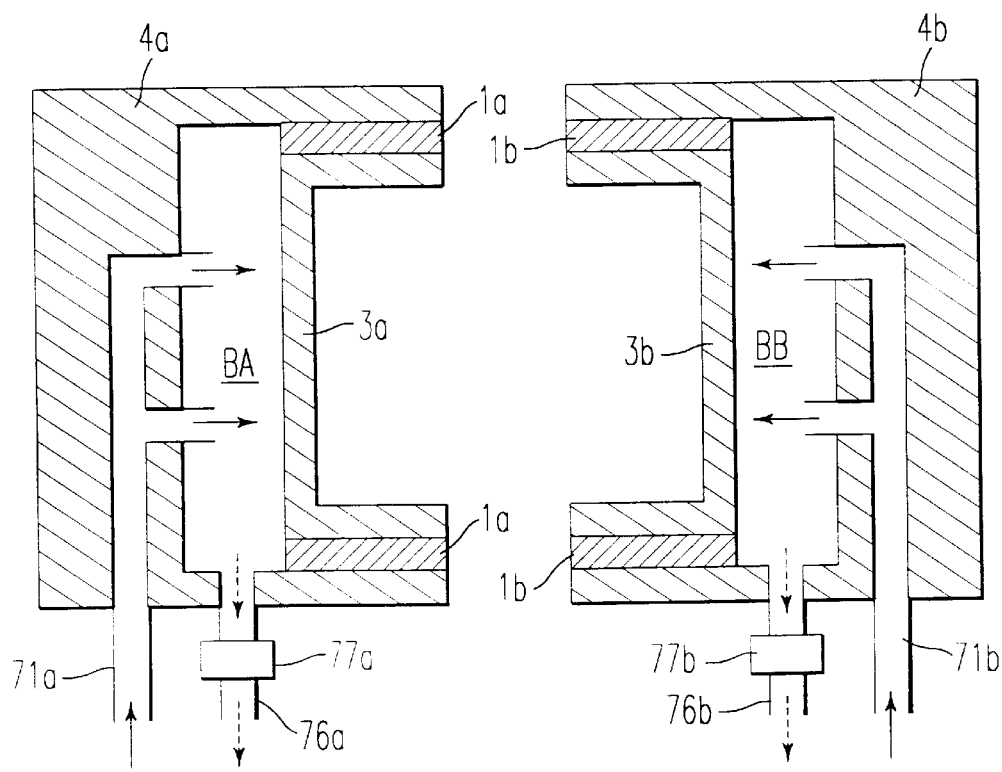
FIGS. 27 to 29 are diagrammatic sectional illustrations of a mold for respectively explaining systems for heating the back side of the molding surface.

In this mold, heating was performed by the system illustrated in FIG. 27 and cooled by the system illustrated in FIG. 34. Namely, for the mold bodies 3a and 3b having the mold surface temperature at 50° C., the outer periphery of the parison P was firmly fitted. Then, as shown in FIG. 27, heating steam of the temperature of 150° C. is injected toward the back surface of the mold bodies 3a and 3b via the pipings 71a and 71b. By this, heat exchange was caused on the back surface of the mold bodies 3a and 3b to condense the heating steam to be droplets, and in conjunction therewith, the front surface side (the molding surface) of the mold bodies 3a and 3b) was heated to 120° C., respectively. It should be noted that the droplets were discharged from the pipings 76a and 76b via the pressure modifying valves 77a and 77b.

After terminating heating by the heating steam of the temperature of 150° C., the mold bodies 3a and 3b were cooled down to 80° C. by the system shown in FIG. 34.

After cooling, gas ventillation was performed in the molded product and the product was taken out after opening the mold. The product exhibited excellent mirror surface transfer performance. Also, the product did not contain bending or warp and exhibited high dimensional precision. A necessary period up to taking out of the molded product was 65 sec. On the other hands, the overall cycle time was 75 sec. With the case of the mold having a grained pattern on the molding surface, like result was obtained.

[Comparative Examples]

Respective molds of the comparative examples a to e have constructions, in which the molding surface was integral with the main body. Accordingly the molds had, no heat insulation body. Therefore, when the mold was heated for clearly transferring the molding surface, a long period was required for cooling.

The temperature of respective molds upon molding was 50° C. in the comparative example a, 120° C. in the comparative example b, 170° C. in the comparative example c, 30° C. in the comparative example d and 150° C. in the comparative example e. Namely, the comparative examples a and d were low temperature and the comparative examples b, c and e were high temperature.

Therefore, the condition of the mirror surface of respective molded products was ordinary in the comparative example a which was heated at medium temperature, excellent in the comparative examples b, c and e which were heated at high temperature, and unacceptable in the comparative example d which was heated at low temperature.

On the other hand, the required period to take out the molded product and overall cycle time were respectively, 60 sec and 70 sec in the comparative example a which was heated at medium temperature, 150 sec and 170 sec in the comparative example b which was heated at high temperature, 290 sec and 310 sec in the comparative example c which was heated at high temperature, 45 sec and 55 sec in the comparative example d which was heated at low temperature, and 250 sec and 280 sec in the comparative example e which was heated at high temperature. Namely, higher temperature requires longer period to take out the products and longer overall cycle time, and opposite to the condition of the mirror surface.

As set forth, in the molds in the comparative examples, though the mirror surface can be transferred satisfactorily by heating at high temperature, it inherently causes a problem of long period required for taking out the products and long overall cycle time.

Similar results were obtained in molding the products having the grained surfaces.

It should be noted that the comparative example f was molded by firmly fitting the parison after heating the molding surface at 120° C. in the molding process of example A. Subsequent process were the same as that of the example A. Obtained product was lower than the example A in mirror surface transferring ability, anti-bending ability, dimensional precision and molding stability.

[Other Examples]

Figure 30:
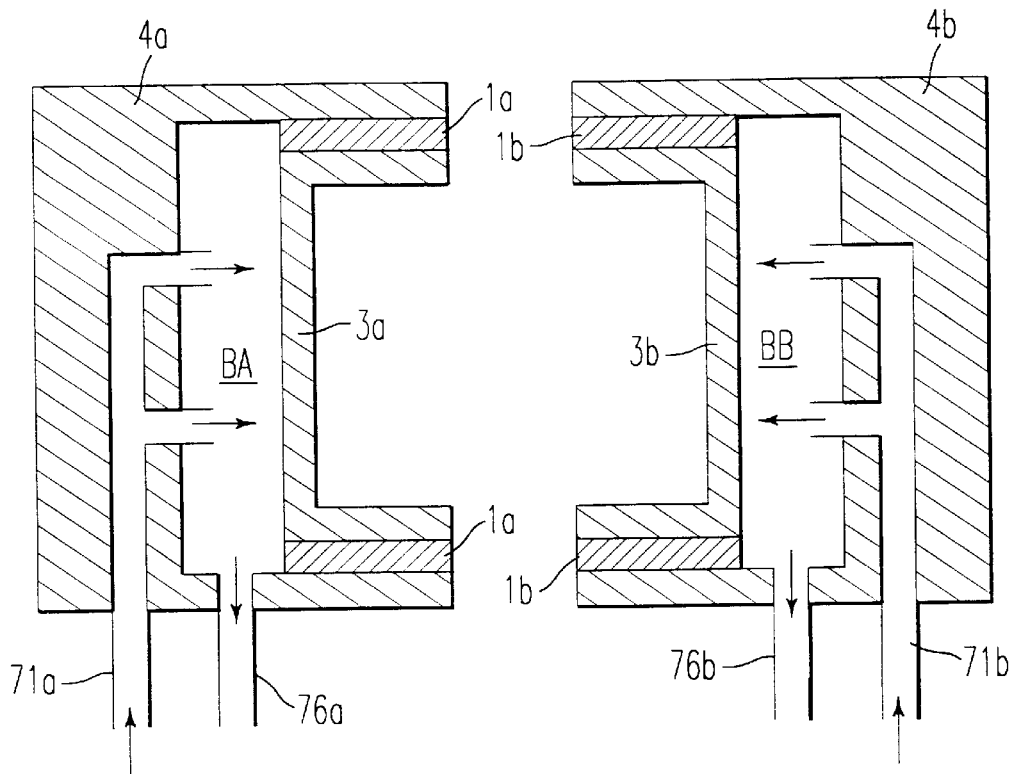
FIG. 30 is a diagrammatic sectional view showing a manner of heating from the space side of the mold body where the molding surface of the mold of FIG. 26 is formed.
Figure 31:
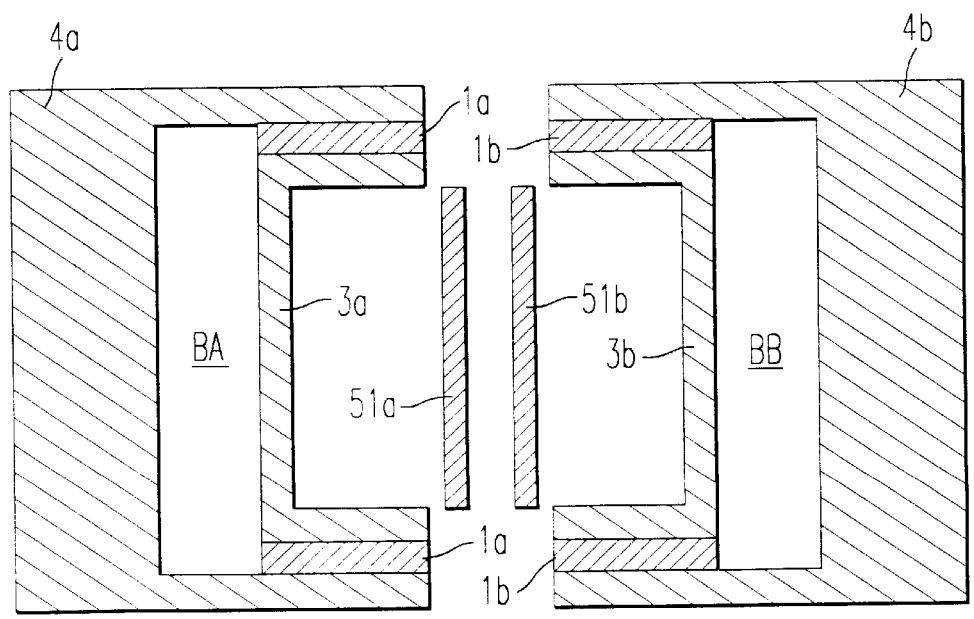
FIGS. 31 and 32 are sections of molds for respectively explaining systems for heating the molding surface.
Figure 32:
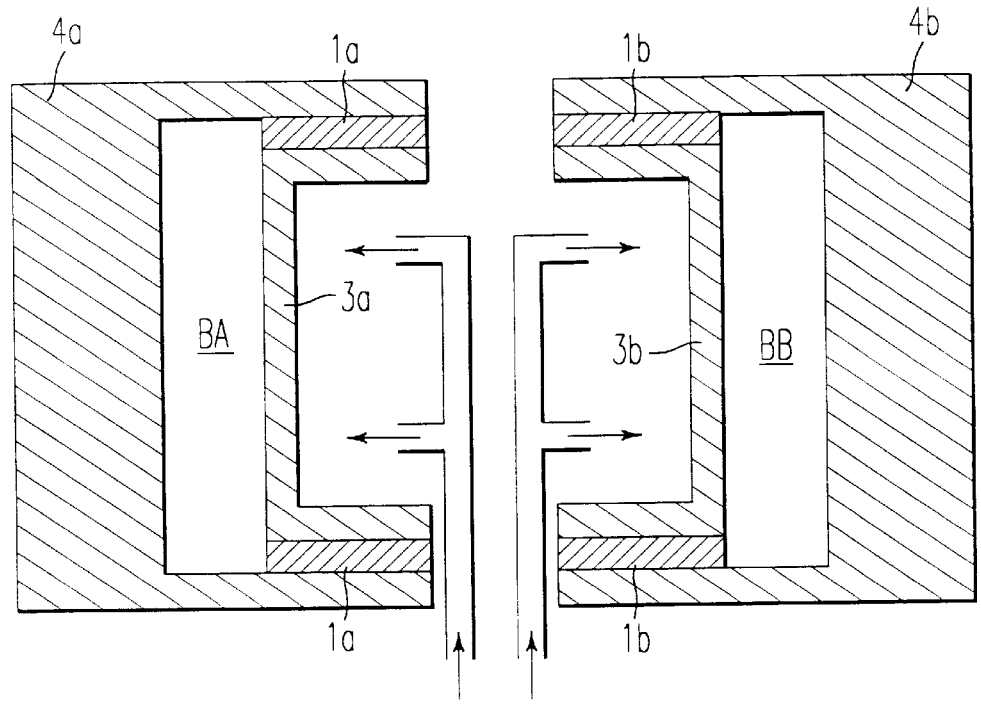

While the foregoing discussion with respect to the examples A to C has been given for the systems illustrated in FIGS. 27, 28, 29, 33 and 34, it is further possible to heat by systems illustrated in FIGS. 30 to 32. FIG. 30 is a system to heat the molding surface by supplying the heating gas via the pipings 71a and 71b and ventilating the gas through the pipings 76a and 76b after heat exchange. FIG. 31 is a system to heat the molding surface by temporarily inserting the line condensing type heaters 51a and 51b on the molding surface side of the mold bodies 3a and 3b. Also, FIG. 32 is a system to heat the molding surface by temporarily inserting air supply pipes 53a and 53b on the molding surface side of the mold bodies 3a and 3b.

In addition to the foregoing heating systems, a system for heating by employing high frequency, a system for heating by employing a far infrared light and so forth may be used. Also, as a method for obtaining steam for heating, an induction heating system may be used.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A molding apparatus for obtaining a molded product by firmly fitting a molten thermoplastic resin onto a molding surface of a mold under a pressure lower than or equal to 100 kg/cm$^2$ and curing, comprising:

a mold main body;

a mold body on which said molding surface is defined;

supporting means for supporting said mold body relative to said mold main body with maintaining a space on the back side of said molding surface in a heat insulative manner, said supporting means including at least a heat insulative supporting member having a thermal conductivity of 0.001 to 1 Kcal/mh °C. and a longitudinal elastic modulus of 0.01 to 10 kg/cm$^2$;

heating means for heating said molding surface from the back side thereof to a temperature higher than or equal to Vicat softening temperature (T) °C. of said thermoplastic resin;

cooling means for cooling said molding surface from the back side thereof to a temperature lower than or equal to (Vicat softening temperature (T) of the thermoplastic resin −10) °C.;

control means for controlling introduction and discharge of a fluid into and from said space, and pressure control means for controlling pressure of said fluid in said space corresponding to pressure to be exerted onto said molding surface.

2. A molding apparatus as claimed in claim 1, wherein said supporting means includes a sealing member for sealing said space with accommodating relative displacement between said mold body and said mold main body due to the differences of thermal expansion.

3. A molding apparatus as claimed in claim 1, wherein said heating means includes means for supplying a heating medium into said space at a given timing.

4. A molding apparatus as claimed in claim 1, wherein said heating means includes a heating fluid having modulus of elasticity of volume of $1\times10^4$ to $4.5\times10^4$ kg/cm$^2$ said heating fluid being supplied into said space at a given timing and held therein.

5. A molding apparatus as claimed in claim 1, further comprising:

at least one partitioning wall for dividing said space into a plurality of spaces each including a part of the back side of said molding surface as an internal periphery, and wherein said heating means heats said internal periphery of said divided spaces independently.

6. A molding apparatus as claimed in claim 3, wherein said cooling means includes means for supplying a cooling fluid into said space at a given timing.

7. A molding apparatus as claimed in claim 6, wherein said cooling fluid is a liquid state cooling medium, and further comprising:

means for forcedly removing the liquid state cooling medium depositing and residing on the back side of said molding surface in said space.

8. A molding apparatus for obtaining a molded product by firmly fitting a molten thermoplastic resin onto a molding surface of a mold under a pressure lower than or equal to 100 kg/cm$^2$ and curing, comprising:

a mold main body;

a mold body on which said molding surface is defined;

supporting means for supporting said mold body relative to said mold main body with maintaining a space on the back side of said molding surface in a heat insulative manner, said supporting means including at least a heat insulative supporting member having a thermal conductivity of 0.001 to 1 Kcal/mh °C. and a longitudinal elastic modulus of 0.01 to 10 kg/cm$^2$;

heating means for heating said molding surface from the back side thereof to a temperature higher than or equal to Vicat softening temperature (T) °C. of said thermoplastic resin;

cooling means for cooling said molding surface from the back side thereof to a temperature lower than or equal to (Vicat softening temperature (T) of the thermoplastic resin −10) °C.;

wherein said heating means includes a radiation heating device arranged at a position in the space opposing to the back side of the molding surface.

9. A molding apparatus for obtaining a molded product by firmly fitting a molten thermoplastic resin onto a molding surface of a mold under a pressure lower than or equal to 100 kg/cm$^2$ and curing, comprising:

a mold main body;

a mold body on which said molding surface is defined;

supporting means for supporting said mold body relative to said mold main body with maintaining a space on the back side of said molding surface in a heat insulative manner, said supporting means including at least a heat insulative supporting member having a thermal conductivity of 0.001 to 1 Kcal/mh °C. and a longitudinal elastic modulus of 0.01 to 10 kg/cm$^2$;

heating means for heating said molding surface from the back side thereof to a temperature higher than or equal to Vicat softening temperature (T) °C. of said thermoplastic resin;

cooling means for cooling said molding surface from the back side thereof to a temperature lower than or equal to (Vicat softening temperature (T) of the thermoplastic resin −10) °C.;

further comprising:
first pressurized fluid supply means for supplying a pressurized fluid into said space;

second pressurized fluid supply means for supplying a pressurized fluid depressing said thermoplastic resin onto said molding surface of the molding surface side; and pressure adjusting means for following the pressure of one of said pressurized fluids to the pressure of the other pressurized fluid.

10. A molding apparatus as claimed in claim 2, wherein said supporting means comprises a support member disposed in a groove provided in said mold main body and a flange extending from periphery of said mold body into said groove, and said sealing member is located between said support member and said flange.

11. A molding apparatus as claimed in claim 10, wherein said groove is formed by securing a plurality of panels each having an extended portion onto a base portion of said mold main body and said plurality of panels are arranged with a clearance with respect to adjacent panels.

* * * * *